United States Patent [19]

Carter

[11] 3,898,918

[45] Aug. 12, 1975

[54] DEVICE FOR TEMPORARILY PROVIDING A SEAL WITHIN AN ADVANCING PIPE

[76] Inventor: J. Warne Carter, Wichita Falls, Tex.

[22] Filed: Oct. 23, 1973

[21] Appl. No.: 408,790

Related U.S. Application Data

[60] Division of Ser. No. 243,991, April 14, 1972, which is a division of Ser. No. 824,153, May 13, 1969, Pat. No. 3,700,519, which is a continuation-in-part of Ser. No. 577,035, Sept. 2, 1966, Pat. No. 3,507,412, which is a continuation-in-part of Ser. No. 387,372, Aug. 4, 1964, abandoned.

[52] U.S. Cl. .......................... 92/92; 92/94; 226/162
[51] Int. Cl. .............................................. F16j 3/00
[58] Field of Search ........... 156/156, 171, 172, 173, 156/191, 195, 287, 289, 392, 429, 432, 537; 226/150, 162; 198/24; 214/1 P, 1 PA; 138/93; 269/22, 56; 92/92, 94

[56] References Cited

UNITED STATES PATENTS

| | | | |
|---|---|---|---|
| 2,164,195 | 6/1939 | Waltermire | 138/93 X |
| 2,753,876 | 7/1956 | Kurt | 138/93 |
| 2,865,640 | 12/1958 | Watson et al. | 269/22 |
| 3,068,133 | 12/1962 | Cilker et al. | 156/171 |
| 3,294,121 | 12/1966 | Powell et al. | 138/93 |
| R27,355 | 5/1972 | Skoggard et al. | 156/432 |

Primary Examiner—Charles E. Van Horn
Assistant Examiner—Basil J. Lewris
Attorney, Agent, or Firm—Shapiro and Shapiro

[57] ABSTRACT

A device for temporarily providing an air seal within an advancing pipe permits cutting off a length of the pipe from the continuously manufactured product without the loss of air pressure within the pipe, and thereby the continuous manufacturing process need not be interrupted.

2 Claims, 69 Drawing Figures

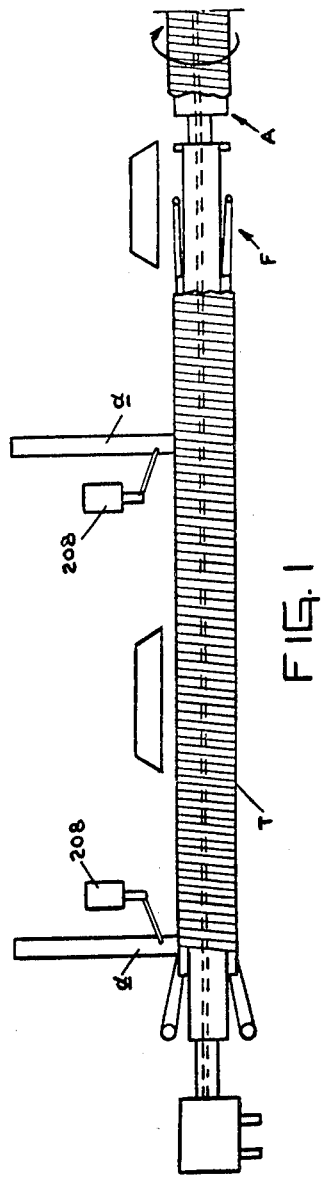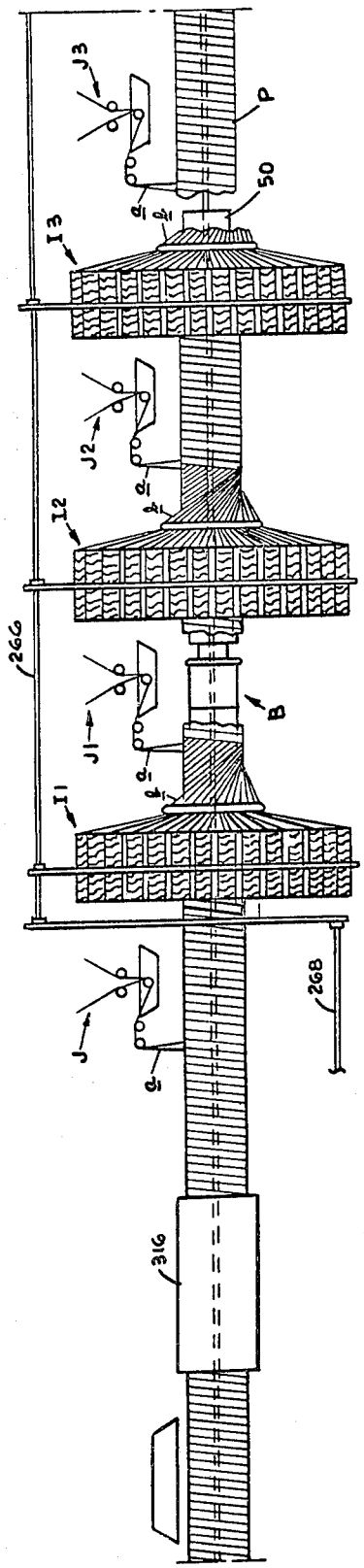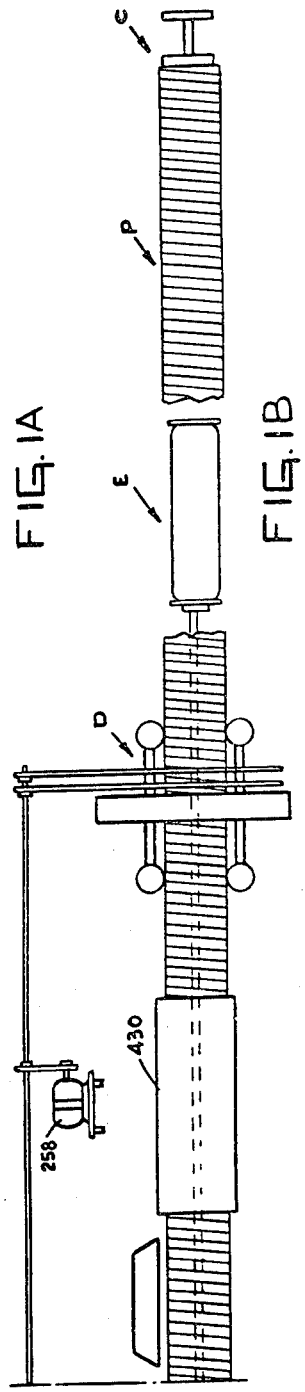

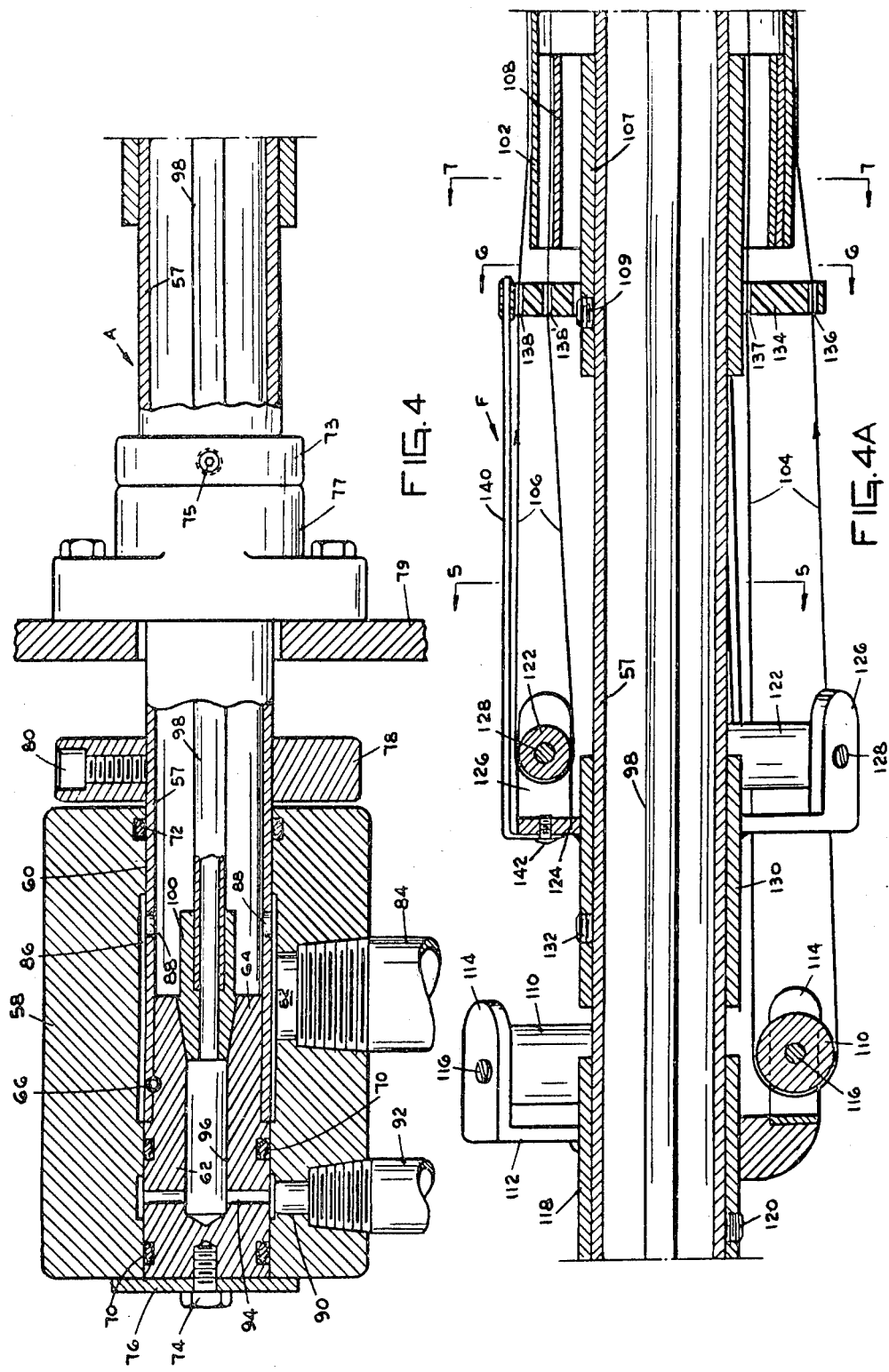

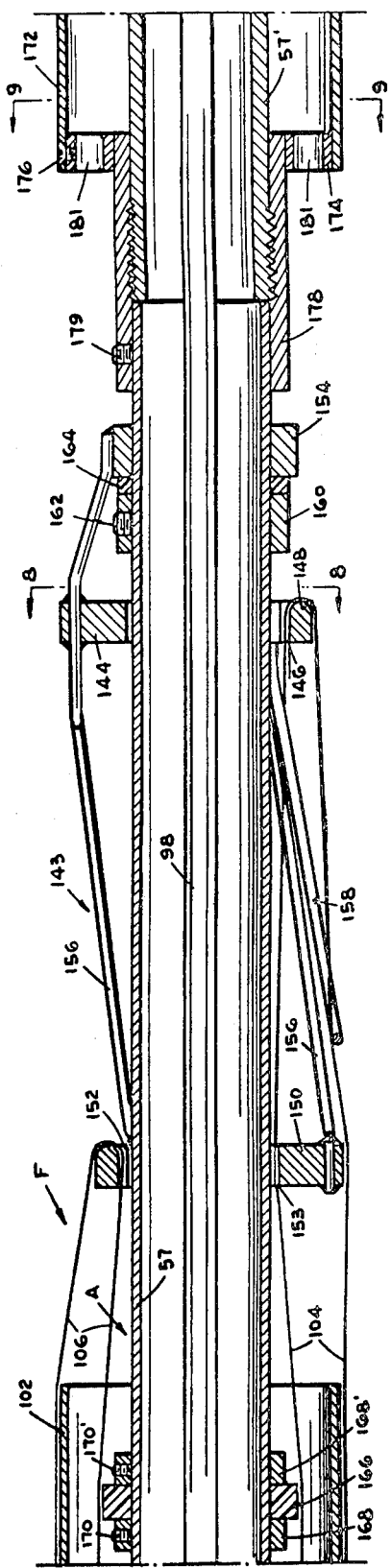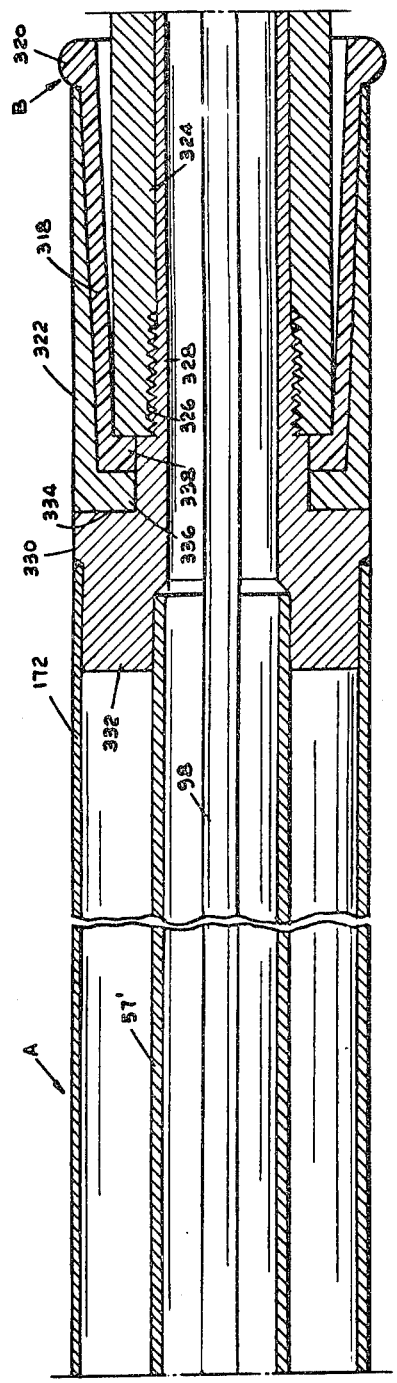

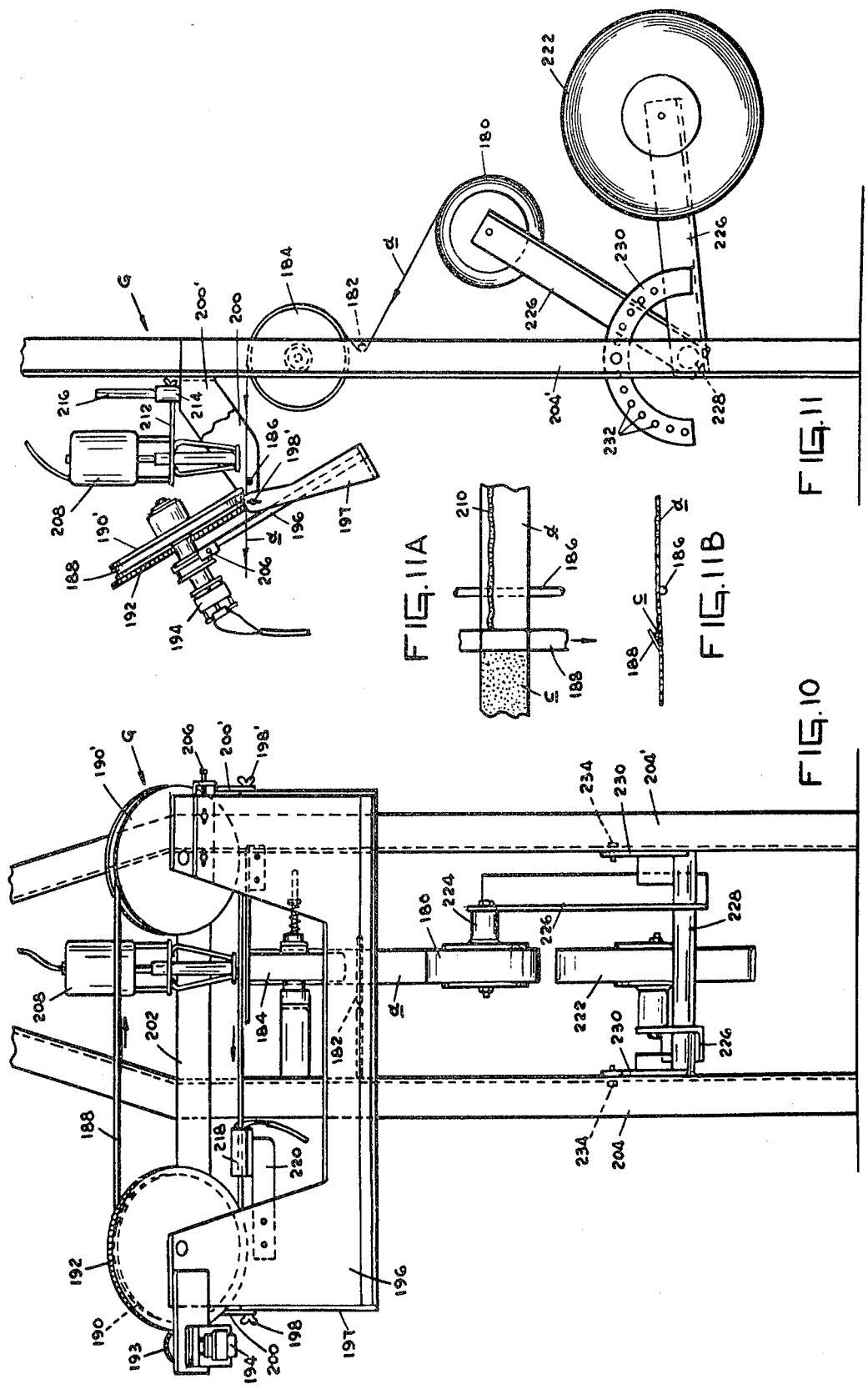

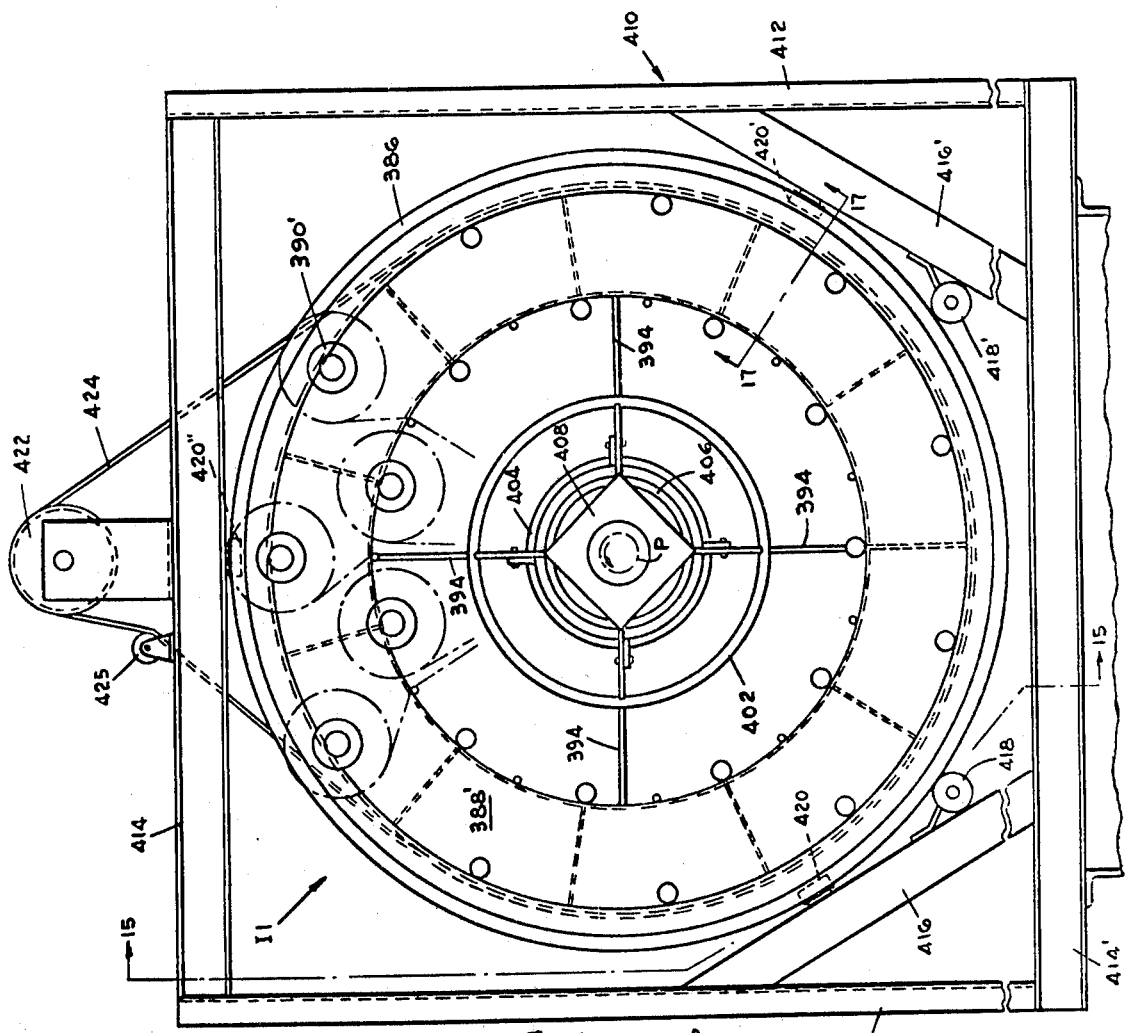
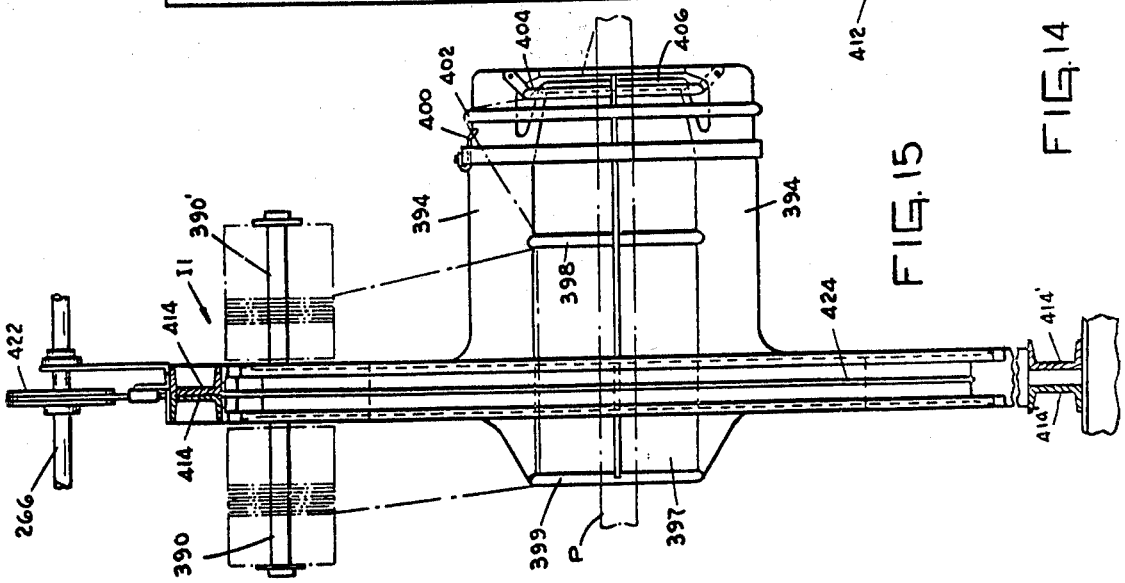
FIG.14
FIG.15

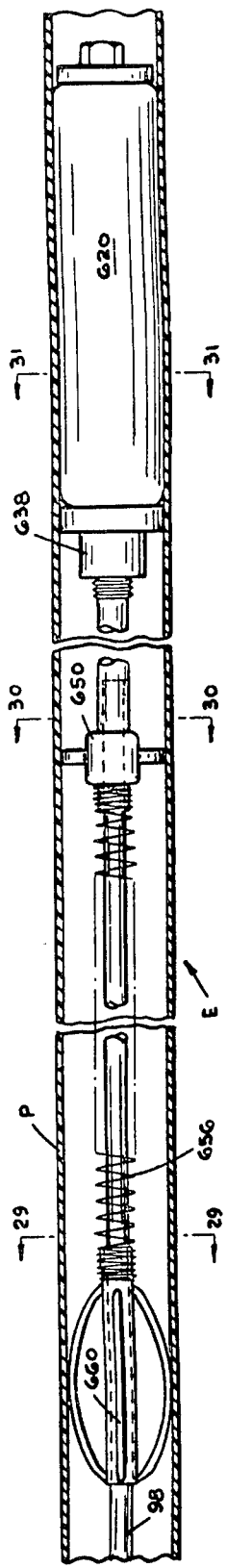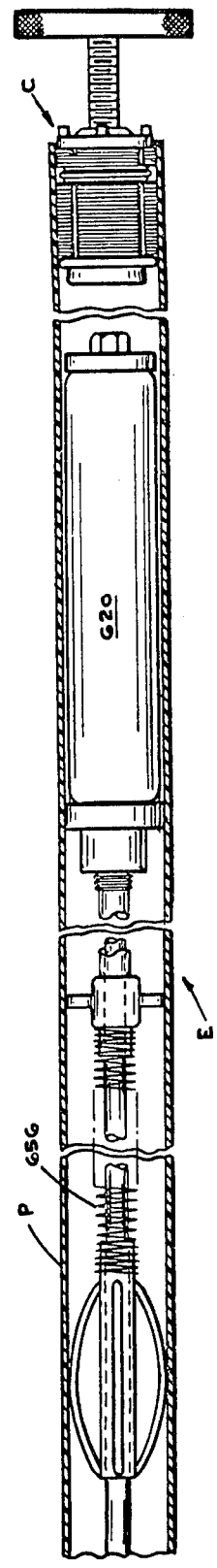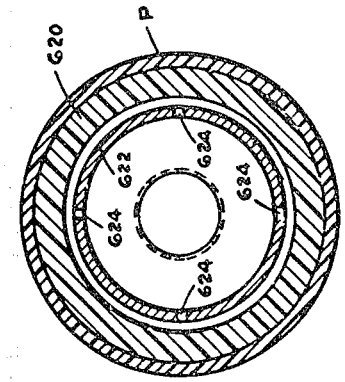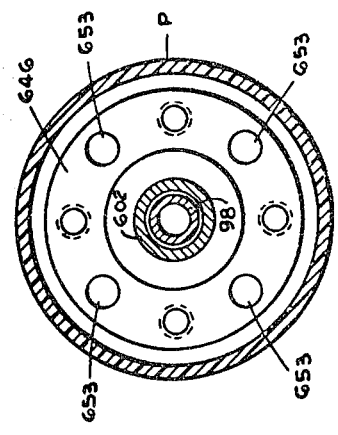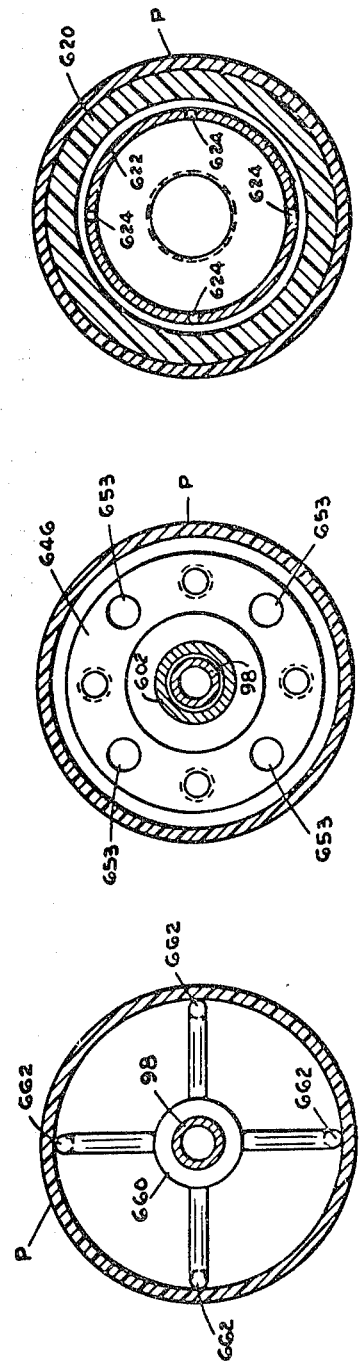

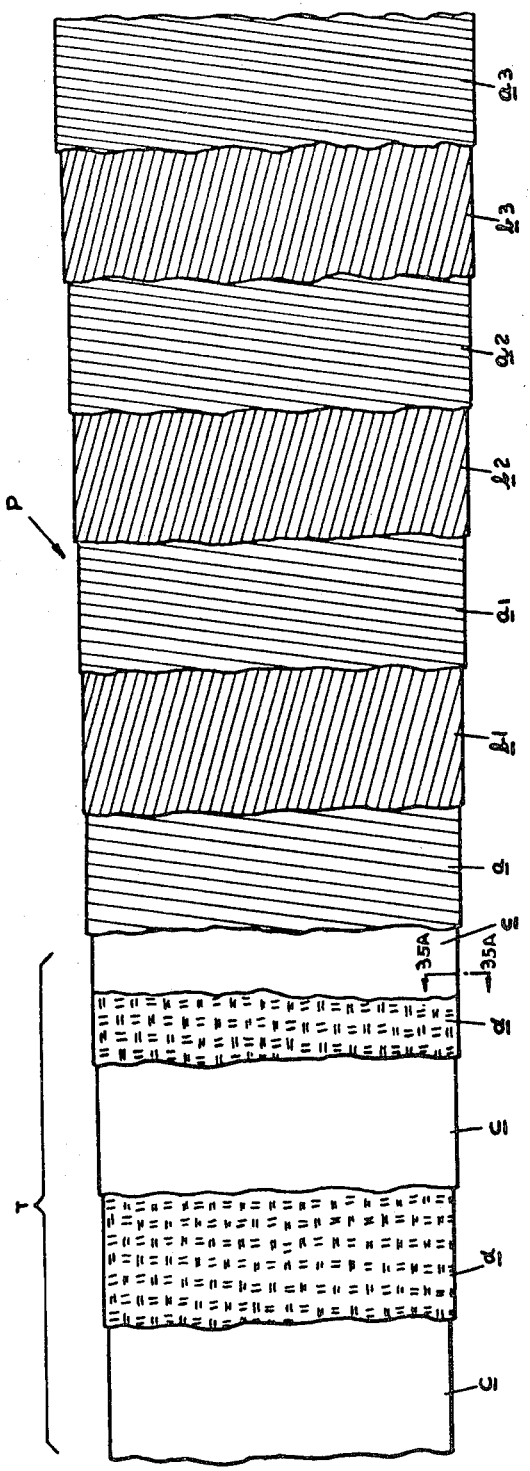

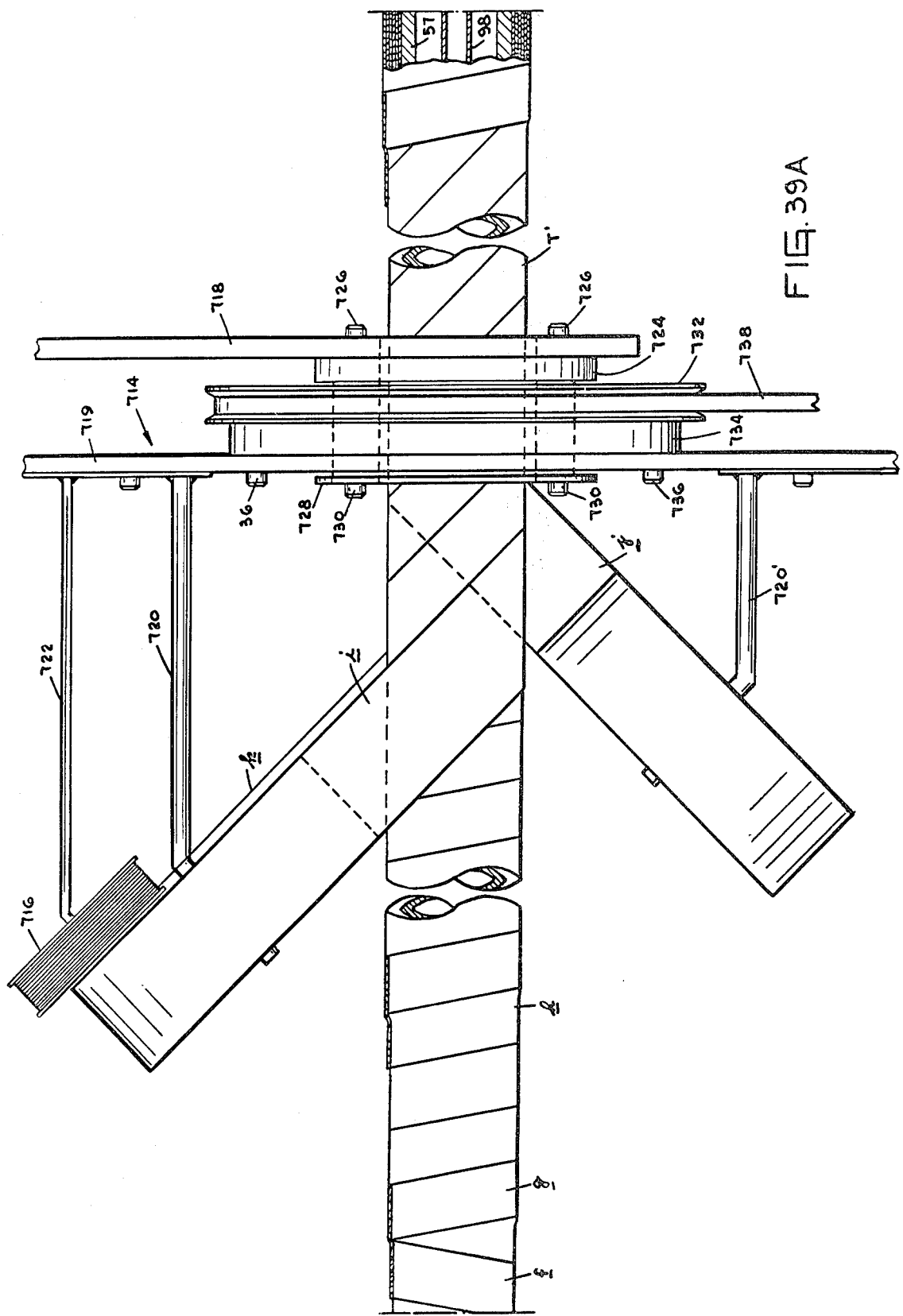

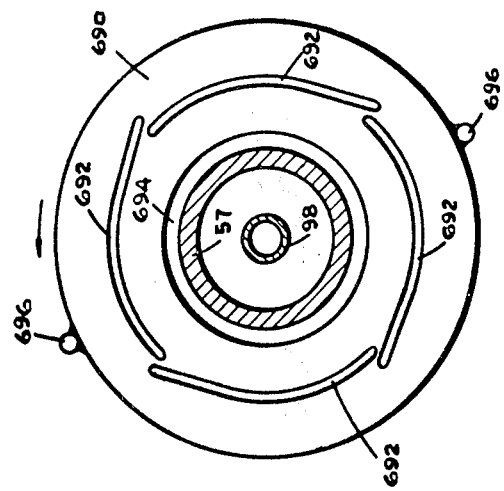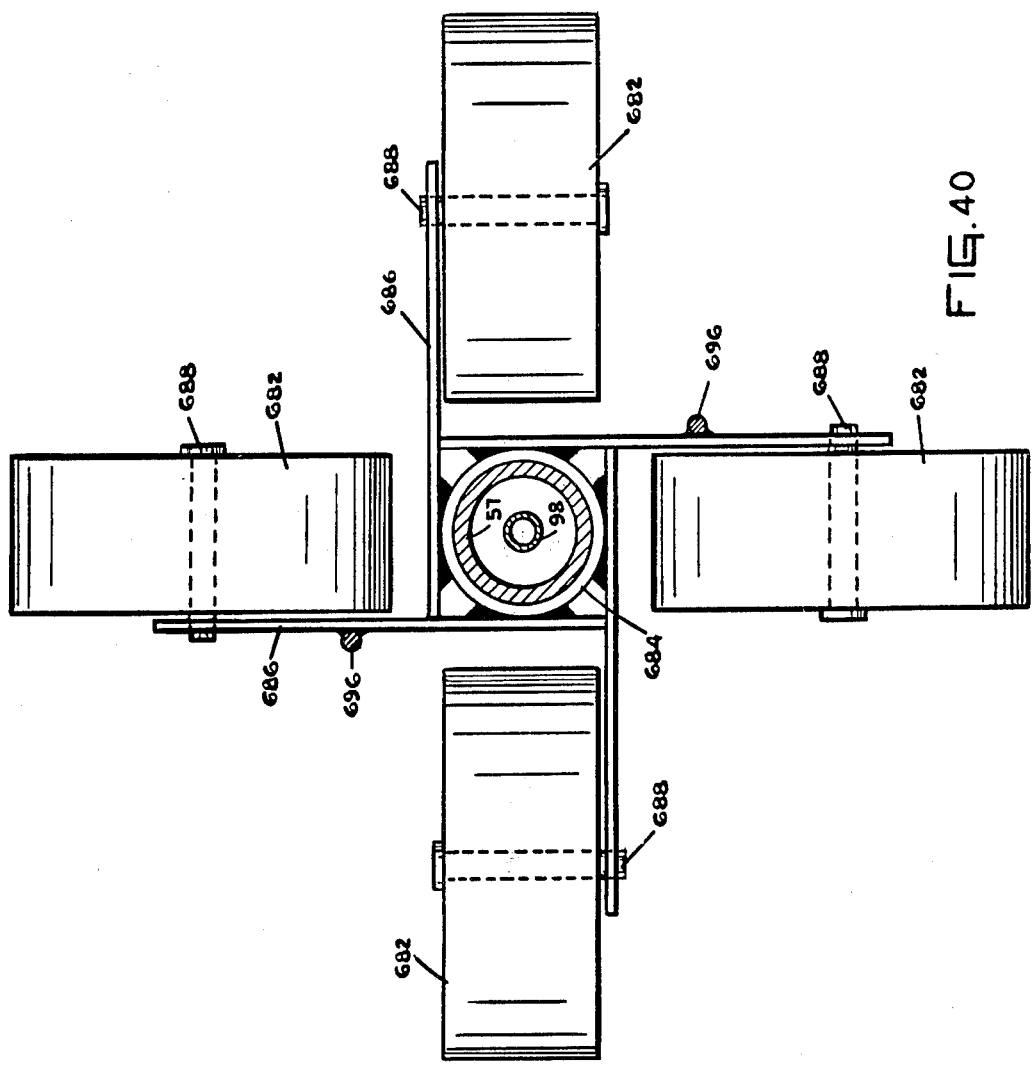

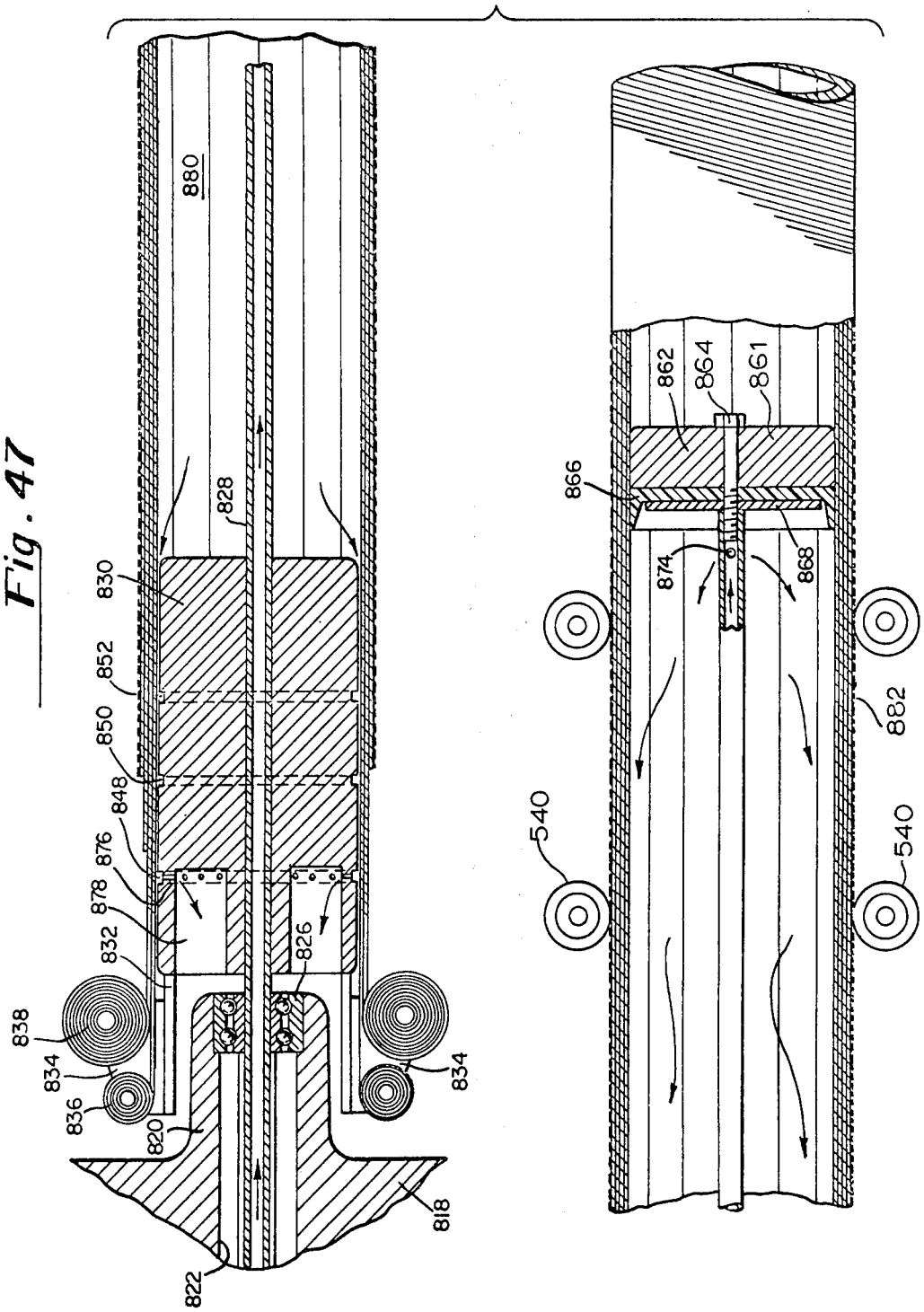

3,898,918

DEVICE FOR TEMPORARILY PROVIDING A SEAL WITHIN AN ADVANCING PIPE

CROSS REFERENCES TO RELATED APPLICATIONS

This application is a division of application Ser. No. 243,991, filed 4/14/72, which is a division of Ser. No. 824,153, filed 5/13/69, now U.S. Pat. No. 3,700,519, which is a continuation-in-part of application Ser. No. 577,035, filed 9/2/66, now U.S. Pat. No. 3,507,412, which is a continuation-in-part of application Ser. No. 387,372, filed 8/4/64, now abandoned.

The invention relates to improvements in methods and apparatus for making substantially rigid, fiber reinforced plastic pipe.

A primary object of the invention is to provide a system for automatically and continuously making fiber reinforced plastic pipe under controlled conditions to thereby furnish pipe of uniform thickness having a uniform amount of reinforcing material and resin at all points around its circumference and throughout its length.

Another object of the invention is to provide an automatic, continuous system for fabricating fiber reinforced plastic pipe wherein the means for continuously advancing the pipe being generated through the system constitutes a fluid or air under pressure.

A further object of the invention is to provide an automatic, continuous system for fabricating pipe of the type under consideration wherein a single source of power acts to rotate the pipe assembly being fabricated and to operate various devices serving to incorporate material into the pipe assembly as it is generated and is combined with the air pressure means acting to longitudinally advance the pipe assembly through the system.

Another object of the invention is to provide a method and apparatus for the automatic and continuous manufacture of pipe which includes providing a conveyor tube acting as a base for the assembly thereon of the various elements which will constitute the finished pipe, wherein the conveyor tube is constructed to include means permitting the conveyor tube to be readily stripped from the completed pipe assembly.

To realize the foregoing objectives with regard to an automatic and continuous system for making pipe, a number of novel devices are provided which, while they are particularly suitable parts of the system are also suitable for other applications or uses. Accordingly, another object of the invention is to provide novel means for controlling and synchronizing the linear advancement of a cylindrical endless tube or pipe in relation to the rate of rotation of the cylindrical body.

Still another object of the invention is to provide novel means for helically applying a band of parallel arranged continuous fiber elements to an advancing hollow tubular member and the coat the fiber elements as they are being applied.

Still a further object of the invention is to provide a belt system of a novel construction which is adapted to enable the formation thereon of a tube made essentially from a resinous composition.

Another object of the invention is to provide an improved device for coating a continuously advancing strip or sheet.

Still another object of the invention is to provide plug means insertable in a fluid or air filled pipe or the like which affords suitable gripping of the pipe and a seal preventing the loss of pressure within the pipe, the plug seal means being constructed so that when it is unclamped from the pipe the fluid under pressure is vented prior to the device releasing its grip on the pipe.

Still a further object of the invention is to provide an inflatable sealing device arranged to grip the interior of a moving pipe assembly for movement therewith, means being provided to return the device to inactive position when deflated for reactivation and movement with the pipe.

BRIEF DESCRIPTION OF THE DRAWINGS

These, and other objects and advantages of the invention will be apparent from the following description, taken in conjunction with the drawings illustrating several preferred embodiments of the invention, in which:

FIGS. 1, 1A and 1B together are a schematic showing of a continuous system for making pipe in accordance with one embodiment of the invention;

FIGS. 4–4D taken together are a longitudinal cross-sectional view of the mandrel and its associated parts;

FIG. 10 is a front elevational view of means for coating a strip to be wound upon the mandrel to provide a conveyor tube component of a pipe assembly which in one embodiment of the invention becomes an integral part of the finished product;

FIG. 11 is a side elevational view looking toward the right side of the device shown in FIG. 10;

FIG. 11A is a partial plan view showing the manner in which a resin composition is applied to a carrier strip by the device shown in FIGS. 10 and 11;

FIG. 11B is a side elevational view of the elements shown in FIG. 11A;

FIG. 14 is a front elevational view of a winding head;

FIG. 15 is a side elevational view, partly in section, looking in the direction of the arrows 15—15 of FIG. 14;

FIG. 27 is a longitudinal cross-sectional view, partly in elevation, showing inflatable means cooperative with the fabricated pipe assembly to prevent the loss of fluid or air pressure within the pipe assembly when a section of the continuously fabricated pipe assembly is cut off;

FIG. 28 is a view similar to FIG. 27, except that a fluid seal plug is shown positioned in the forward end of the continuously fabricated pipe assembly, whereupon the inflatable fluid sealing means cooperative with the pipe as shown in FIG. 27 is not exercising its function;

FIG. 29 is a vertical cross-sectional view taken approximately in the plane of line 29—29 of FIG. 27;

FIG. 30 is a vertical cross-sectional view taken approximately in the plane of line 30—30 of FIG. 27;

FIG. 31 is a vertical cross-sectional view taken approximately in the plane of line 31—31 of FIG. 27;

FIG. 35 is a breakaway showing of pipe which may be made with the apparatus shown in FIGS. 1–34;

FIG. 35A is an enlarged section taken in the plane of line 35A—35A of FIG. 35;

FIGS. 39 and 39A together are a side elevational view, partly broken away and in section, showing the relationship of the means for applying several of the components of the removable conveyor tube to the mandrel;

FIG. 40 is an elevational view partly in cross-section looking in the direction of the arrows 40—40 of FIG. 39;

FIG. 41 is an elevational view partly in cross-section looking in the direction of the arrows 41—41 of FIG. 39;

FIG. 47 is an enlarged cross-sectional view taken through the formed pipe and mandrel structure of FIG. 46.

SUMMARY OF THE INVENTION

Figure 2:
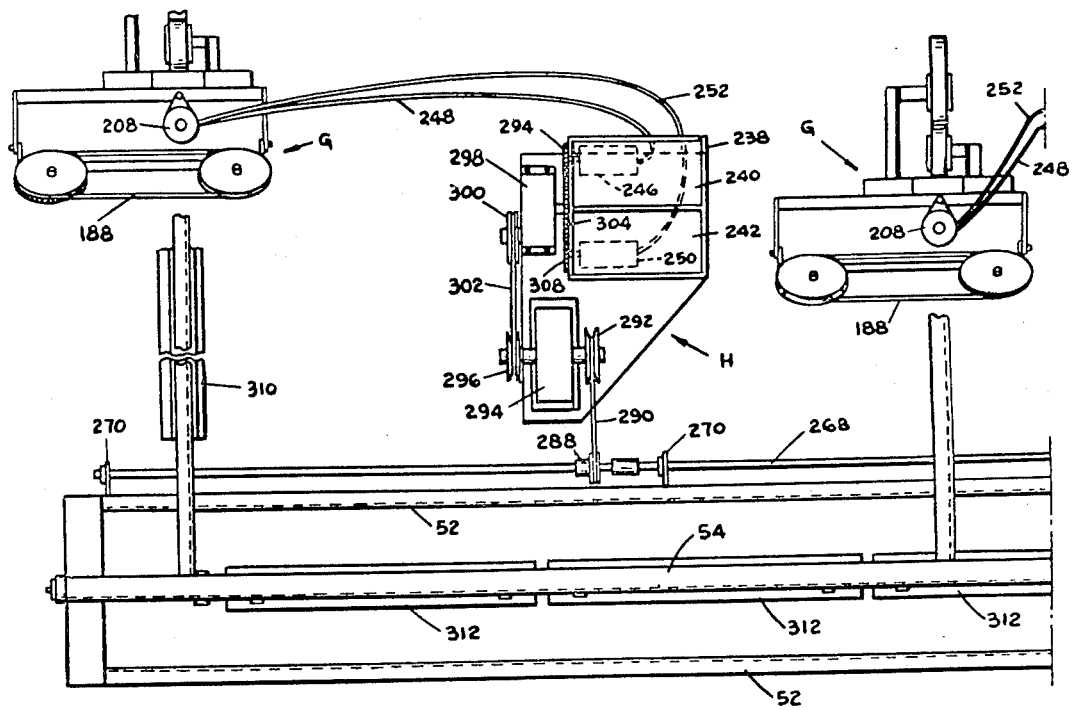
FIGS. 2–2E together represent a top plan view of apparatus for making pipe in accordance with the embodiment of the invention schematically illustrated in FIG. 1.

In accordance with the invention generally, substantially rigid, fiber reinforced plastic pipe is made automatically and continuously with a minimum of power requirements considering the mass of the materials (glass, resin, etc.) being processed and conveyed through the line. This is accomplished by utilizing a fluid or air under pressure to furnish an axially or longitudinally directed thrust to linearly advance the pipe assembly being fabricated. Such manner of using air pressure furnishes a component of force in a radial or circumferential direction with respect to the pipe assembly being advanced by such application of pressure, which assists in the various operations wherein materials are being drawn off and circumferentially wound into the pipe assembly.

DESCRIPTION OF THE PREFERRED EMBODIMENT

Referring to FIGS. 1, 1A and 1B, the method of the invention generally comprises providing an air impervious tube T on an axially fixed, hollow, rotatable mandrel which is generally designated A. The mandrel is provided on the exterior thereof with means B to furnish an air seal with the interior of the conveyor tube as the conveyor tube is advanced over the mandrel. A plurality of bands $a$ and $b$ of resin impregnated continuous fiber elements are wound onto the conveyor tube T to provide a pipe assembly P (FIGS. 35 and 35A). The pipe assembly is rotated as the pipe assembly is continuously advanced through the apparatus. Air under pressure is directed through the mandrel and out from the forward end 50 thereof into the interior of the pipe assembly as the assembly is being generated. The forward end of the pipe assembly is closed off by an end closure or plug seal means C so that the pipe assembly, together with the seal portion B of the mandrel and the plug seal means, provide a sealed chamber. The air under pressure within the sealed chamber imparts an axially directed thrust to advance the pipe assembly. In effect, the sealed chamber is expanded axially or longitudinally as the air under pressure acts to impart forward movement to the processed pipe. To synchronize and control the various operations involved in fabricating the pipe assembly, means D is provided for controlling the rate of linear advancement of the pipe assembly.

In greater detail, FIGS. 2–2E and FIGS. 3–3E illustrate apparatus for the continuous manufacture of pipe in accordance with one preferred embodiment of the invention. The apparatus is provided with a frame structure comprising transversely spaced, longitudinally extending lower support members 52 and a central, longitudinally extending upper support member 54 secured together by frame members 56 in any suitable manner as by bolting or welding. The frame stucture provides means for supporting one end of the mandrel A.

The mandrel A comprises means for furnishing a number of purposes and functions as will subsequently appear, and includes a cylindrical, hollow tube 57 which is fixed against axial movement and mounted for rotation. This tube portion of the mandrel provides the means for conveying air under pressure to linearly advance the pipe assembly as it is fabricated and to support a plurality of means for the processing of several elements incorporated in the pipe assembly. The tube 57 is of a structurally rigid material such as stainless steel. At the beginning of the line, means is provided for journaling one end of the tube and to provide means for directing fluid or air under pressure axially through its interior and out from the forward or opposite end 50.

Referring to FIG. 4, a stationary coupling member 58 is provided and held to prevent its rotation in any suitable manner. The rear end of the tube 57 is rotatably supported within the interior or central bore 60 of the stationary coupling member for a portion of the member's length. Also positioned within the bore 60 is a rotary coupling 62 having a portion 64 of reduced diameter which is received within the interior of the tube 57 with a close fit. The tube and the rotary coupling are connected to one another for rotation together by a roll pin 66. The portion 68 of the rotary coupling having a larger diameter is of a diameter slightly less than the diameter of the bore 60 of the stationary member. O-Rings 70 and 72 provide fluid or air sealing means between the rotary coupling and the associated stationary coupling member, and between the tube and the stationary coupling member. The rotary coupling 62 is held within the stationary coupling member 58 by a bolt 74 and a washer 76 at one end and at the other end by a collar 78 which is secured to the tube 57 by a cap screw 80. By the described arrangement, the tube 57 and the rotary coupling connected thereto are mounted for rotation together. Axial longitudinal movement of the tube 57 is prevented by a collar 73 secured to the tube by a set screw 75, the collar abutting a pillow block 77 bolted to a plate 79 which is fixed to the standard 56.

As also shown in FIG. 4, means is provided for directing air under pressure axially through the interior of the tube 57 so that the air may be confined and pass through the tube and out from the forward end 50 of the mandrel, which opens into the pipe assembly as the assembly is being fabricated. The stationary coupling member 58 is provided with a threaded opening 82 extending through the wall thereof within which there is screwed a fitting 84 connected to a suitable source of compressed air (not shown). In order that the compressed air may have access to the interior of the hollow tube, the stationary coupling member is provided with a section 86 of increased inner diameter adjacent the opening 82 and adjacent the outer wall of the mandrel. Also, the wall of the tube is provided with a series of circumferentially spaced orifaces 88 adjacent the section 86 to place the interior of the mandrel in communication with the line to the source of compressed air.

As also shown in FIG. 4, a second line for conveying air under pressure is provided. The stationary coupling member 58 is provided with a second opening 90 extending through the wall thereof to receive a second fitting 92 connected to a source of compressed air (not shown). The rotary coupling 62 is provided with a diametrically extending channel 94 to place the central bore 96 of the rotary coupling in communication with the second air line. A second tube 98 of substantially smaller diameter than the inner diameter of the tube 57 extends throughout the length thereof and beyond to convey the air under pressure from the second source to inflatable means E (FIGS. 1B and FIGS. 21–28) having the purpose and function to be subsequently described. One end of the tube 98 is force-fitted or otherwise secured within the bore of a hollow connecting member 100, the opposite end of the connecting member being suitably secured within the bore 96 of the rotary coupling 62. As shown, such connection may be accomplished by providing mating tapered portions on the rotary coupling head and on the tube connecting member and force-fitting the parts. By the described arrangement, the air line or tube 98 is connected for rotation with the rotary coupling and with the tube 57 through which it extends.

In the embodiment of the invention illustrated in FIGS. 1, 1A and 1B, and FIGS. 2–3E, the air impervious conveyor tube T is a resin liner which becomes an integrated part of the completed pipe assembly. Accordingly, the mandrel A is provided with means permitting the formation of a tubular resin liner while allowing this form of conveyor tube to be rotated and advanced with respect to the mandrel without adhering to the mandrel. Such means, designated F, is illustrated schematically in FIG. 1 and structurally in FIGS. 4A, 4B, 4C, 4D and FIGS. 5–9.

Essentially, the means F comprises a system of flexible, endless belts made of or comprising a flexible material coated with a mold release material. Examples of suitable mold release materials or materials to which a wet, sticky resin composition will not adhere are a tetrafluoroethylene polymer (Teflon), polypropylene, or the like. The belts, which are not powered, are arranged to rotate with the mandrel and to travel longitudinally with their longitudinal edges slightly overlapping to, in effect, provide a continuous, longitudinally movable tube. Whatever longitudinal movement is imparted to the belts is caused by the linear advancement which is imparted to the pipe assembly P of which the conveyor tube is a part.

Figure 6:
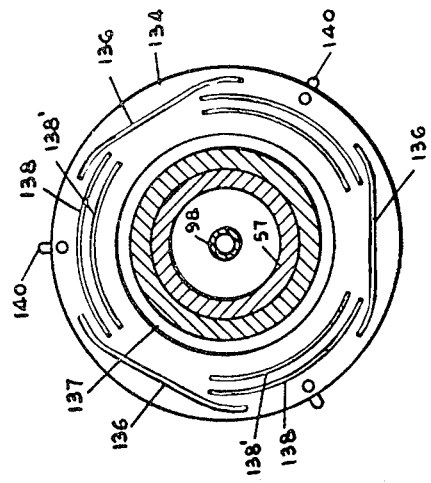
FIG. 6 is an elevational view partly in cross-section looking in the direction of the arrows 6—6 of FIG. 4A.
Figure 7:
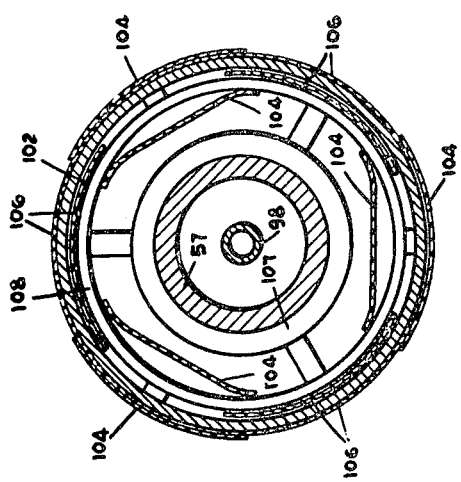
FIG. 7 is a vertical cross-sectional view taken approximately in the plane of line 7—7 of FIG. 4A.

As shown in FIGS. 4A, 4B, and 5–8, the mandrel A includes a belt support sleeve 102 over which a plurality of belts may travel longitudinally to furnish a movable tube of non-adherent material. The belts which will be referred to as the outer belts 104 and inner belts 106, have their longitudinal edges slightly overlapped as they travel over the sleeve 102 as shown in FIG. 7. The diameter of the belt support sleeve 102 is selected to furnish, with the added thickness of the belts, the inner diameter desired for the completed pipe. The belt support sleeve is connected to the tube 57 by a spider supporting member 108. The spider form of support means used here and elsewhere in connection with the belt system furnishes the desired supporting function while allowing the belts to extend and run through such form of support. The spider 108 is supported on its inner diameter by a sleeve 107 secured to the tube 57 by a set screw 109 (FIG. 4A).

Figure 4D:
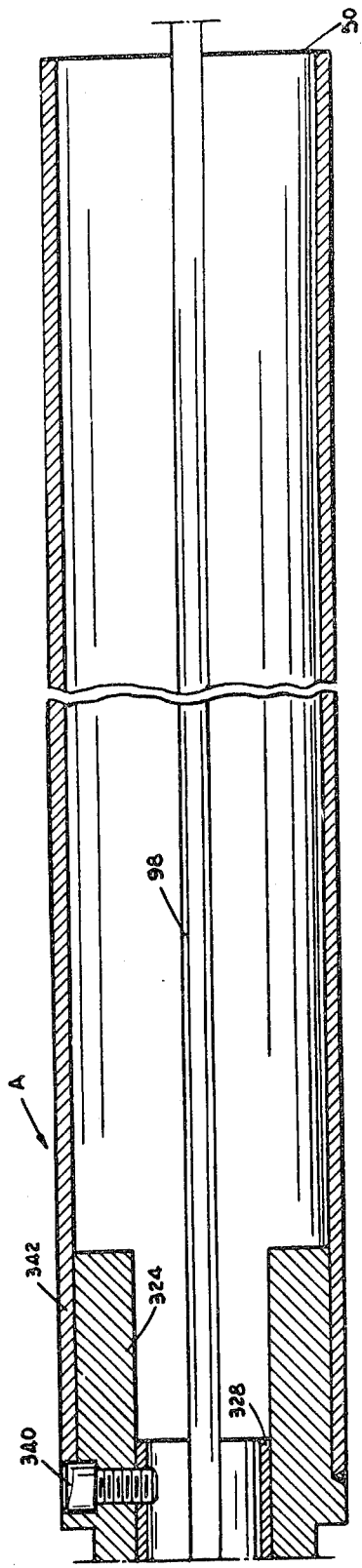
Figure 5:
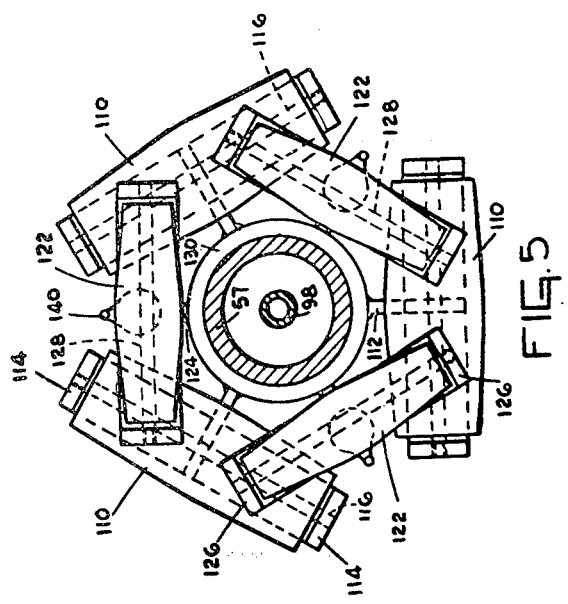
FIG. 5 is an elevational view partly in cross-section looking in the direction of the arrows 5—5 of FIG. 4A.

As shown in FIGS. 4A, 4B, and 5, the plurality of outer belts 104, here shown to be three in number, is supported so that at one end they pass around respective spaced rollers 110. The rollers are supported upon a spider assembly 112 having circumferentially spaced support arms 114 upon which the respective rollers 110 are mounted for rotation on pins 116. The spider assembly 112 is fastened to a sleeve 118 as by welding, the sleeve closely surrounding the tube 57. The sleeve and associated mounting for the rollers 110 may be adjusted along the length of the tube to the desired position and secured in place by a set screw 120 (FIG. 4A).

As shown in FIGS. 4A, 4B and 5, a similar arrangement is provided for the mounting of the inner belts 106 at one of their ends. As illustrated, the inner belts are also three in number. Rollers 122 which respectively support the inner belts are located however on a smaller diameter than the diameter prescribed by the outer belt rollers 110. The inner belt rollers 122 are mounted upon a spider assembly 124 having circumferentially spaced support arms 126 upon which the respective rollers 122 are mounted for rotation on pins 128. Similarly, the spider assembly 124 is fastened to a sleeve 130 as by welding. The sleeve which closely surrounds the tube 57 is adjustable along the length of the tube to the desired position, and is secured in place by a set screw 132 to locate the rollers 122 in desired position lengthwise of the mandrel.

As shown in FIGS. 4A and 6, guide means may be provided for the intermediate reaches of the belts, and this may be accomplished by providing a guide member 134 which, like the supporting means for the outer and inner rollers, is located rearward of the belt support sleeve 102. The guide member 134 is provided with circumferentially spaced slots 136, there being three to accommodate the three outer belts. Pairs of slots 138, 138' allow the inner belts to run therethrough and are thereby guided. The guide member 134 is maintained in fixed relationship with respect to the tube 57 by suspending it from an arm 140 extending longitudinally from the spider support 124 for the inner belt rollers.

The connection between the arm 140 and the radially extending support 124 may be made by a screw connection 142.

The opposite ends of the outer and inner belts 104 and 106 run about guide means provided by a belt return guide assembly 143 supported upon tube 57 and located down the line from the belt support sleeve 102. As shown in FIG. 4B, the largest diameter of the guide assembly 143 does not exceed the diameter of the belt support sleeve 102 so that the conveyor tube form of resin liner which will be formed on the belts may rotate and advance through the equipment without interference.

Figure 8:
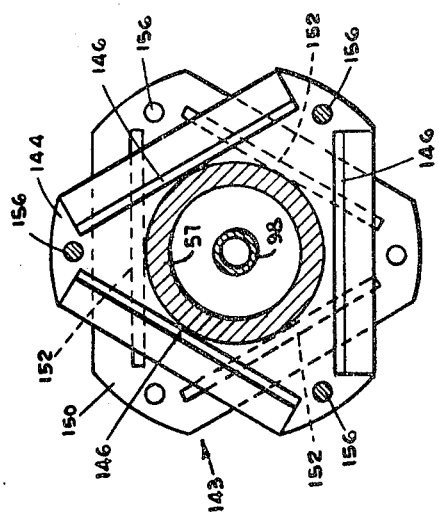
FIG. 8 is a vertical cross-sectional view taken approximately in the plane of line 8—8 of FIG. 4B.

As shown in FIGS. 4B and 8, the belt return guide assembly 143 includes an annular outer belt return guide member 144 provided with spaced slots 146 to allow passage around the smoothly rounded portions 148 and the return of the outer belts 104. The guide assembly is also provided with an annular belt return guide member 150 having spaced slots 152 for the support and return of the inner belts 106. The guide member 150 also is provided with slots 153 for guiding the outer belts which have a longer reach than the inner belts. The annular return guide members 144 and 150 surround the tube 57 but are not fastened thereto. The return guide assembly 143, of which the guide members 144 and 150 are parts, is rotatable with respect to the tube 57 to prevent torque build-up in the belt system. Accordingly, the guide members 144 and 150 are connected to each other and to a bearing sleeve 154 which closely surrounds the tube 57 but is rotatable with respect thereto. A plurality of longitudinally extending, circumferentially spaced fork members 156 are connected to and extend rearwardly from a bearing sleeve 154 to connect the guide members 144 and 150 to one another and to the bearing sleeve. The parts are connected to one another in any suitable manner as by welding. The fork members possess the additional function of providing guide means for the outer belt, and if desired, a fork member 158 may be paired with each fork member 156 for the guiding function. The second fork member of a pair need not extend to the guide member 150 for connection thereto, sufficient structural strength being provided by the several fork members 156 which bridge the guide members and the bearing sleeve.

As also shown in FIG. 4B, the bearing sleeve 154, though rotatable with respect to the tube portion 57 of the mandrel, is mounted on the tube in a manner to limit its movement in a longitudinal direction. For this purpose, a collar 160 is positioned on the tube 57 and set in the desired position by means of a set screw 163. A washer 164 is positioned intermediate the bearing sleeve and the collar. Thus, the collar and the guide assembly 143 cannot move rearwardly on the tube and impart undesirable slack to the belt system after the collar has been properly positioned on the tube.

As will be evident from FIGS. 4A and 4B, the outer and inner belts 104 and 106, after passing over the support sleeve 102, return through its interior. To further assist in guiding the belts, a guide ring 166 is positioned intermediate the support sleeve and the tube 57. Both the outer and inner belts run over the outer periphery of the guide ring which is held between collars 168, 168'. The collars are provided with respective set screws 170, 170' so that the guide ring may be located in desired position along the length of tube 57.

Figure 9:
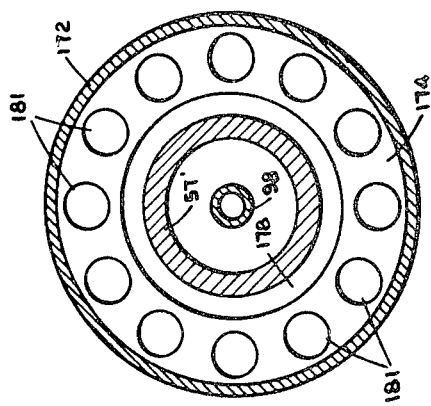
FIG. 9 is a vertical cross-sectional view taken approximately in the plane of line 9—9 of FIG. 4B.

In order that the resin liner form of conveyor tube T formed on the sleeve supported flexible belts may be suitably supported and engaged by the aforementioned seal means B, the mandrel A includes a second sleeve 172 down the line from the belt support sleeve 102. As shown in FIGS. 4B and 4C, the sleeve 172 having a diameter to allow slight clearance with respect to the conveyor tube which will advance over it surrounds the tube 57. Although the tube 57 may be continued through the sleeve 172, for convenience of assembly the sleeve 172 is provided with an inner support ring 174 which may be connected to the sleeve 172 as by countersunk screws 176. The inner diameter of the support ring is connected to a coupling sleeve 178 fixed to the tube 57 by a set screw 179. A tube 57' constituting a continuation of tube 57 is screw threaded to the coupling sleeve 178. The support ring 174 is formed with spaced apertures 181 to allow any air which may escape rearwardly of the seal at B to be vented (FIGS. 4B and 9). As will be subsequently described, the inner seal means B provided by the mandrel is supported by and connected to the tube 57' and the sleeve 172.

Figure 3:
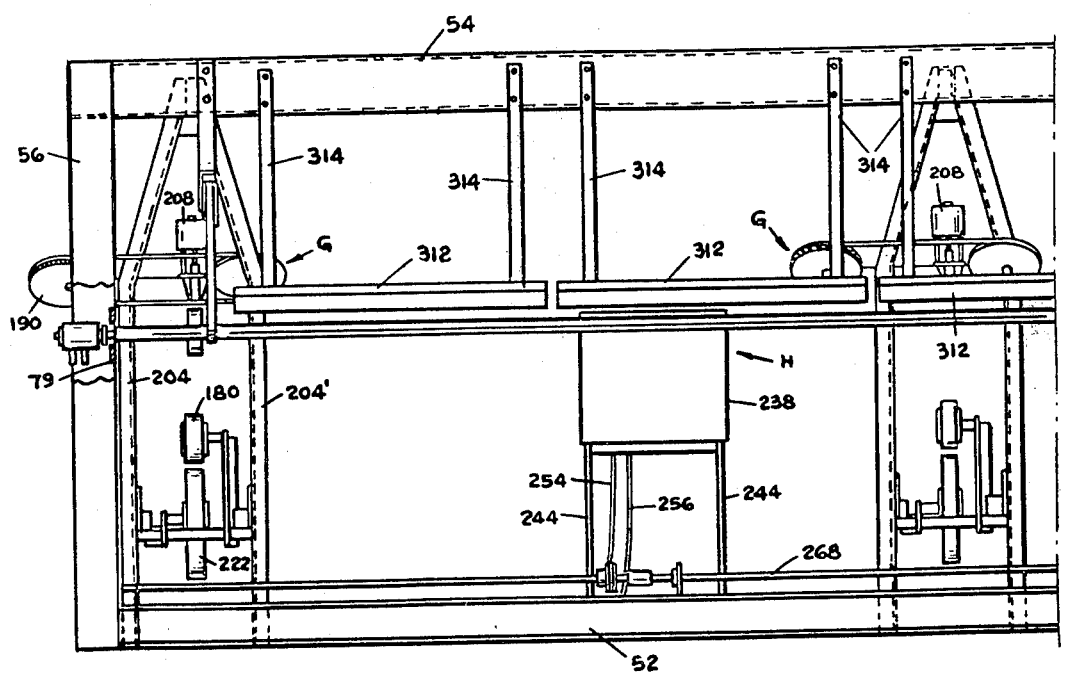
FIGS. 3–3E are a side elevational view of the apparatus shown in FIGS. 2–2E.

To supply the resin c (FIGS. 35 and 35A) which will furnish the air impervious conveyor tube T and constitute an integrated part of the finished pipe assembly, means G is provided as shown in FIGS. 2 and 3, and in greater detail in FIGS. 10, 11, 11A and 11B. It is preferred to use thermosetting resin compositions; for example, an epoxy resin composition with a suitable hardener or curing agent, polyester resins, or the like. While the resin composition may be applied directly in liquid form to the described belt system, it is preferred that the resin composition be applied on a carrier strip $d$ which is helically wound onto the belts. Two coating devices G are shown. It is within the scope of the invention to use but one device. Two devices are used where it is desired to obtain a resin liner of substantial thickness. The devices G are identical and the description which follows of one such device is equally applicable to the other.

The resin $c$ is applied to a highly absorbent and porous strip of material $d$. The strip material is preferably 12 pound tissue paper having a width of approximately 1 inch. As shown in FIGS. 10 and 11, the absorbent tape or strip $d$ is withdrawn from a roll 180, led around a guide pin 182 and around a guide roll 184 provided with suitable means for adjusting tension as is known in the art. The strip then runs horizontally over a guide pin 186 immediately rearward of an endless doctor blade 188 which is mounted for continuous movement transversely of or over and across the path of the horizontally moving strip $d$. The doctor blade, which is in the form of a thin continuous band of steel, is mounted to pass around a pair of longitudinally spaced grooved wheels 190, 190'. To power the movement of the doctor blade band, one of the wheels, the wheel 190, has fixed to the rear thereof a gear 192 which is rotated by a gear 193 secured to the shaft of a fractional horsepower motor 194 connected to a suitable source of current (not shown). The gear ratios are selected to rotate the wheel 190 and thereby the doctor blade band 188 around such wheel and the opposite idler wheel at a desired regulated and constant speed.

As also shown in FIGS. 10 and 11, the doctor blade band wheels 190, 190' and the doctor blade band 188 are supported in a manner to enable the adjustment of the angle of the band with respect to the strip to be coated. Also, means is provided for the adjustment of tension upon the doctor blade band.

The band support wheels 190, 190' are mounted for rotation on bearings within the respective wheels on shafts extending into support plate 196. The support plate is secured within a U-shaped frame 197 of a thickness sufficient to allow pivot pins to be extended into its sides. The plate and frame assembly is pivotally connected at each side by threaded pivot pins 198, 198' to longitudinally spaced brackets 200, 200' which are fixed, as by welding, to a cross frame member 202 secured to extend between and to one side of a pair of longitudinally spaced frame standards 204, 204'. As shown in FIG. 10, the support plate 196 and its associated frame 197 is generally U-shaped to allow passage of the continuous strip or tape $d$ over the base portion and between the arm portions of the assembly. The support plate and its frame are tiltable about the pivot pins 198, 198' to enable adjustment of the angle of the band 188 with respect to the plane of the strip $d$ as it is drawn off the roll 180 under controlled tension and guided by the aforementioned guide pins. Then, the support member is releasably secured in position as by wing nuts associated with the pivot pins. In this manner, the amount of resin applied to the strip may be adjusted at the nip between the travelling doctor blade and the moving strip (FIG. 11B) for predetermined rates of movement of the doctor band and of the strip. Means including a screw 206 is provided for adjusting the tension upon the doctor blade band, such adjustment screw being associated with the bearing for one of the doctor band wheels which is mounted in a manner to permit the axis of rotation of doctor band wheel 190' to be moved toward or away from the axis of rotation of the other doctor band wheel.

The liquid resinous material of a suitable viscosity is applied to the moving strip $d$ in any desired manner. It is preferred, however, and as shown in FIGS. 10–11B, to meter the resin composition onto the strip from an applicator mixer 208 which, when an epoxy resin composition is used, mixes and meters a controlled amount of resin and hardener in desired proportions onto the strip. The mixer applicator or dispenser is operated by a fractional horse power motor connected to a suitable source of current (not shown). The liquid resinous composition is applied to the strip in the form of a stripe 210, as shown in FIG. 11A. As shown in FIG. 11, the mixer applicator is supported upon a bracket 212 terminating in a hub 214 mounted for vertical adjustment upon the guide rod 216 to thereby permit adjustment of the mixer applicator with respect to the strip $d$. When the strip moves under the band form of doctor blade 188, the resin composition is spread across the width of the strip for a predetermined thickness determined by the angle of the doctor blade band, the rates of movement of the doctor blade band and the strip, and the selected rate of deposition upon the strip of the liquid resin composition by the mixer applicator. To assure that the doctor blade band is maintained in a clean condition after having served to spread the liquid resin composition across the width of the moving strip, a heater 218 positioned to surround the doctor blade band is mounted upon a bracket 220 fastened to the support member 196, as shown in FIG. 10. Preferably, an electric coil type of heater is used connected to a suitable source of current (not shown), the heater acting to burn off any resinous material which may adhere to the smooth surface of the doctor blade band.

In order that the device G shall not require that its operation be stopped when a roll of strip material is exhausted, a second or ready roll 222 is provided to replace the exhausted roll 180. As also shown in FIGS. 10 and 11, one roll, the roll 180, is mounted upon a spindle 224 connected to the top end of a rocker arm 226 pivotally connected at its lower end to a shaft 228 extending between the spaced standards 204, 204'. The spindle is provided with the usual spaced plates to confine a roll of the strip material or tape between them. An arcuate member 230 is secured at one end to the rocker arm 226, the arcuate member being provided with a series of spaced apertures 232. A pin 234 is extended through the adjacent standard and through a selected aperture 232 in the arcuate member 230 to thereby furnish adjustability to the desired angular position for a roll of strip material. A similar arrangement is provided for the second roll 222 which is mounted for adjustment to desired position on like numbered parts with respect to the opposite standard. As will be evident from FIG. 10, when a roll of strip material or tape is about to be exhausted, the depleted roll may be pivoted around behind the ready roll which is moved into feeding position after splicing. Then, a new roll of strip material is placed in the ready position.

Where, as preferred, an epoxy resin composition is used to furnish the resin for a liner form of conveyor tube T, the same means for rotating the pipe assembly of which the conveyor tube T is a part may be used to synchronously pump desired amounts of resin and of hardener in regulated proportions to the mixer 208. For this purpose, means H is associated with a coating device G. Where two coating devices are used, there is one resin and hardener supply means for each coating device.

As shown in FIGS. 2, 2A, 3 and 3A, a tank 238 is compartmentized to contain an epoxy resin composition in one compartment 240 and a hardener composition in the other compartment 242. As shown, the tank is supported on legs 244 so that the tank may be located adjacent one of the longitudinally extending base frame members 52. A pump 246 is provided to convey resin from the compartment 240 to the mixer applicator 208 through a hose 248 and a second pump 250 delivers the hardener composition to the mixer through a hose 252. A hose 254 extends between the resin pump 246 and the resin compartment and another hose 256 extends between the hardener compartment and its associated pump 250.

Figure 2A:
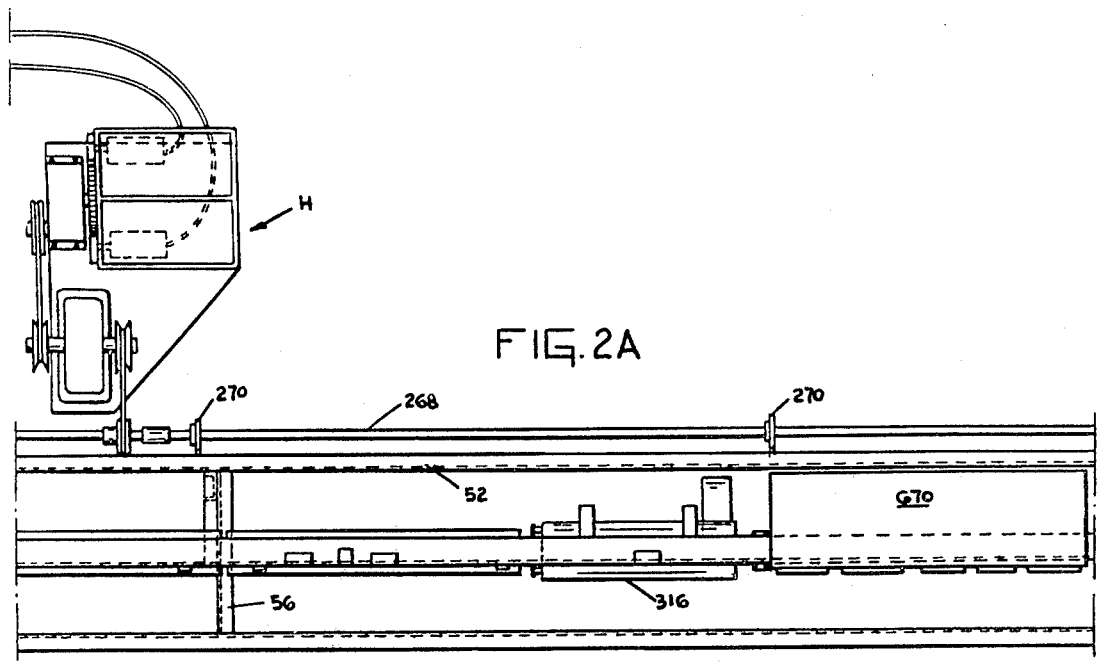
Figure 3A:
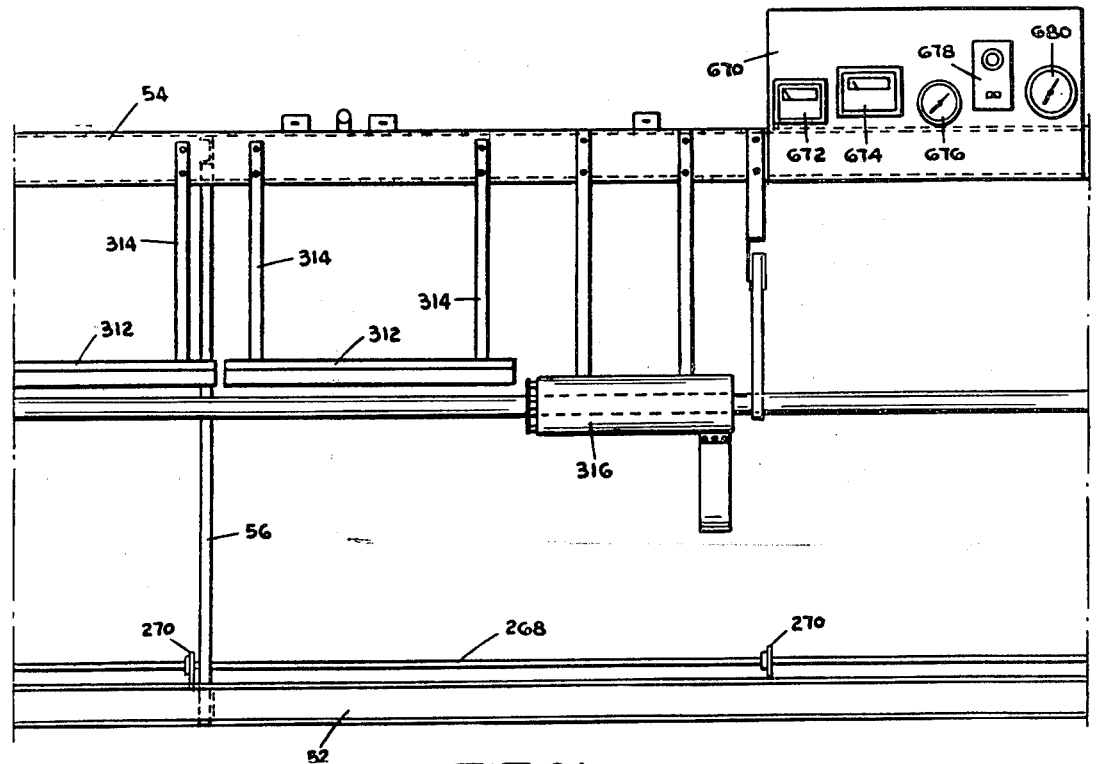

Preferably, the pumps 246 and 250 are operated by the same motor which operates the winding heads designated I (FIGS. 2B, 2C, 3B and 3C), which are located forward in the line to helically wind bands of fiber elements b into the pipe assembly P. The single motor for operating the pumps, the winding heads I, also the aforementioned means D for controlling the rate of linear movement of the pipe assembly, is shown in FIGS. 2D and 3D and is designated 258. For example, when making two inch diameter pipe, and in conjunction with air pressure as herein applied, the motor may be only approximately ½ H.P. Air pressure in the main air line provided by the tube 57 and its extensions is approximately 40 p.s.i. For 3, 4 and 6 inch diameter pipe, the horsepower of the motor and the air pressure are of course increased.

As shown in FIGS. 2D and 3D, the shaft of the motor 258 is provided with a pulley 260 about which passes a belt 262 cooperable with a pulley 264 fixed to a driving shaft 266. The motor is supported upon a bracket 268 secured to a frame member 56'. The driving shaft extends forwardly of the machine for cooperation with the linear advance control means D (FIGS. 2E and 3E). The driving shaft, which is journaled to extend through longitudinally spaced pillow blocks 267 secured to the longitudinally extending upper frame member 54 also extends rearwardly to the winding heads I, and through intermediate coupling means the driving shaft acts to drive a shaft 268 which operates the aforementioned pumps 246 and 250.

Figure 2B:
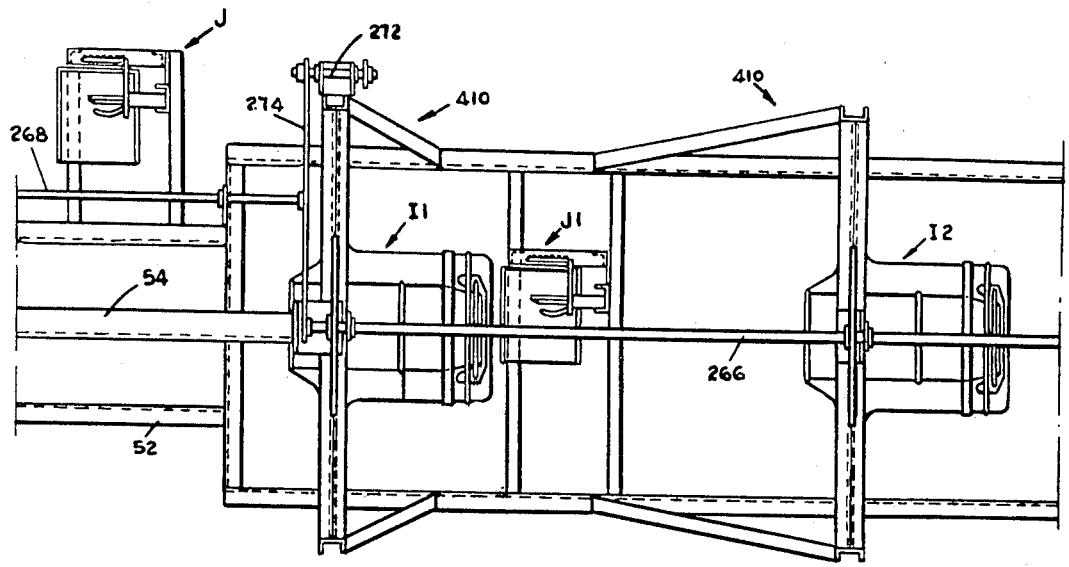
Figure 3B:
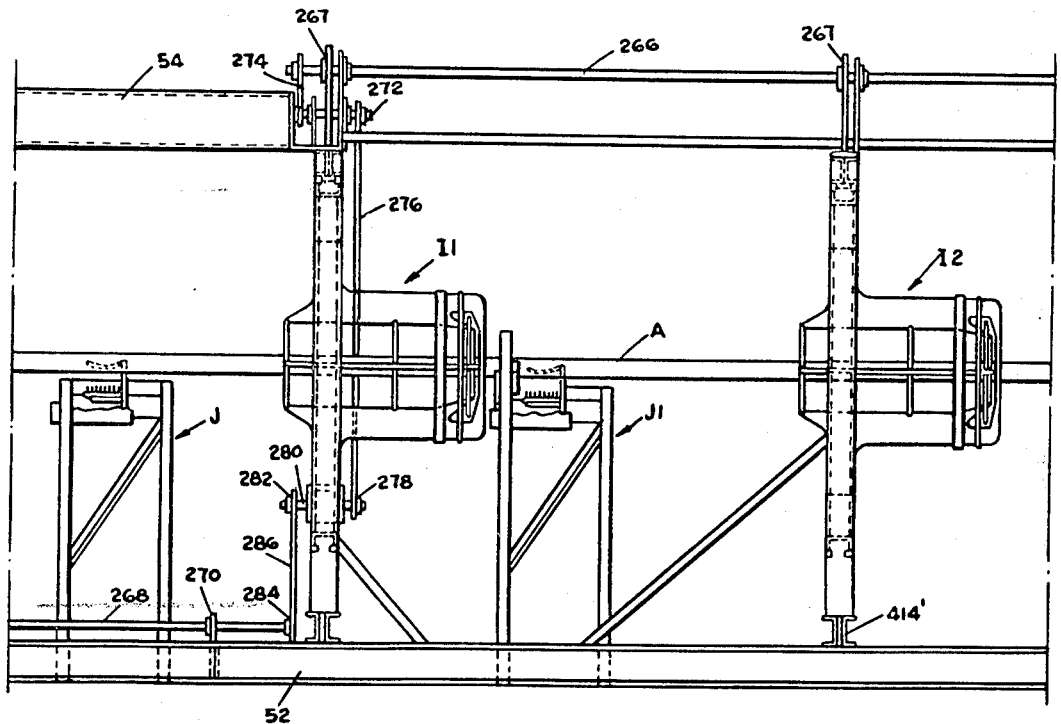
Figure 3D:
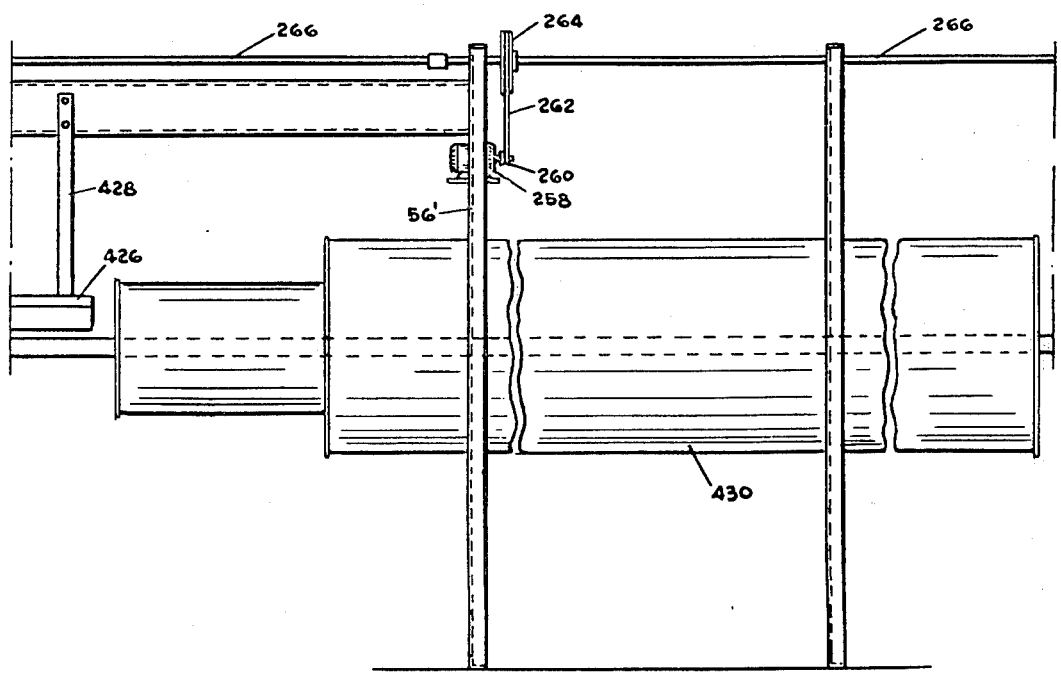
Figure 3E:
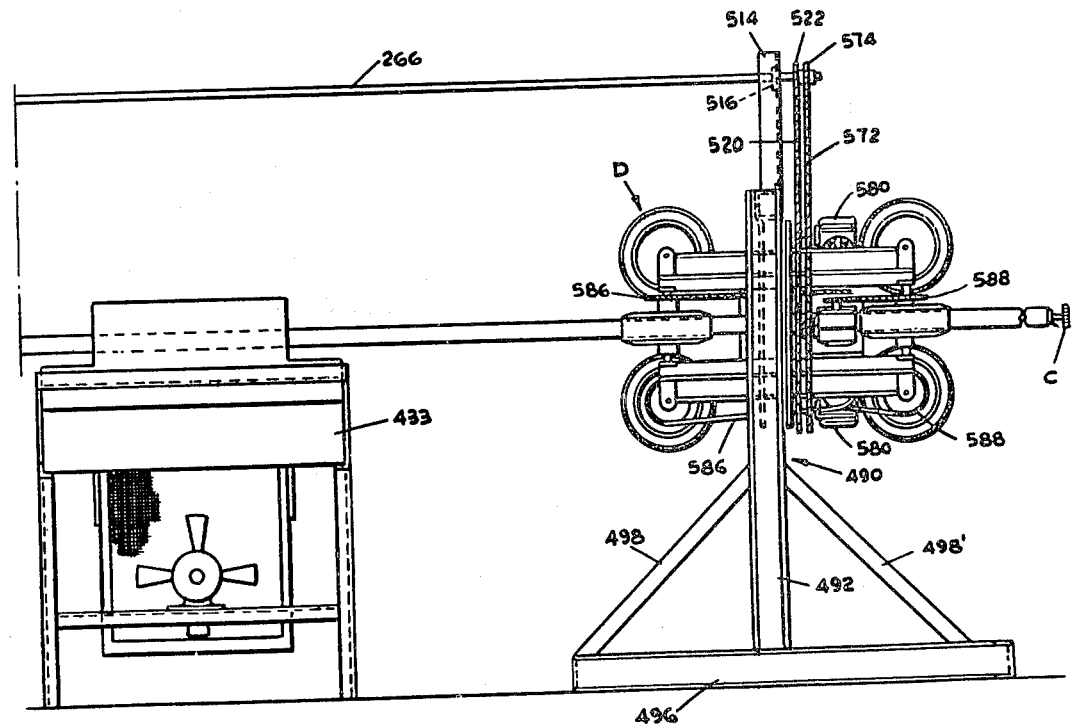

As shown in FIGS. 2B and 3B, the driving shaft 266 extends along the top of the machine and the driven shaft 268 extends along the base of the machine where the latter shaft is journaled to extend through longitudinally spaced pillow blocks 270 secured to the base frame member 52. This transfer of power from the driving shaft to the driven shaft is accomplished by a series of pulleys and belts. The end of the driving shaft 266 is provided with a pulley cooperable with a pulley on one end of a stub shaft 272, the two pulleys receiving a belt 274. The opposite end of the stub shaft is also provided with a pulley over which runs a belt 276, the belt running over a second pulley 278 on an end of a stub shaft 280 located below the stub shaft 272. The stub shaft 280 is located near the base of the machine whereas the stub shaft 272 is suitably mounted near the top of the machine. The opposite end of the stub shaft 280 is also provided with a pulley 282 cooperable with a pulley 284 on the end of the driven shaft 268, these latter two pulleys receiving a belt 286.

As shown in FIGS. 2, 2A, 3 and 3A, the driven shaft 268 is provided with a pulley 288 adjacent each device H. A belt 290 extends around the pulley and around a second pulley 292 keyed to the shaft of a speed control device 294. A shaft on the opposite side of the control device has a pulley 296 keyed thereto to operate a gear reducer 298, such gear reducer providing a shaft having a pulley 300 fixed thereto. A belt 302 extends around the pulleys 296 and 300 to actuate the gear reducer. The shaft extending through the opposite side of the gear reducer is provided with a centrally positioned gear 304 cooperating with a gear 306 for the resin pump 246, and on its opposite side with a gear 308 for the hardener composition pump 250. Thus, the motor 258 through the described drive arrangement serves to deliver resin and hardener to the mixer applicator 208 off the same driving means which actuates a number of other operations in synchronism throughout the line.

The resin c carried by the absorbent strip or strips d is helically wound onto the tubular arranged belts 104, 106 supported on the sleeve 102. The power to withdraw the strip from its roll and past the doctor blade 188 is furnished by the rotation imparted to the pipe assembly P and conveyor tube portion T thereof by the driven winding heads I up the line. Between the coating device G and the belt system provided by the mandrel, heating means 310 is provided adjacent the path of the resin composition coated strip d to cause the resin composition to pass through the porous strip material to the underside thereof, whereby the resin composition is situated on both sides of the strip. The heater 310 is shown in FIG. 2 and the resultant relationship of the resin c on each of the strips d is shown in FIG. 35A.

After the strip $d$ carrying the resin $c$ is helically wound onto the tubular arranged, adhesion resistant belts 104, 106 to form a conveyor tube essentially of resin, heat is applied to partially cure to a substantial extent the resin composition. As shown in FIGS. 2 and 3, a heater or series of heaters 312 are suspended from the central upper frame member 54 by suitable straps 314. The resin liner form of conveyor tube T, after having advanced beyond the reach of the belts, passes through a cooling device 316 and now constitutes an air impervious tube having a substantial measure of rigidity. The tubular resin liner is rotated and advanced in the machine over the aforementioned sleeve 172 where the inner surface of the resin conveyor tube is engaged by the seal means B as shown in FIG. 4C.

The fluid seal means B prevents air under pressure which is conveyed out of the end of the mandrel at 50 (FIGS. 1, 1A and 4D) from passing rearwardly of the seal means. Such seal means provides one end of a closed chamber within the pipe assembly P as the pipe assembly is generated by the apparatus, the opposite end of the closed chamber being supplied by the aforementioned plug means C which is inserted in the forward end of the advancing pipe assembly.

As shown in FIG. 4C, the seal means B is in the form of a tapered, open-ended cup-like member 318 having an annular bead 320 at its forward end, the bead being of a diameter to closely engage the inner surface of the conveyor tube T which advances thereover and rotates with respect therewith. A material suitable for furnishing the desired characteristics of providing a seal when engaged with the interior of a conveyor tube while allowing sliding and rotating motion of the conveyor tube with respect to the bead portion is rubber or a rubber-like material such as silicone rubber. As illustrated, the seal member 318 is held in position by the clamping action thereupon of a tapered outer clamping sleeve 322 and an inner clamping sleeve 324. The clamping sleeve 322 is preferably made of a tetrafluoroethylene polymer (Teflon). The inner clamping sleeve is internally threaded at 326 and matingly threaded around the outer diameter of a portion 328 of reduced diameter provided by a coupling member 330. The coupling member has a portion 332 which is received between the sleeve 172 and the air conveying tube 57'. The member 330 is made flush at its exterior with the outer surface of the sleeve 172 so that the sleeve 172, the coupling member 330 and the outer clamping sleeve 322 provide a smooth, continuous surface. The portion 332 of the coupling member 330 is formed to provide a shoulder 334 against which is seated an internal flange 336 of the outer clamping sleeve 322. The seal member 318 also has an internal flange 338 which is clamped between the flange 336 and the end of the internal clamping sleeve 324 when the latter clamping member is threaded onto the inner tubular portion 328 of the coupling member. The tubular portion 328 constitutes an extension of the air conveyor tube 57, 57'. The taper on the upper clamping sleeve 322 and the uniform thickness of the seal member 318 rearward of the bead 320 furnishes a firm but resilient mounting for the seal member's bead portion 320.

As shown in FIG. 4D, a set screw 340 is extended through the interior clamping sleeve 324 and into the tubular portion 328 of the coupling member to thereby prevent the clamping of the seal 318 from being loosened from its clamped position. As also shown in FIG. 4D, a longitudinally extending sleeve 342 is secured to the outer surface of the tubular portion 324 as by welding. The diameter of the sleeve 342 is less than the inner diameter of the conveyor tube whereby air under pressure passing through the tube 57 and its extensions 57', 328 and 342 may pass out of the end 50 and provide an air support intermediate the pipe assembly being generated and the portion of the mandrel forward of the annular bead 320 of the seal means.

As schematically shown in FIG. 1A after the conveyor tube has been provided on the mandrel, and preferably before the conveyor tube has passed beyond and over the seal means B, the tube is overwound with a layer $a$ (FIG. 35) of parallel arranged continuous fiber elements guided and impregnated with a resin composition by a device generally designated J. While the continuous elements may be of any suitable fiber, it is preferred to use rovings of glass. At the station where the first device J is located, the band of parallel arranged fiber elements is preferably applied with the fiber elements at an angle of approximately 82° to the longitudinal axis of the pipe and, as indicated in FIG. 35, there are four such layers of windings $a$, $a1$, $a2$ and $a3$ in the finished pipe alternated with three layers $b1$, $b2$ and $b3$ of fiber elements laid down at a relatively low angle of approximately 16° and of opposite hand. It will be understood, however, that the number of layers, the angles at which the fiber elements are laid into the pipe assembly, the amounts of fibrous material in the respective layers, and the amount of resin impregnant are a matter of choice depending upon the circumferential-axial strength ratio desired to provide a balanced pipe structure. The number of winding heads and devices for impregnating the fiber elements and applying layers of fiber elements wound at a relatively high angle used in the line depends upon the number of layers and the amounts of fiber and resin desired in the finished pipe.

Figure 13:
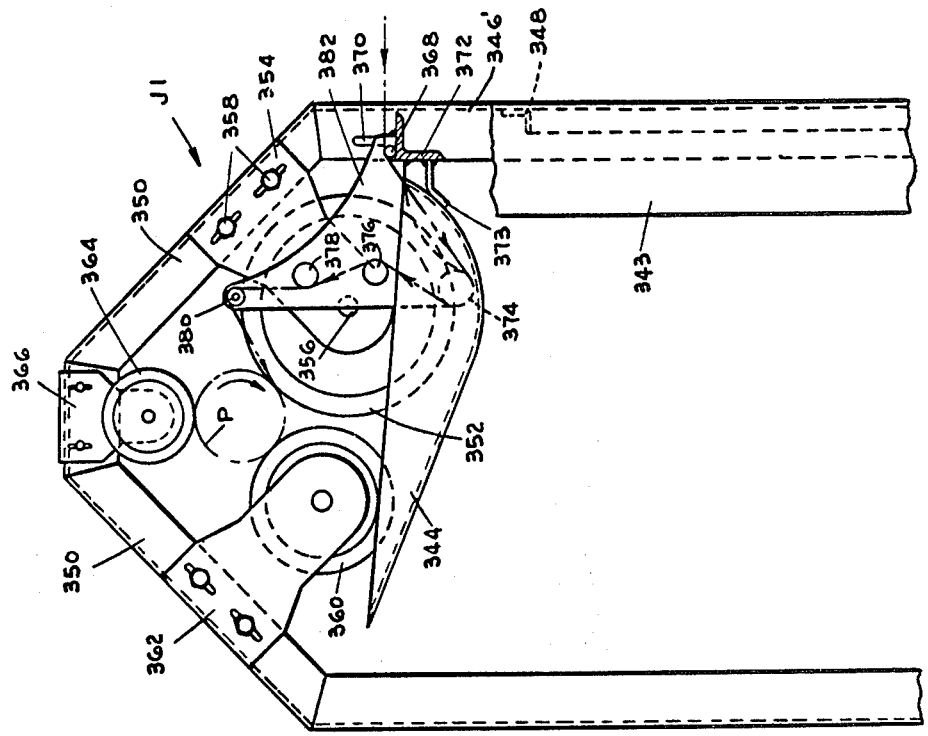
FIG. 13 is a front elevational view of the device shown in FIG. 12, this view also showing the manner in which the partially fabricated pipe assembly is supported at this station in the apparatus.
Figure 12:
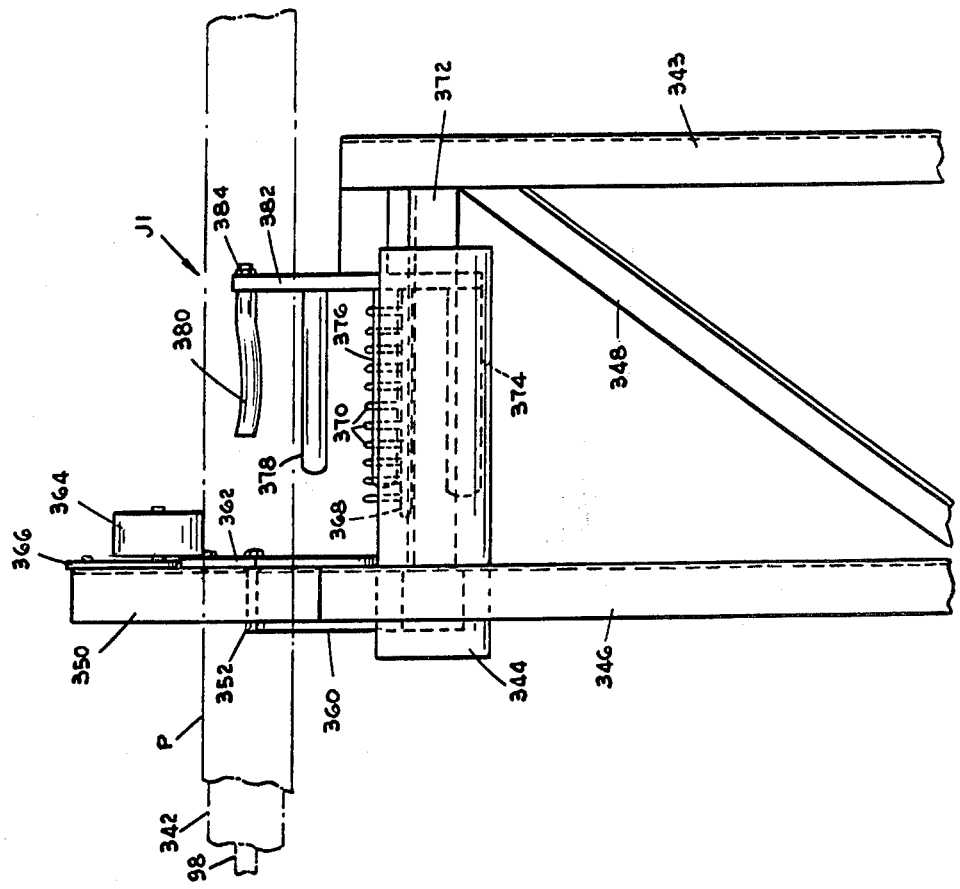
FIG. 12 is a side elevational view of means for guiding and impregnating continuous fiber elements for application to the conveyor tube in substantially circumferential windings.

Referring to FIGS. 12 and 13, the fiber element guiding and impregnating device J1 comprises a suitably supported tank or bath 344 containing a suitable liquid resin composition. A wheel supporting frame comprising a pair of transversely spaced, vertically extending frame members 346, 346' is spaced rearwardly of a guide frame member 343. An angled structural member 348 extends between the two spaced frame supporting means. The wheel frame structure also includes the converging structural members 350, 350' extending from the upper ends of transversely spaced frame members 346, 346' to provide an arch arrangement, as shown in FIG. 13.

Figure 2C:
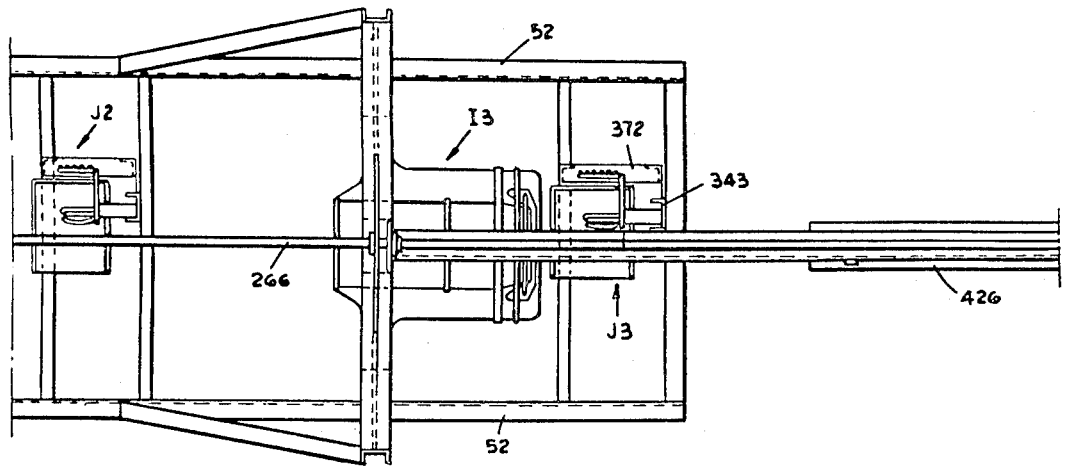
Figure 3C:
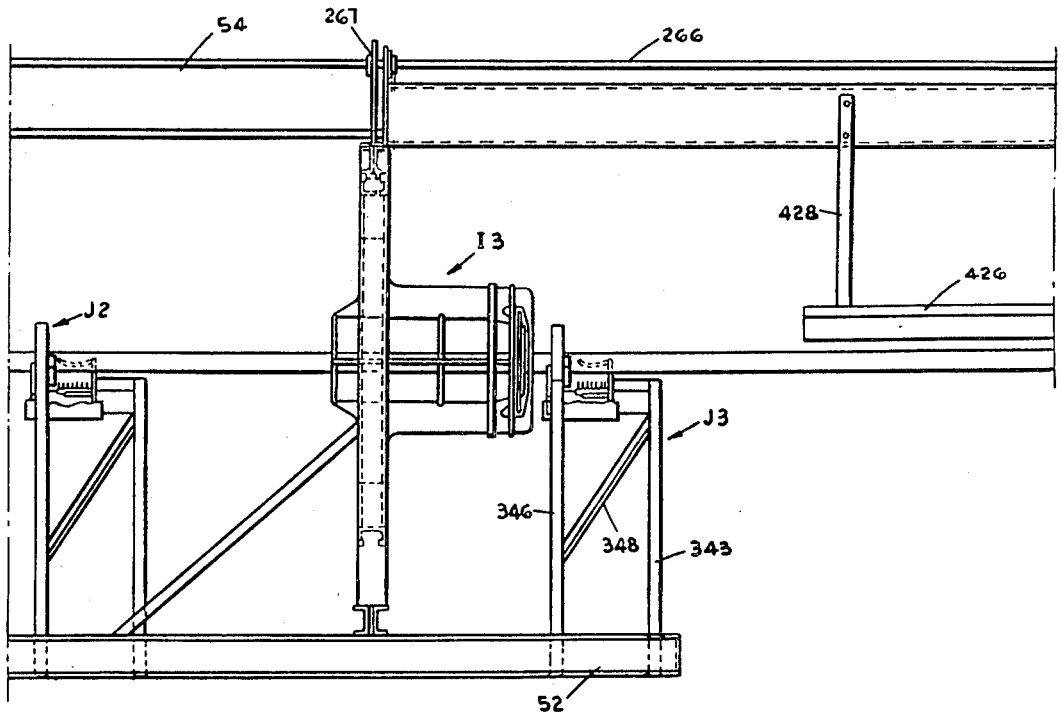
Figure 2D:
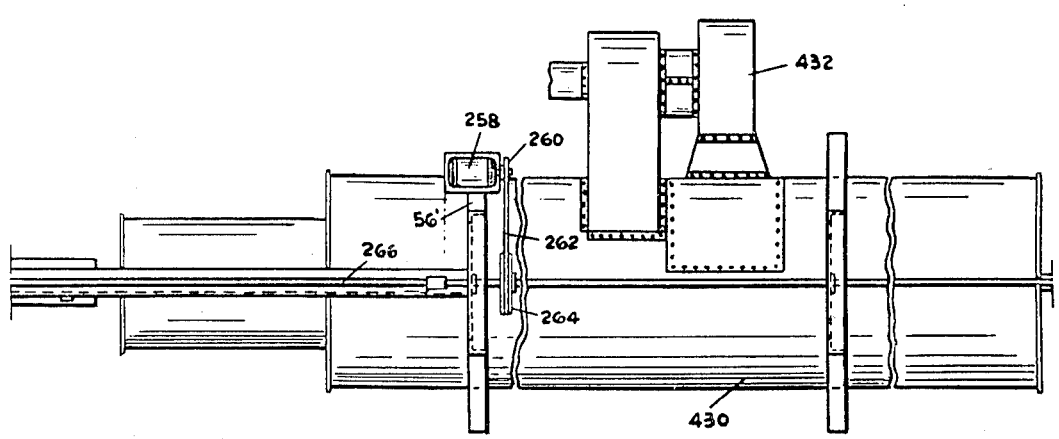
Figure 2E:
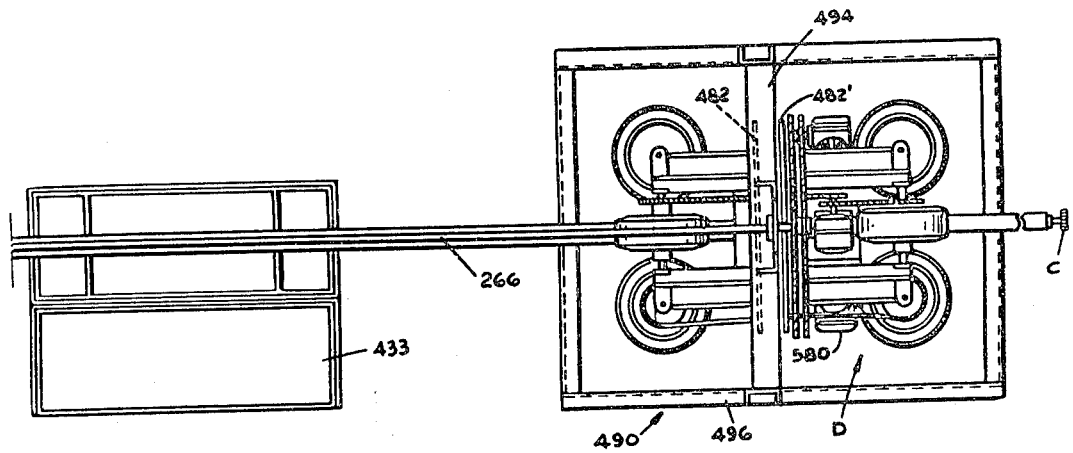

In applying the first layer $a$ of substantially circumferentially applied windings to the conveyor tube T, it is not necessary to preliminarily coat the conveyor tube. Accordingly, the first guiding and impregnating device J in the line may be located to the side of the line, as shown in FIGS. 2B and 3B, and the wheel supporting frame and the relationship of the wheels about to be described may be omitted at this station. However, a device J1 will be described to include the arrangement of wheels because the wheel arrangement has an important function when the devices J1, J2 and J3 are located immediately forward of and related to the winding heads I1, I2 and I3, respectively. As shown in FIGS. 2B and 2C, the paired devices I1–J1, I2–J2 and I3–J3 are located centrally in the line beneath and surrounding the advancing conveyor tube T having the layer $a$ thereon.

Where for the application of the first layer a of windings to the conveyor tube T, a J1 form of device is located centrally and immediately adjacent the conveyor tube being generated, the conveyor tube is supported and preliminarily coated with a resinous composition from the same bath which impregnates the fiber elements wound as the layer a onto the conveyor tube. As shown in FIGS. 12 and 13, a coating wheel 352 is suspended from the frame member 350' by an adjustably mounted bracket 354 providing an axis of rotation 356 for the wheel. The bracket is slotted to allow its adjustment with respect to the frame structure by screws 358 extending through slots in the bracket and into threaded openings in the frame member 350'. The coating wheel 352 has a portion thereof submerged within the bath 344. A support wheel 360 is journaled for rotation on a bracket 362 connected to the frame member 350 in a manner to also allow adjustment of the position of this wheel. As shown, the wheels are arranged so that the conveyor tube T is supported by the two wheels. Rotation imparted to the pipe assembly and its conveyor tube portion causes the wheels, which are not otherwise powered, to rotate whereupon the coating wheel 352 applies a resin coating to the conveyor tube. To confine the conveyor tube upon the coating and supporting wheels, a guiding wheel 364 is suspended from the frame structure to engage the rotating and advancing conveyor tube at a third point or above the areas where the tube is engaged by the wheels 352 and 360. Similarly, the wheel 364 is suspended from a bracket 366 adjustably connected to the frame structure.

As also shown in FIGS. 12 and 13, immediately adjacent the described wheel arrangement and forward thereof, means is provided for guiding and impregnating the fiber elements which are wound substantially circumferentially onto the conveyor tube. The continuous fiber elements which furnish the layers a, al, a2 and a3 are drawn off of packages which are stored in containers or the like (not shown) immediately to the side of the continuous line of equipment. The fiber elements are drawn from their sources and arranged side by side, parallel relationship by passing over a horizontally extending guide bar 368 and between upstanding longitudinally spaced guide pins 370 extending from the guide bar. The guide bar and its upstanding pins are mounted upon a horizontally extending frame member 372 fixed to extend between the vertical frame members 343 and 346'. As shown in FIG. 13, the guide bar and its pins are positioned rearwardly of the tank which is also suspended from the frame member 372 by a suitable bracket 373 secured to the tank and to the frame member. The continuous fiber elements then are conducted around a series of tensioning guide rods 374, 376, 378 and 380 arranged in vertically spaced relationship. The guide rod 374 is positioned within the tank so that the parallel arranged fiber elements passing around it are impregnated with the resin composition. The four horizontally extending vertically spaced guide rods have a common support plate 382 secured to the cross frame member 372. As shown in FIG. 12, the top support rod is curved and is removably connected to the support plate by a nut 384 to allow the presentation of either a concave or a convex surface to the impregnated band of parallel arranged fibers prior to their being wound onto the conveyor tube. Band width control is obtained by changing the orientation of the curve as provided by the adjustable guide rod in relation to the incident band. A convex surface provides a wider band and a concave surface provides a narrower band.

The coated conveyor tube now covered with a band of substantially circumferentially wound resin impregnated fiber elements then advances to the station where a layer of parallel arranged continuous fiber elements are helically wound into the assembly at a lower angle of opposite hand by the first winding head I1. The winding head is a device which supports a plurality of spools of continuous fiber elements and which rotates around the partially fabricated pipe assembly at a controlled speed acting to rotate the pipe assembly which, as it rotates, is advanced in an axial or longitudinal direction. The relative motion of the pipe assembly with respect to the winding head or heads establishes the angle that the fiber elements are wound into the pipe assembly. The relative motion between the pipe assembly and the rotating winding head causes the fiber elements to pay off the spools and cover the conveyor tube and the initial layer a of fiber element windings.

Figure 16:
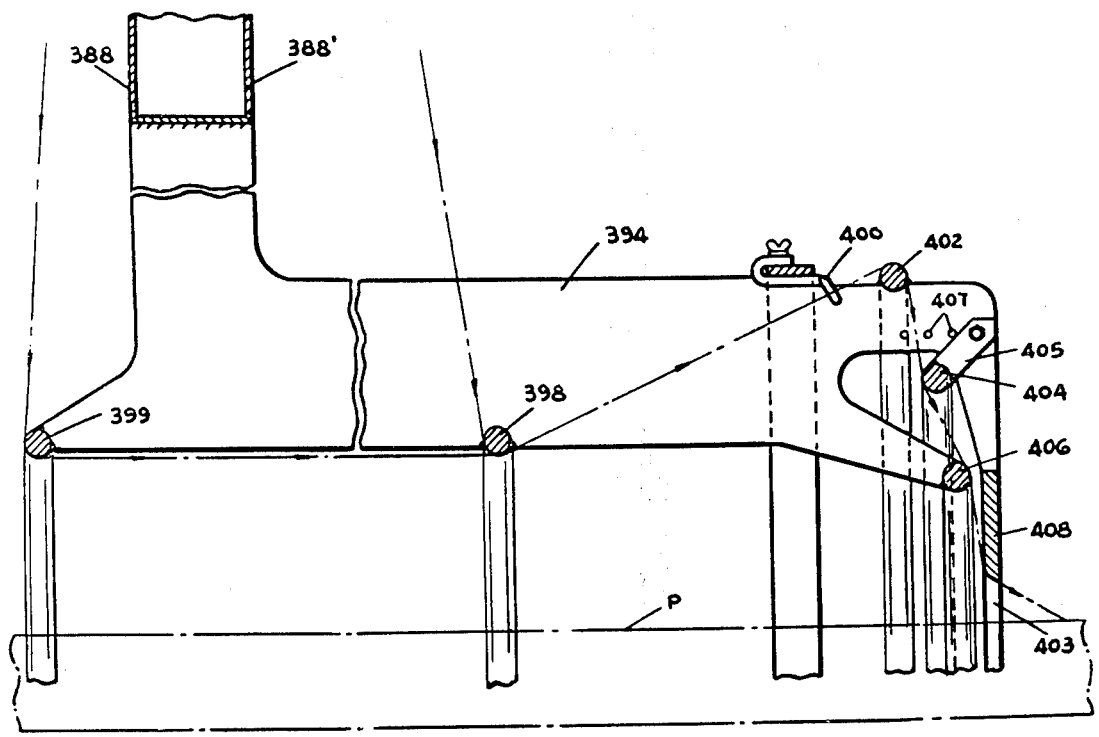
FIG. 16 is an enlarged, partial side elevational view showing the means on a winding head for guiding the continuous fiber elements onto the pipe assembly being generated.
Figure 17:
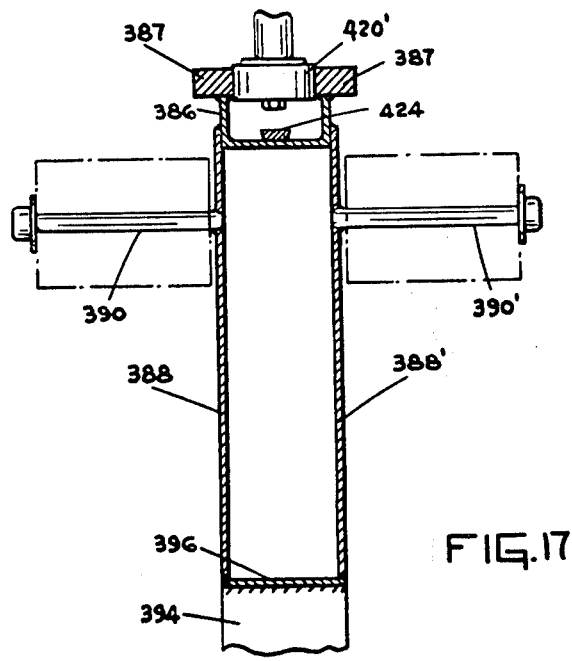
FIG. 17 is a section taken approximately in the plane of line 17—17 of FIG. 14.

As shown in FIGS. 14–17, a winding head I1 (the three winding heads I1, I2, and I3 are identical) comprises an annular U-shaped channel 386 having rings 387 secured as by welding to the outer ends of the channel's arms (FIG. 17). A pair of laterally spaced annular plates 388, 388' are welded to the base portion of the channel member. A series of equidistantly spaced, circumferentially arranged spindles 390 are secured to extend from the annular plate member 388 and similarly, a series of spindles 390' are secured to extend from the annular plate 388'. The spindles which are each provided at their outer ends with a washer and screw means are adapted to receive spools of glass rovings or the like. The comparatively large central opening on the inner diameter of the annular plates 388, 388' is provided with four equidistantly spaced, radially extending guide support plates 394 which are welded to an internal ring 396 bridging the inner ends of the annular plates 388, 388' to thereby provide guide support means as a part of the winding head. The four equidistantly spaced guide support plates 394 have the configuration shown in FIG. 15 and are secured as by welding to the internal ring 396. The winding head has a central opening 397. As shown, a portion of each plate 394 extends rearwardly of the channel member 386 and its associated plates 388, 388'. The major length of the guide support plates, however, extends forward of the channel member 386 and its associated plates.

As best shown in FIG. 16, the continuous fiber elements or strands, after being drawn off of the spools, first pass around a ring guide 398 and a guide 399 for the strands paid off from the spools on the rear side of the winding head. Then, each of the fiber elements or rovings passes through a ring provided with circumferentially spaced eyelets 400, one eyelet for each roving. The rovings then run over the ring guide 402, around the adjustable tension guide ring 404, over the guide ring 406 and around through the central opening 403 in a guide plate 408. The adjustable guide ring 404 is secured as by welding to brackets 405, there being one bracket for each plate 394. The brackets are each secured by a bolt in one of a series of holes 407 in the respective plates 394. The guide plate 408 is secured to the lower ends of the circumferentially spaced brackets 405. Except for the adjustably mounted guide ring 404, the guide rings 398, 399, 402 and 406 and the ring providing the support for the eyelets 400 are fixed to the plates 394. The center of the winding heat at the opening 403 allows the conveyor tube with the wound layer or layers thereon to pass centrally through the head for the application of a layer $b1$, or layers $b2$ and $b3$, upon such generated portion of the pipe assembly.

As shown in FIGS. 14 and 15, each winding head is supported for rotation by a framework 410 which comprises a pair of transversely spaced, vertical standards 412, 412' connected by pairs of vertically spaced cross members 414, 414' at the top and bottom. Angled bracing and load-bearing members 416, 416' extend between the frame members 412 and 414' on opposite sides of the frame structure. The angled members have mounted thereon load-bearing rollers 418, 418', each comprising spaced pairs for engagement with the spaced rings 387 forming the rims of the winding head. The bracing members also are used to support bearing members 420, 420' which are received intermediate the arms of the U-shaped channel to maintain the winding head on center as it rotates. A third positioning bearing 420'' is located centrally from the top cross member 414. The winding head with a full complement of spools mounted thereon and the described guide means for the plurality of fiber elements is rotated by the drive shaft 266 which rotates a pulley 422 fixed to the shaft. A belt 424 extends around the pulley and is received and bears against the base portion of the U-shaped channel 386 to rotate the winding head at a selected rate of rotation depending upon the size of the pulley 422 for a given rate of rotation of the drive shaft 266. Preferably, a tension wheel 425 mounted on the cross member 414 is provided to take up any slack in the belt 424.

With the winding heads I1, I2, and I3 positively rotated abput the pipe assembly as it is generated, and with the substantial forces to be overcome in drawing off the fiber elements under tension from a number of spools sufficient to provide the bands $b1$, $b2$ and $b3$ each of a width substantially equal to the circumference of the generated portion of pipe assembly, the winding heads act to rotate the rotatably mounted pipe assembly. The parallel arranged fiber elements drawn off each powered winding head pass through the central opening 403 in the form of a frusto-conical structure before the fiber elements are laid into the pipe assembly, and with a device J located immediately adjacent each winding head as shown, the fiber elements are engaged by the aforementioned wheels 352, 360 and 364. As a result, a resin coating is applied to the fiber elements by the coating or impregnation wheel 352 as the moving tapered arrangement of fiber elements revolves in contact with the wheel. The same bath used to coat the fiber elements for a layer $a$ coats the elements for a layer $b$. The support wheel 360 acts as a support for the generating pipe, and by its rotation also causes the fiber elements of the frusto-conically arranged, parallel fiber elements to be flexed, thereby assisting to force resin composition into the travelling fiber elements. The associated guide wheel 364 also functions to impart flexure to the moving fiber elements as they pass under the wheels and are wound onto the conveyor tube with its previously applied layers of fiber elements. At the pair of associated devices J1–I1, a band $b1$ of resin impregnated continuous fiber elements wound at a relatively low angle is immediately overwound by a band $a1$ of resin impregnated continuous fiber elements applied at a substantially high angle and of opposite hand. Similarly, the bands or layers $b2$–$a2$ and $b3$–$a3$ are applied from the associated devices I2–J2 and I3–J3, respectively. The resin coating or impregnant is preferably a thermosetting resin composition such as an epoxy resin composition and a suitable hardener or a polyester composition.

When the generated pipe assembly passes the station of the last group of related devices I3–J3, the pipe assembly moves under a heater 426 to cure the resin impregnant for the fiber elements in the various layers which have been incorporated into the pipe assembly. As shown in FIGS. 2C–3E, the heater is suspended from straps 428 connected to the central upper frame member 54 so that the heater is located immediately adjacent the advancing pipe assembly. The pipe assembly then passes into an oven 430 which may have a communicating blower 432. The pipe assembly then passes through a cooling device 433, whereupon the pipe assembly is in a condition suitable for field use. The pipe assembly however is utilized to furnish an operating part of the apparatus which continuously manufactures the pipe assembly.

As will be evident from FIGS. 1–1B and FIGS. 2–3E, the control means D and the inflatable seal means E are the next devices forward in the line provided by the apparatus. It is believed, however, that the invention may be best explained by now describing the functions of the air under pressure which is conveyed through the mandrel by means of the tube 57 and its extensions 57', 328 and 342. The aforementioned seal means B may be located anywhere beyond the station where the conveyor tube is formed on the mandrel. Such seal means may be provided at a point just prior to the location of the first device J where the layer $a$ is applied. The conveyor tube is sufficiently rigid to withstand the tension of the windings applied from the device J. As shown in FIG. 1A, it is preferred to locate the seal means B forward of the first winding head I1. While the end 50 of the mandrel may be located at any point forward of the seal means B, it is preferred that the end of the mandrel be located immediately following that point on the mandrel where the winding head I3 is located, or rearward of the control means D. The air under pressure within the pipe assembly, and down from the mandrel, acts to resist the pressure of means gripping the pipe assembly provided by the control means D.

As previously indicated, the primary function of the air under pressure is to impart an axial thrust to the pipe assembly as it is being fabricated to continuously advance the assembly through the apparatus. It will of course be understood that when the apparatus is started, a dummy length of pipe may be used to initiate operation of the equipment. When the forward extremity of the generated pipe assembly is beyond the control means D and the inflatable seal means E, plug seal means C is used to seal the forward end of the pipe assembly so that a rigid body is provided against which the force of the fluid or air under pressure may exert its thrust. While any suitable plug means may be used, it will be apparent that a very strong, air-tight connection must be made between the end of the pipe assembly and the plug. A plug construction which is particularly serviceable for the purpose and which is preferred is shown in FIGS. 18–21.

As illustrated, the plug seal means C comprises an annular bearing plate 434 having a central, internally threaded opening 436. A hand wheel 438 is provided with a longitudinally extending externally threaded shaft 440 which extends through the mating internally threaded opening 436. The hand wheel and the shaft are fixed for rotation together by a torque pin 442. The forward end of the shaft has a disk 444 fixed to it of a larger diameter than the diameter of the shaft for engagement with a shoulder 446 provided by an inner plug 448. An O-Ring 450 is positioned adjacent the rear side of the disk for sliding sealing engagement with the wall of a central bore 452 extending rearwardly of the shoulder 446. The O-Ring is confined between the disk and an annular flange 453 formed on the shaft 440. The plug 448 is hollow and has a counterbore 454 of larger internal diameter in communication with the smaller bore 452, whereby the disk 444 has clearance when the hand wheel is turned to cause axial movement of the shaft 440 and the unseating of the disk from the shoulder 446. A stop collar 456 is fastened to the shaft 440 to limit the extent of rotation of the shaft to its unclamped position (FIG. 19), the collar engaging an internal shoulder 458 provided by the plug 448.

Figure 18:
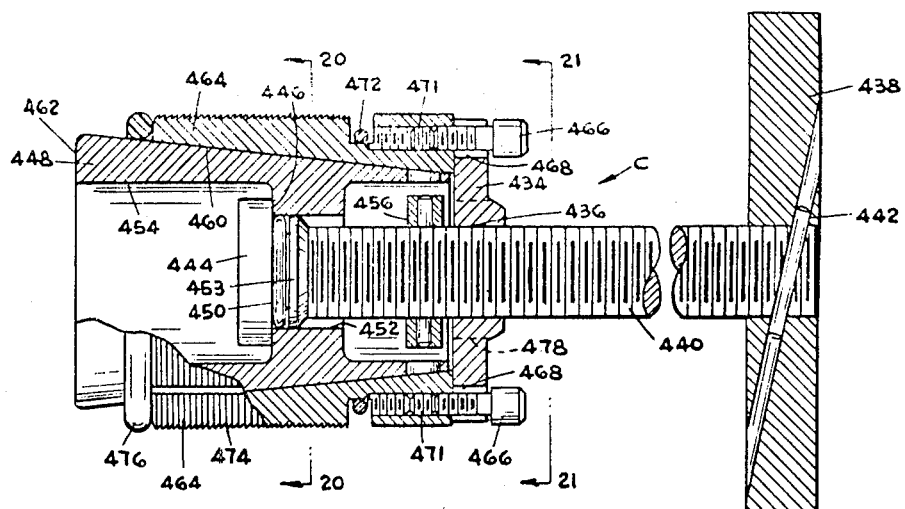
FIG. 18 is a longitudinal cross-sectional view of the plug used to seal the forward end of the moving pipe assembly.
Figure 19:
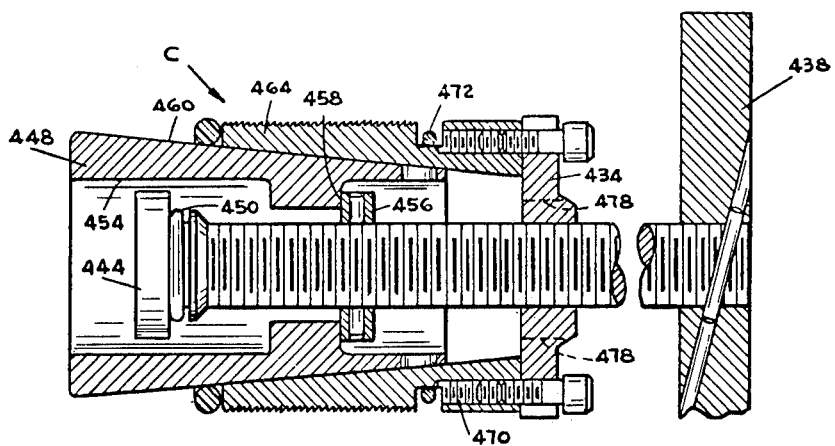
FIG. 19 is a view similar to FIG. 18, this view showing the seal plug in its released condition.
Figure 20:
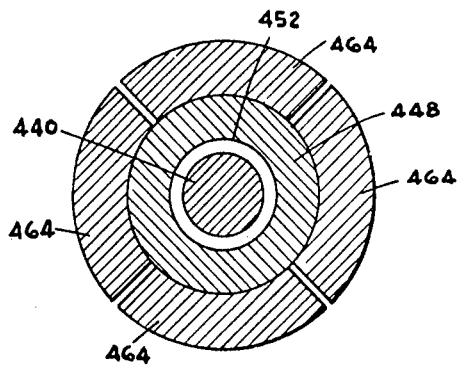
FIG. 20 is a vertical cross-sectional view taken approximately in the plane of line 20—20 of FIG. 18.
Figure 21:
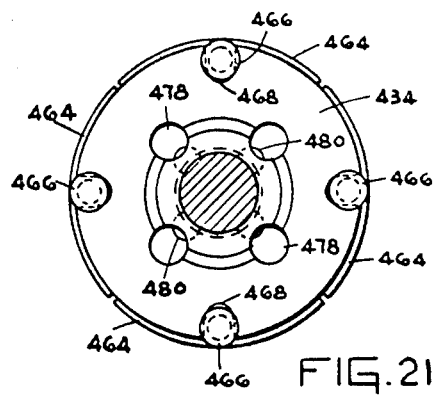
FIG. 21 is an end elevational view, partly in cross-section, looking in the direction of the arrows 21—21 of FIG. 18.

As shown in FIGS. 18 and 19, the plug 448 is formed to provide a frusto-conical outer surface whereby a ramp 460 is provided converging in taper from the end 462 of the plug rearwardly toward the bearing plate 434. A split, expandable sleeve comprising a plurality of segments 464 overlies the plug 448. As shown in FIG. 20, four split sleeve segments may be used, and as illustrated, each segment is connected to the bearing plate 434 by a bolt 466 extended through an aperture 468 in the bearing plate. The bolt for each segment is matingly threaded into a threaded bore 470 provided to extend longitudinally in each segment, and locked by a set screw 471 so that the head of each bolt is spaced from the bearing plate. The apertures 468 in the bearing plate however are of a diameter to furnish clearance with the shanks of the bolts 466 whereby the segments furnishing the annular split sleeve may possess movement in a radial direction. An elastic retaining ring 472 of rubber or the like encompasses the sleeve segments to resiliently maintain the segments against the underlying plug 448. Each segment is formed so that its inner surface has a taper for mating engagement with the plug's ramp 460. The external surface 474 of each segment is roughened as by knurling or the like to furnish a gripping surface for engagement with the internal surface of the pipe. An elastic O-Ring 476 located to surround the plug 448 at the forward edge of the split, expandible sleeve assembly prevents air leakage between the inner plug and the pipe assembly when the plug seal means C is in operative position and clamped within the forward end of the pipe assembly P (FIG. 18). Circumferentially spaced, air venting openings 478 are provided in bearing plate 434 to place the interior of the plug 448 in communication with the ambient atmosphere when the O-Ring 450 is moved out of the bore 452 (FIG. 19). To assure continued venting though the stop collar may be in engagement with the shoulder 458, vent holes 480 may be extended through the collar.

The operation of the plug seal means C will be apparent by a comparison of FIG. 18 showing the device in its pipe clamping position and FIG. 19 showing the device in its unclamped position. With the device in its unclamped position, the split, expandable sleeve is on its smallest diameter since the segments 464 are positioned on the smaller diameter of the tapered ramp 460. When the hand wheel 438 is rotated to clamp, the plug is drawn inwardly within the split, expandable sleeve so that the segments 464 ride up on the ramp 460 until the knurled surfaces 474 grip the inner surface of the pipe assembly with a firm, air-tight seal. Such relative motion of the parts causes the elastic, retaining ring 472 to increase in diameter. In clamped position, the disk 444 engages the shoulder 446 and the O-ring 450 is in sealing engagement with the wall of the bore 452. When the hand wheel 438 is turned in an opposite direction to unclamp the device from the pipe, the O-ring seal 450 is unseated from the wall of the bore 452, and causes the venting of the air pressure within the pipe assembly through the communicating openings 478. The parts are dimensioned so that such venting takes place while the knurled segments still maintain their grip on the pipe assembly, thereby preventing the device from being blown out of the pipe. Further rotation of the hand wheel allows the bearing plate 434 and its connected sleeve segments to force out the inner plug 448, the elastic retaining ring 472 acting to contract and thereby reduce the diameter provided by the gripping segments so that the grip upon the pipe assembly is released.

With the plug seal means C clamped onto the forward end of the pipe assembly, the air under pressure in the main air line 57 and its extensions passes out through the end 50 of the mandrel and into the generated pipe assembly to exert pressure against the plug seal means C to advance the pipe assembly in an axial direction. This axial force is opposed by the axial force component of the continuous fiber elements being pulled onto the pipe assembly at the stations where the devices J, J1, J2 and J3 are located; also, the coated strip or strips d furnish an opposing axial force component. The control means D located rearwardly in the line from the forward extremity of the pipe assembly is a device which synchronizes and controls the rate of advancement and the rate of rotation of the pipe assembly. The device engages the rotating pipe assembly to revolve with it; the device as a whole does not travel with the pipe assembly. The synchronization and control device D is constructed to add or subtract linear work from the system by maintaining the rate of linear advancement of the pipe assembly in a constant relationship with respect to the pipe assembly's rate of rotation. Such fixed relationship establishes the winding angle for the fiber elements constituting the hoop windings in the layers $a$, $a1$, $a2$ and $a3$. When the correct relationship of rate of linear advancement to rate of rotation of the pipe assembly is established, the synchronization and control mechanism neither takes work out of the system to retard pipe advancement, nor does it put work into the system to increase the rate of pipe advancement. However, when the axial thrust imposed by the air pressure to advance the pipe assembly is not in the correct relationship to the assembly's rate of rotation, the synchronization and control means D, which is responsive to the rate of advancement of the pipe assembly, compensates the system by putting work in or taking work out to thereby maintain the desired constant relationship of linear travel to rotational movement of the pipe assembly.

As shown in detail in FIGS. 22–26, the control means D comprises an annular main support frame 482 in the form of a pair of spaced plates 484, 484' secured in desired spaced relationship by a plurality of circumferentially located spacers 486. The main support frame has a central opening of substantial size. A bolt 488 is extended through the frame plates and each of the spacers. The main support frame is supported for rotation within a load-bearing framework generally designated 490 which comprises a pair of transversely spaced standards 492, 492' connected to one another by the vertically spaced top and bottom cross frame members 494, 494'. As shown in FIGS. 2E and 3E, the supporting framework 490 is secured to a channel framework 496 which is positioned on the floor and braced by angle irons 498, 498'. Angle bracing members 500, 500' are connected to extend between the standard 492 and the bottom cross frame member 494 and between the standard 492' and the bottom cross frame member.

Figure 25:
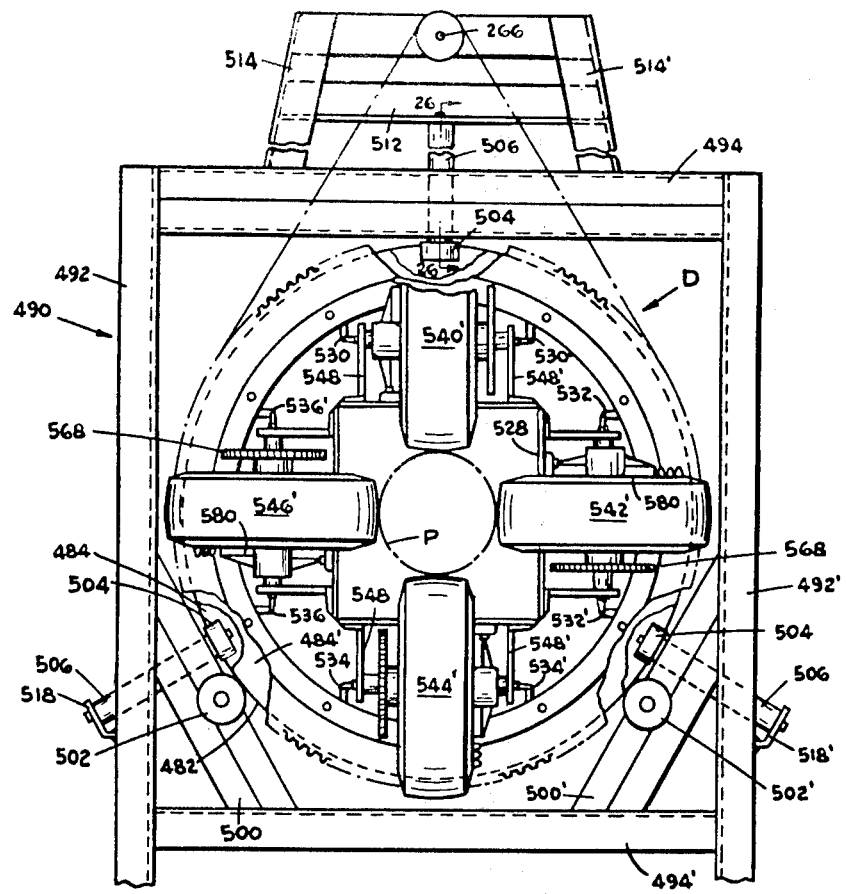
FIG. 25 is a front elevational view of the device shown in FIG. 22.
Figure 26:
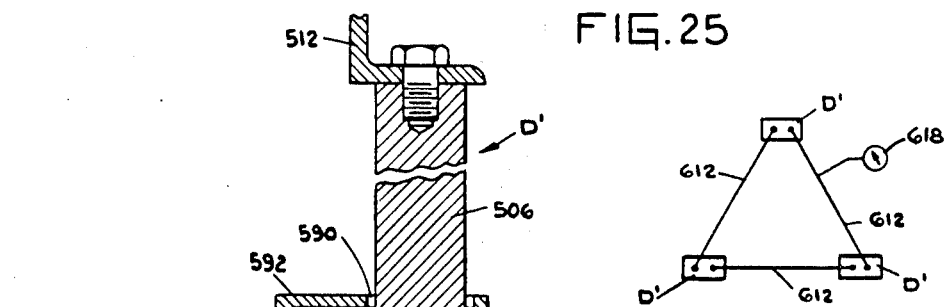
FIG. 26 is a vertical cross-sectional view taken approximately in the plane of line 26—26 of FIG. 25.

As shown in FIG. 25, bracing members 500, 500' each have mounted thereon the load-bearing rollers 502, 502', respectively, to rotatably support the annular main support frame 482. To guide and maintain the support frame in a fixed plane of rotation, three equidistantly spaced guide rollers 504 are mounted to extend between the frame's spaced plates 484 and 484'. As shown in FIG. 26, each guide roller is of the ball bearing type and is secured to a stub shaft or thrust rod 506 as by clamping a washer 508 to the inner face by a bolt 510 threaded into the end of the stub shaft. The opposite end of the stub shaft is fastened to the stationary framework. As shown in FIGS. 25 and 26, the top guide roller is bolted to a tie bar 512 extending between spaced frame members 514, 514' which also furnishes a support for a pillow block 516 for the drive shaft 266 (FIG. 3E). The drive shaft which actuates the aforementioned winding heads I1, I2 and I3, also the conveyor tube forming device or devices G, also actuates the control means D. As shown in FIG. 25, the other two guide rollers 504 are mounted at the ends of their respective thrust rods 506 which are welded to brackets 518, 518' respectively secured to the standards 492, 492'. As will subsequently appear, the guide roller and thrust rod arrangements in the illustrated spaced relationship, additionally function to sense axial thrust which may be imposed upon the main annular support frame 482 by the control device D.

As shown in FIGS. 2E and 3E, the annular main support frame 482 is rotated by the drive shaft 266 through a chain 520 cooperable with a sprocket 522 fixed to the shaft. The chain 520 extends around a plate sprocket 524 which has a central opening of substantial size and which is of a slightly larger diameter than the annular frame support 482 adjacent to which it is mounted. The sprocket 524 may be termed the rotary control sprocket. The sprocket and the adjacent annular frame are connected to one another for rotation together in any suitable manner, and for this purpose, circumferentially spaced spacers 526 may be provided and held in position by the same bolts 488 as used for the spacers 486.

Figure 22:
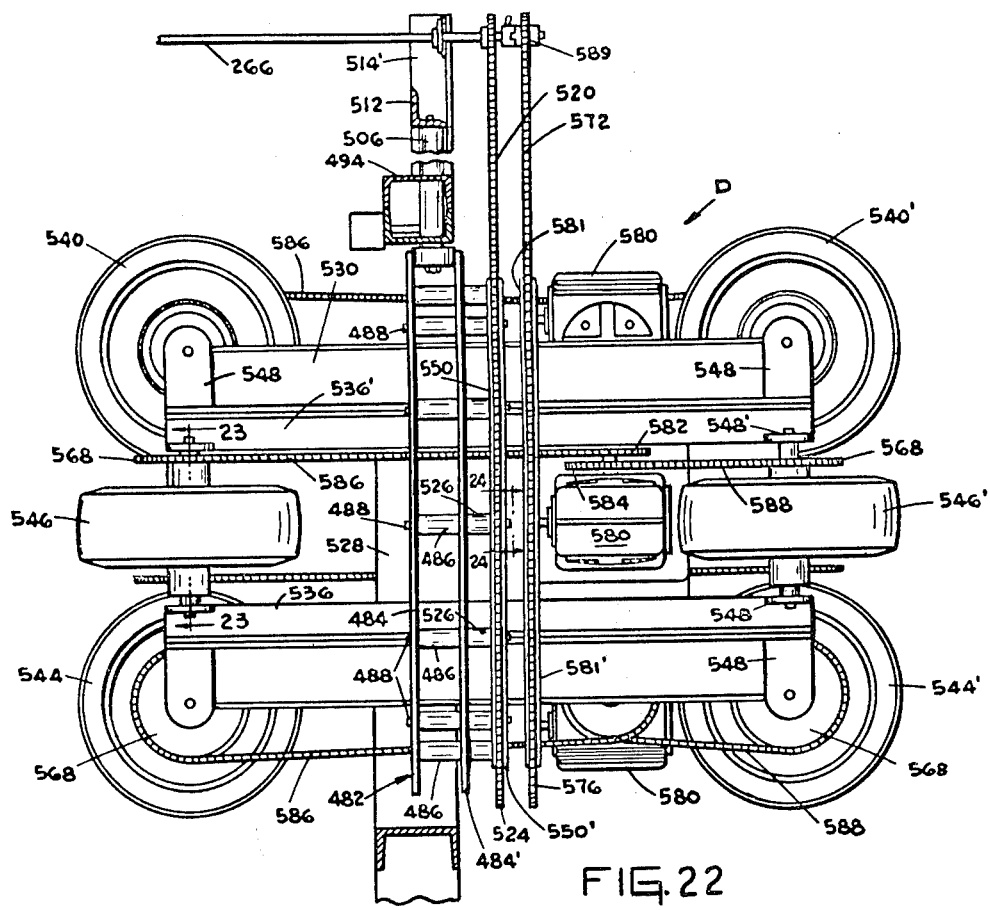
FIG. 22 is a side elevational view of the means for controlling the advancement of the pipe assembly through the apparatus.

As shown in FIGS. 22 and 25, a hollow chassis 528 is positioned centrally of the support frame 482 and the rotary control sprocket 524. The chassis may be cylindrical in form. As illustrated however, it is preferred that the chassis be provided with intersecting sides to facilitate the assembly therewith of the parts to be described. As shown, the chassis is substantially square-shaped and has four sides so that a pair of spaced, longitudinally extending channel members 530, 530', 532, 532', 534, 534', and 536, 536' may be respectively secured to each side of the chassis. The channel members extend forward and rearward of the chassis (FIG. 22) and the hollow character of the chassis allows the pipe assembly P to pass through the chassis and the control device D.

Resilient annular members are mounted to grip the outer periphery of the pipe assembly at spaced areas about the rotating and linearly advancing pipe assembly P, the resilient members being mounted to revolve as a unitary assembly with the rotating pipe assembly and for independent rotation about their respective axes of rotation. As illustrated in FIGS. 22 and 25, the resilient annular members are in the form of tires each of which is mounted upon the aforementioned longitudinally extending channel members which are fixed to rotate with the rotary support frame 482 and the rotary control sprocket 526. With a four-sided chassis, there are four pairs of longitudinally extending support channels and four pairs of tires 540, 540', 542, 542', 544, 544' and 546, 546'. Preferably, the tires are of the inflatable or pneumatic type to thereby afford, by the air pressure in them, means for adjusting the gripping pressure upon the pipe assembly. It will be understood that the number of pairs of tires is a matter of choice. Instead of four pairs, as illustrated, the device is operable with three pairs or more than four pairs depending upon the diameter of pipe being processed. Between the channel members 530, 530', the axle for the rear tire 540 is journaled in pivot brackets 548, 548' secured to the channels 530, 530', respectively. The front tire 540' is similarly mounted between this pair of channel members. The tires 542, 542', 544, 544' and 546, 546' are similarly mounted by brackets extending from the pairs of channel members 532, 532', 544, 544' and 546, 546', respectively. The channel members are each fastened as by welding to a pair of rings 550, 550' which are bolted to each side of the rotary control sprocket 524. Such arrangement allows the ready replacement of a worn sprocket without disturbing the connected assembly of chassis, longitudinally extending channel members and the spaced, resilient, rotatable pipe engaging elements or tires.

Figure 23:
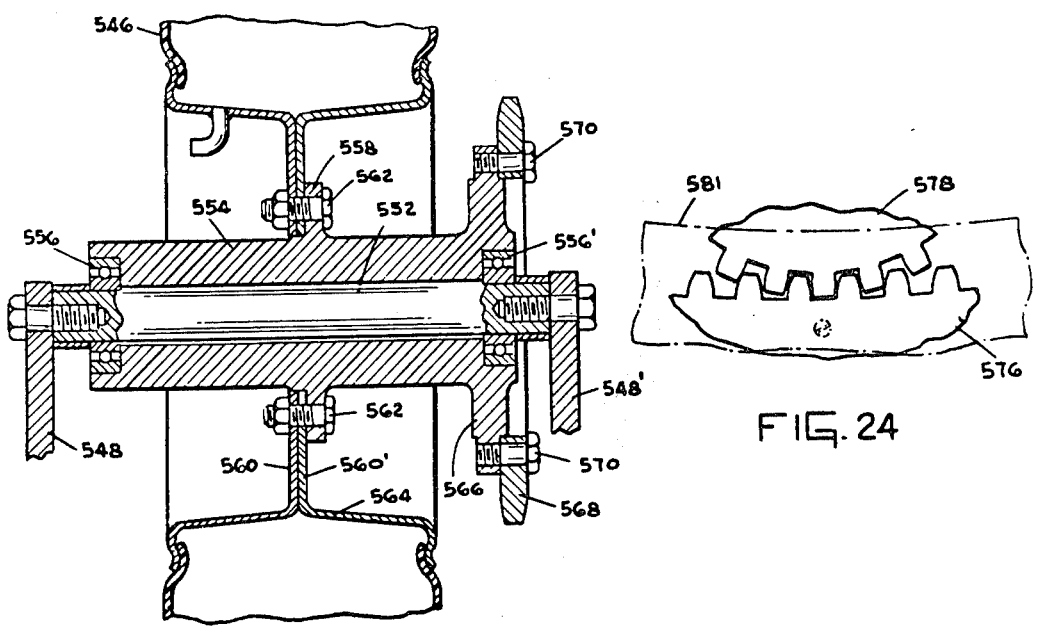
FIG. 23 is a vertical cross-sectional view taken approximately in the plane of line 23—23 of FIG. 22.
Figure 24:
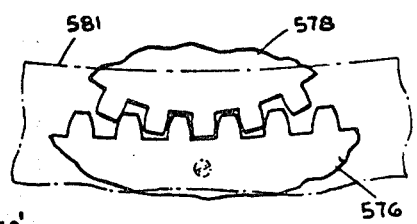
FIG. 24 is a vertical cross-sectional view taken approximately in the plane of line 24—24 of FIG. 22.

FIG. 23 illustrates how a tire, in this case tire 546, is mounted. The other tires of the assembly are mounted in the same manner. An axle 552 is fixed to extend between the brackets 548, 548' at one end of a pair of channel members, in this instance, the channel members 536, 536'. A hub 554 is rotatable about the axle, the hub having bearings 556 and 556' in each end. The hub has an ear 558 in the middle of its length to which flanges 560, 560' are bolted at 562. The flanges extend from a rim 564 for the annular resilient member or tire. The hub 554 is also provided with a flange 566 at one end thereof to which a sprocket 568 is bolted at 570. Each of the eight tires is similarly mounted for rotation about a fixed axis, and is provided with a sprocket 568.

Each of the longitudinally spaced tires 540, 540', 542, 542', 544, 544' and 546, 546' is driven off the same drive shaft 266 which rotates the described rotatable assembly, which includes the tires as parts of such rotatable assembly, to furnish axial control of the pipe assembly P gripped by the tires. As shown in FIGS. 2E and 3E, a second drive is brought off the drive shaft 266 through a second drive chain 572. The chain 572 passes around a sprocket 574 fixed to the shaft 266, and as shown in FIGS. 22 and 25, such chain is cooperable with a sprocket 576 which may be termed an axial control sprocket as distinguished from the aforementioned rotary control sprocket 524. Like the rotary control sprocket, the axial drive sprocket is in the form of a plate and has a central opening of substantial size to permit the chassis 528 to extend therethrough. The sprocket 576 however, also has internal teeth (FIG. 24) for cooperation with sprockets 578 on the input shaft of each of four differentials or gear reducers 580 which are circumferentially arranged for cooperation with the illustrated four pairs of tires. To confine the sprocket 576 to a fixed plane of rotation, the sprocket has guide rings 581, 581' bolted to its sides, the rings extending to each side of the circumferentially arranged, equidistantly spaced sprockets 578 on the input shaft of each gear reducer. Each gear reducer is held in a fixed position on the rotatable assembly by being fastened to a side of the four-sided chassis 528. On the output side of each gear reducer, two sprockets 582 and 584 are fixed to the same output shaft. A sprocket chain 586 extends over the sprocket 582 and the sprocket 568 for each rear tire, thereby driving the rear tires 540, 542, 544 and 546 in unison since the gear reducers are all of the same ratio. Also, a chain 588 extends over the sprocket 584 of each gear reducer and the sprocket 568 for each front tire 540', 542', 544' and 546' to drive them at the same speed as the rear tires.

As will be apparent from the foregoing described relationship of the parts of the control means D, the resilient, annular members or tires grip the pipe assembly advanced centrally therethrough while rotating bodily with the rotating pipe assembly P. The rotary motion imparted to the tires about their respective axes of rotation through the medium of the axial drive sprocket 574, its associated gear reducers or differentials 580, and the chain and sprocket connections to the individual tires, furnishes a control for the axial movement of the longitudinally advancing pipe assembly. Axial movement of the pipe assembly may be interrupted when desired by disconnect means 589, one part of which may be slidably mounted on the shaft 266 and the other part fixed to the sprocket 574 when a spline type of disconnect means is used. Under pressure, the air within the pipe assembly acts to resist the pressure upon the pipe assembly which is imposed by the tires which firmly grip the outer periphery of the rotating and longitudinally advancing pipe assembly.

As previously indicated, the arrangement of guide rollers 504 and their respective stub shafts or thrust rods 506 have an additional function; they act to sense undue thrust which may be imposed upon the main support frame 482 and the described associated parts which are assembled therewith. As shown in FIG. 26, the thrust rod extends through aligned openings 590, 590' on opposite sides of a housing 592 suitably fixed to the stationary framework 490. The thrust rod is provided with a cavity 594 extending into a side thereof intermediate its length within the housing, the cavity terminating in stop 596. A thrust piston 598 has a central shaft portion 600 the end of which is received within the cavity 594 with its extremity 602 engageable with the stop 596. The shaft 600 extends through an aperture 604 in the side wall of the housing 592. An annular, externally threaded mounting sleeve 606 is secured as by welding to the wall of the housing to surround the aperture 604. The piston 598 is positioned for reciprocation within a cylinder 608 which is internally threaded at the rear portion thereof for connection to the mounting sleeve 606. An O-ring 610 is positioned in a groove formed around the head of the piston to prevent fluid leakage. A hydraulic fluid, such as oil, is contained within the cylinder 608 between the head of the piston and flexible hoses 612 connected by suitable fittings into the internally threaded openings 614, 614' formed in the end wall 616 of the cylinder.

Figure 26A:
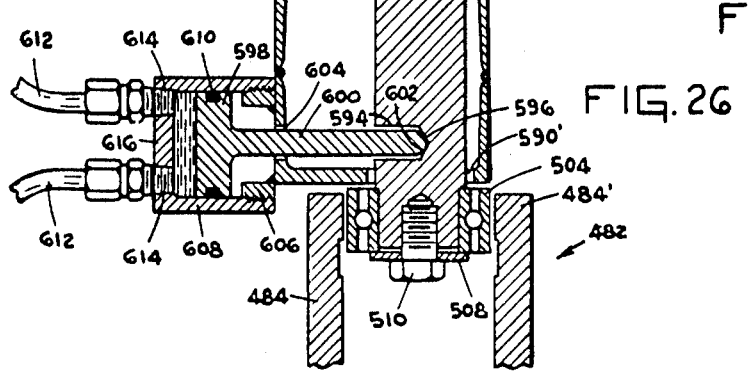
FIG. 26A is a diagrammatic showing of means for sensing axial thrust which may be imposed upon the means for controlling the advancement of the pipe assembly.

As shown diagrammatically in FIG. 26A, three assemblies such as shown in FIG. 26 and designated D' are interconnected to one another by the hoses 612, and a pressure sensing instrument or gauge 618 is tied into the line to sense any undue axial thrust which may be imposed upon or by the control device by the pipe assembly. Undue axial thrust is sensed when anyone of the three thrust rods 506 is unduly deflected about its cantilever connection to the stationary framework. Such deflection is converted through the pistons 598 into hydraulic pressure. Variance from a predetermined gauge reading indicates that the axial thrust imposed by the rollers 504 upon either of the rings 484 or 484' of the main support frame 482 is out of balance. Appropriate correction is made by adjusting the air pressure acting to impart axial thrust to the pipe assembly, or by adjusting the tension level on the rovings being applied from the winding heads I1, I2 and I3 which rotate the pipe assembly. The latter adjustment is made by changing the position of the adjustable tension guide ring 404 on each of the winding heads. As previously indicated, the drive shaft 266 actuates the control means D as well as serving to rotate the winding heads I1, I2 and I3, also the conveyor tube forming device or devices G. The motor 258 which rotates the drive shaft either puts energy into the control device or acts as a brake when the system would tend to get out of balance, balanced conditions being a predetermined ratio of rates of linear advancement and of rotation of the pipe assembly. Since the same motor, or its shaft, actuates the operations of aforementioned devices for incorporating material into the pipe assembly as well as serving to actuate the control device, temporary deviation from optimum balanced conditions does not seriously affect the pipe assembly being generated; the operation of all of the devices is synchronized from the same driving means to equally affect each device.

The aforementioned inflatable means E is positioned within the pipe assembly P and forward of the control means D, as shown schematically in FIG. 1B. The inflatable means which, in effect, is an air piston, is shown in detail in FIGS. 27–34. The air piston is a device which furnishes a temporary, longitudinally advancing, internal air seal within the pipe assembly a set distance rearwardly from the end of the pipe while the pipe is being manufactured or generated. As previously described, the pipe assembly in the normal course of continuous manufacture is air-sealed at its forward moving end by the plug seal means C, the air seal B over which the pipe assembly is drawn furnishing the other end of the air sealed chamber. The air piston provided by the means E permits cutting off a length of the pipe assembly from the continuously manufactured product without the loss of air pressure within the pipe assembly, and thereby the continuous manufacturing process need not be interrupted. Activating the inflatable air position temporarily creates a linearly travelling seal within the pipe assembly to allow the removal of the plug seal means C from the end of the pipe, whereby a section or length of the otherwise endless pipe assembly being generated may be cut on the unpressurized side of the travelling air seal provided by the means E. After a selected length of the pipe has been cut from the continuously advancing pipe assembly, the plug seal means C is replaced in the end of the pipe whereby the air piston is then relieved of the air pressure which actuates or inflates it. While such temporary air seal is operative, axial motion of the pipe is maintained by the air pressure acting on this air piston form of device or plug. When the air seal is released, the air piston means E is automatically returned to its unpressurized and rest position to await its next activation when a predetermined length of pipe assembly is to be cut off from the endless pipe assembly being generated. FIGS. 27–31 illustrate a pipe assembly P as related to the inflatable seal means E. For convenience of illustration, the pipe assembly is merely shown as a tube, for without some showing thereof the related plug seal means C as shown in FIG. 28 would have no visible supporting means. It will be understood that the pipe assembly at this point in the line has the construction shown in FIG. 35.

As shown in FIGS. 27–34, the temporary air seal means E comprises an inflatable container 620 made of an elastic material such as rubber. When not activated or not inflated, the container has the form of a tube closed at each end, and has a diameter less than the internal diameter of the pipe assembly which rotates and advances over it. The clearance between the outer side of the inflatable container and the surrounding pipe assembly permits the air under pressure from the main air line to exert an axial thrust on the plug seal means C (FIG. 28).

The inflatable container 620, for a portion of its length, surrounds a rigid support sleeve 622 made of aluminum or the like having a plurality of openings 624 in its wall to place the interior of the support sleeve in communication with the interior of the inflatable member. The inflatable member is held to surround the support sleeve by forward end clamp means comprising an end clamp 626 which is welded to the forward end of the support sleeve 622. The inflatable container is held by securing an end clamp 628 to the opposite side thereof, the clamping members 626 and 628 being held and secured to one another by a bolt 630 extended through the clamp member 628 and threaded into the clamp member 626 through an opening in the inflatable air container. The opposite or rear end of the inflatable container is clamped between a clamp member 632 on the inner side and a centering guide 634 against which is pressed a clamp member 636 by a nut 638. The nut is threaded onto an externally threaded sleeve 640 which is secured as by welding to an air conveying tube 642.

Figure 32:
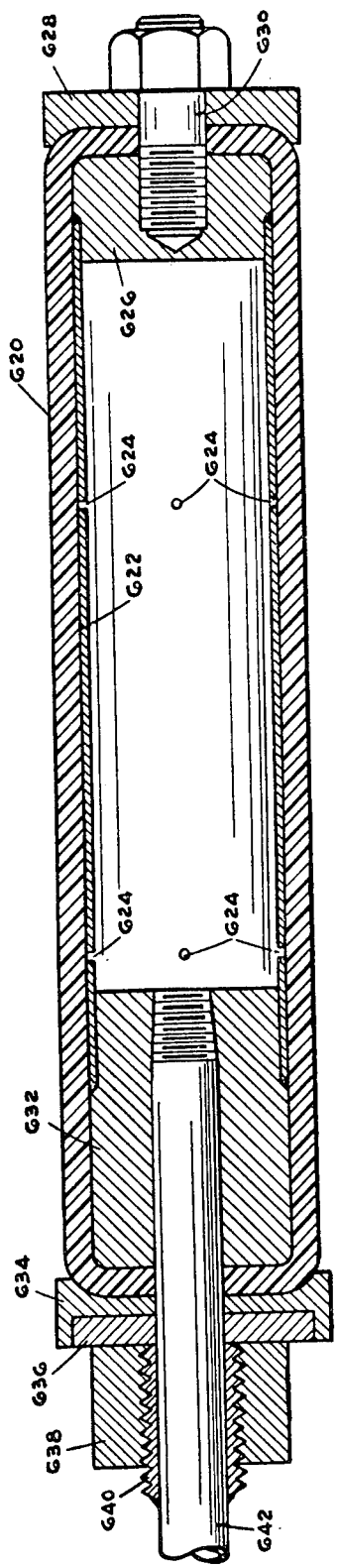
FIG. 32 is an enlarged longitudinal cross-sectional view showing the inflatable means cooperative with the pipe assembly when such means is acting to prevent the loss of pressure within the pipe assembly.
Figure 33:
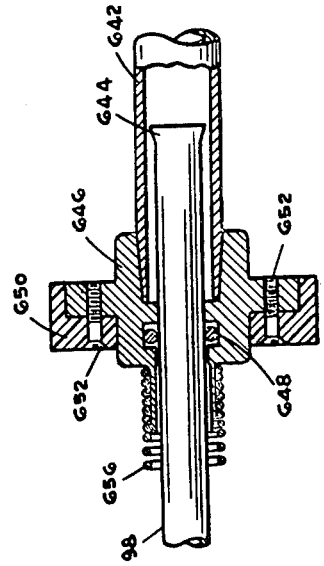
FIG. 33 is a longitudinal cross-sectional view showing the relationship of spring means used in conjunction with the inflatable seal means which allows the movement of the inflatable seal means with the advancing pipe assembly.

As best shown in FIG. 32, the air conveying tube 642 is in communication with the apertured or perforated support 622 surrounded by the inflatable container 620. As shown in FIG. 33, the air line 642 is in communication with the tubing 98 connected to the second source of air back at the rotary coupling (FIG. 4). As previously described, the tubing 98 rotates with the mandrel A and extends beyond the mandrel's forward end 50, or the end where the main air line 57 and its extensions terminate. The diameter of the tubing 98 is smaller than the diameter of the tube 642. The end of the tube 98 is flared at 644 to allow relative longitudinal movement between the tubes, and to prevent them from being separated.

Figure 34:
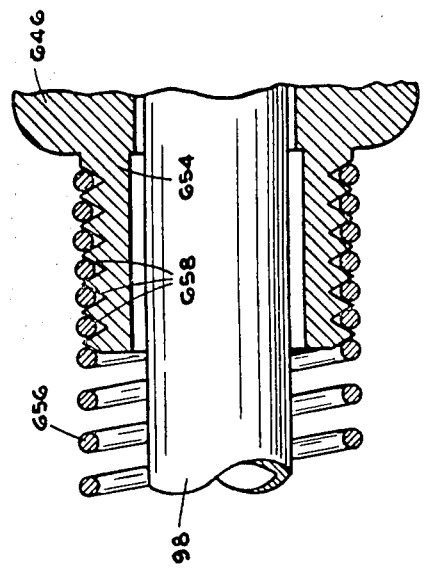
FIG. 34 is an enlarged longitudinal cross-sectional view showing the manner in which the spring means is anchored to the inflatable seal means.

As also shown in FIG. 33, the rearward end of the tube 642 is fastened as by force-fitting into a guide hub 646 through which the tube 98 extends. The guide hub is provided with an internal groove witin which is positioned an O-ring 648 to furnish an air seal between the hub and the tube so that relative longitudinal motion between the tubes 98 and 642 does not result in a loss of air pressure. A guide 650 for centering the pipe assembly over which the pipe assembly passes is secured as by screws 652 to the guide hub. As shown in FIG. 30, the guide hub is provided with longitudinally extending, circumferentially spaced holes 653 to allow air from the main line to pass through the part and around the deflated air container 620 for the application of thrust against the plug seal means C. The guide hub is also provided with a rearwardly extending annular flange 654 of a diameter to closely surround the tube 98. The hub having the air tube 642 connected thereto is slidable along the tube 98. As best shown in FIG. 34, a coiled tension spring 656 has its forward end anchored to the hub member by providing the flange portion 654 with annular grooves 658 within which several adjacent turns of the spring are force-fitted. The spring acts to return the air piston assembly, or the aperture support sleeve 622 and its surrounding air container 620, to inactive position after the pressure in the line provided by the tubes 98 and 642 is released to deflate the air container.

Accordingly, and as shown in FIGS. 27 and 28, the opposite or rear end of the spring 656 is anchored in the same way as the forward end, as above described, to a centralizer tube 660 which is secured as by welding to the outer periphery of the air conveying tube 98. The centralizer tube is secured to the air conveying tube 98 just forward of the control device D. The centralizer tube has mounted thereon a plurality of centralizer guiding ribs 662 with the ribs at their highest points having a diameter slightly less than the internal diameter of the pipe assembly which travels thereover and is guided thereby.

After a section of pipe has been cut off, the plug seal means C is clamped onto the forward end of the pipe assembly within the apparatus. The air container 620 which was inflated to frictionally grip the interior of the pipe assembly to rotate and travel forward therewith is deflated by releasing the pressure in the air line provided by the communicating tubes 98 and 642. The spring 656 acts to return the assembly including the deflated container, also the guide hub 650 and its associated parts, to a position adjacent the centralizer tube and its guide ribs. Upon subsequent reactivation of the air container 620, it becomes a travelling plug against which the air under pressure from the main line 57 and its extensions may exert an axial thrust to advance the thus temporarily sealed pipe assembly. During such temporary seal of the pipe, the plug seal means C is unclamped, a section of the pipe is cut off, and the plug seal means is clamped into the forward cut end of the advancing pipe assembly without interruption of the continuous process.

Figure 43:
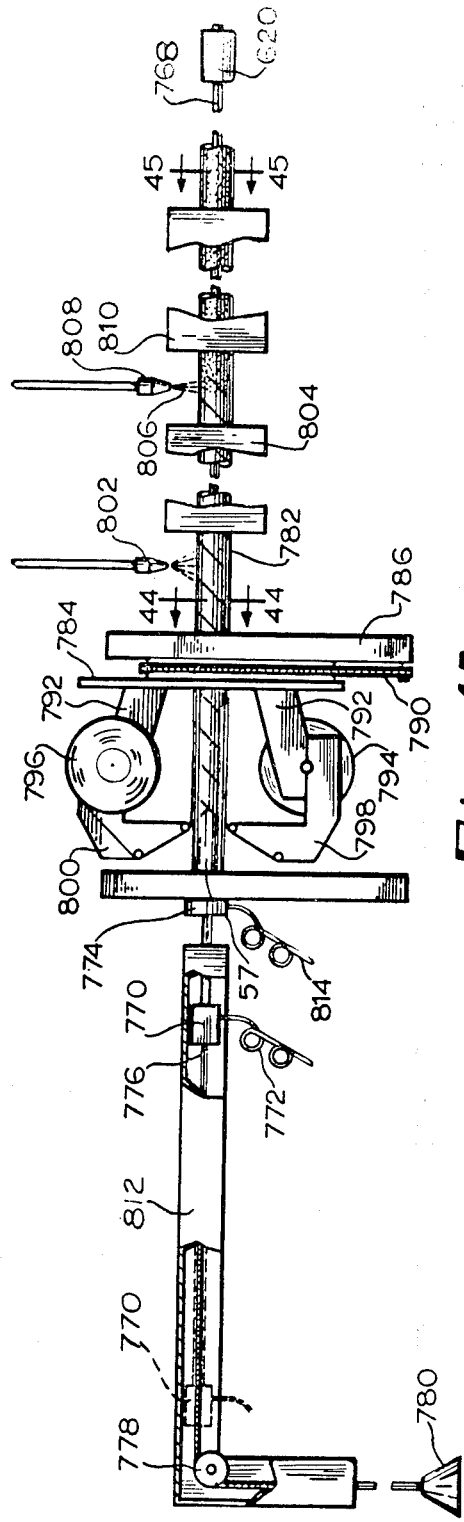
FIG. 43 is a side elevation taken in partial cross section of another embodiment of the invention for providing an air seal within the generated pipe and of another embodiment of the invention for forming a conveyor tube on the mandrel.
Figure 45:
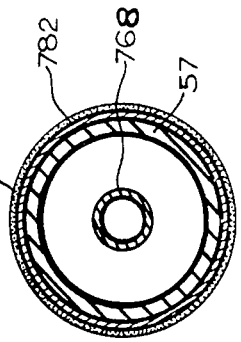
FIG. 45 is a cross-sectional view taken as indicated by the lines and arrows 45—45 of FIG. 43.
Figure 44:
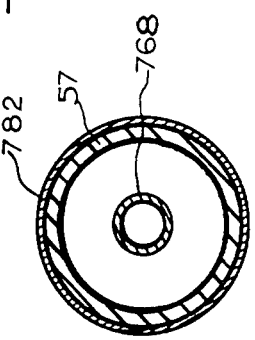
FIG. 44 is a cross-sectional view taken as indicated by the lines and arrows 44—44 of FIG. 43.

An alternate embodiment of the means for providing the temporary fluid seal is illustrated in FIG. 43. In this embodiment the inflatable container 620, described above, is attached to the forward end of a hollow rod 768 which is continuous over its entire length and extends through the interior of the mandrel 57 and is slidably and rotatably engaged with the rotary joint 774, which is at the rearward end of the mandrel. The rotary joint 774 is attached to a supply line 814 through which a fluid, for example, air, is fed into the mandrel. The hollow rod 768 is attached at its rearward end to a rotary fitting 770. The rotary fitting 770 is connected to a supply line 772 through which air or another fluid under pressure can be fed from a source (not shown) to expand the inflatable seal means 620. The rotary fitting 770 is attached to one end of a cable 776 which passes from the rotary fitting over a pulley 778 and is attached at its opposite end to a weight 780. The pulley 778 is attached to the supporting member 812 through which the cable 776 and the rotary fitting 770 travel. The weight 780 is positioned in a well (not shown) which preferably is filled with a liquid such as oil, which dampens the movement of the weight 780. The means for providing the fluid seal, as illustrated in FIG. 43, is in an engaged and almost completely extended position such as when it is utilized for cutting off a length of the generated pipe. After a length of the generated pipe has been cut off and the plug seal means C reinserted, the pressure on the fluid fed through the supply line 772 is released, which causes the inflatable seal means 620 to deflate and disengage the walls of the generated pipe assembly as previously described. The weight 780 in combination with the cable 776 then causes the assembly of the inflatable seal means 620, the hollow rod 768 and the rotary fitting 770 to retract to the at rest position indicated in phantom in FIG. 43.

The processing of pipe by the described apparatus is automatic and continuous. As shown in FIGS. 2A and 3A, a control panel 670 is mounted on the longitudinally extending central frame member 54 for indicating the conditions of and for controlling several devices in the system. An indicating potentiometer 672 is provided to control the temperature for the heaters 312 which serve to pertially cure the resin which provides the conveyor tube form of resin T. A voltmeter 674 also connected to the heaters 312 serves as a temperature read out device. A rotary selector switch 676 permits temperature read out for any one of the plurality of heaters. Control means 678 is connected to the motor 258 to control its speed, and a speed indicator 680 furnishes a read out of the actual rate of rotation of the motor's shaft 266.

Resin lined pipe produced by the specifically described automatic, continuous line is illustrated in FIGS. 35 and 35A. As previously indicated, the pipe construction, insofar as the number of layers and the angles of winding of the fiber elements of the various layers, is a matter of choice. Changes may be made in the system for the structure of pipe desired.

The apparatus hereinbefore described produces pipe having a continuous resin coating or layer on its interior supplied by the conveyor tube T which was made an integrated part of the finished pipe assembly. By modifying a portion of the described continuous system, an air impervious conveyor tube T′ may be provided which is removed from the pipe assembly after the conveyor tube has served its purpose of furnishing a base for the materials applied thereto in the conveyor tube's advancement through the apparatus. Apparatus utilizing a removable conveyor tube may produce pipe having a resin inner liner or a pipe which is unlined.

Figure 36:
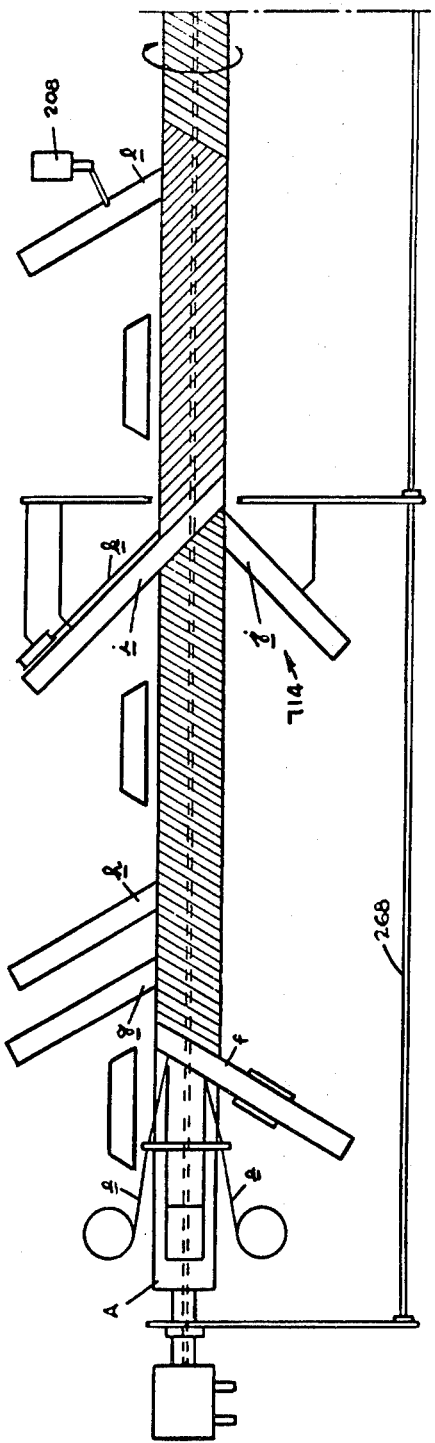
FIG. 36 is a schematic showing of means for forming a conveyor tube which is removable from the completed pipe assembly.
Figure 37:
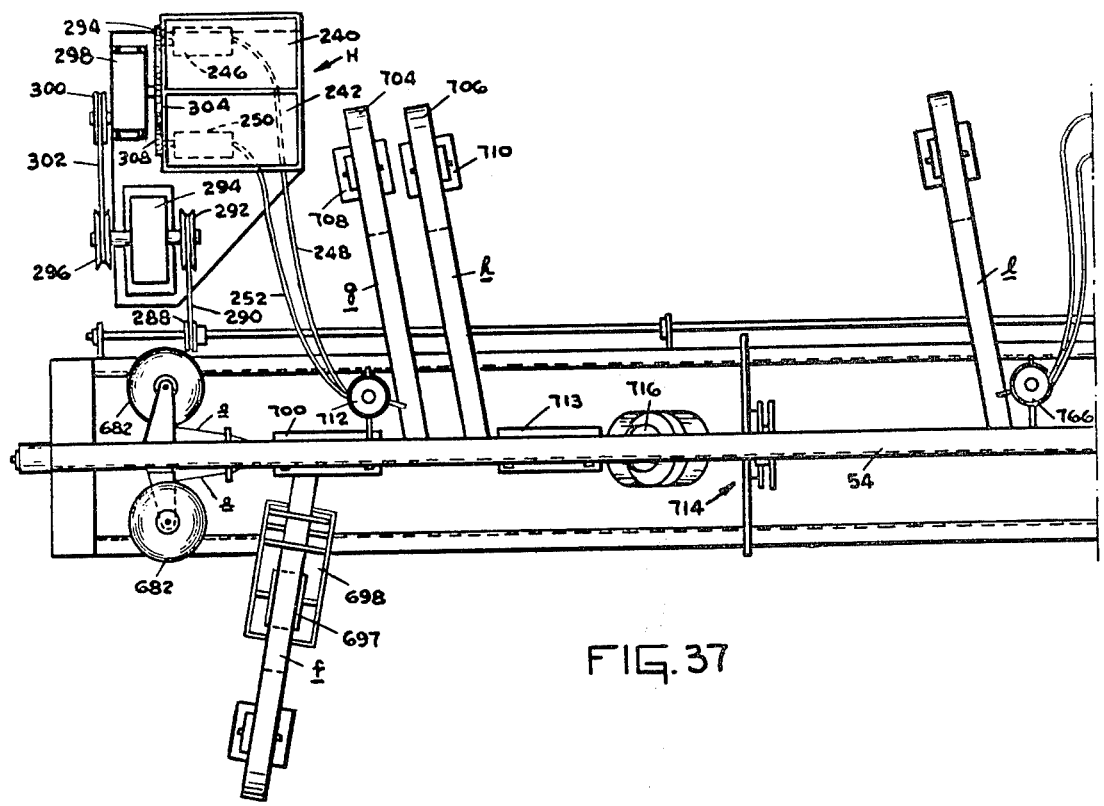
FIG. 37 is a top plan view of that portion of the apparatus for making a conveyor tube portion which is removable from the pipe assembly.
Figure 39:
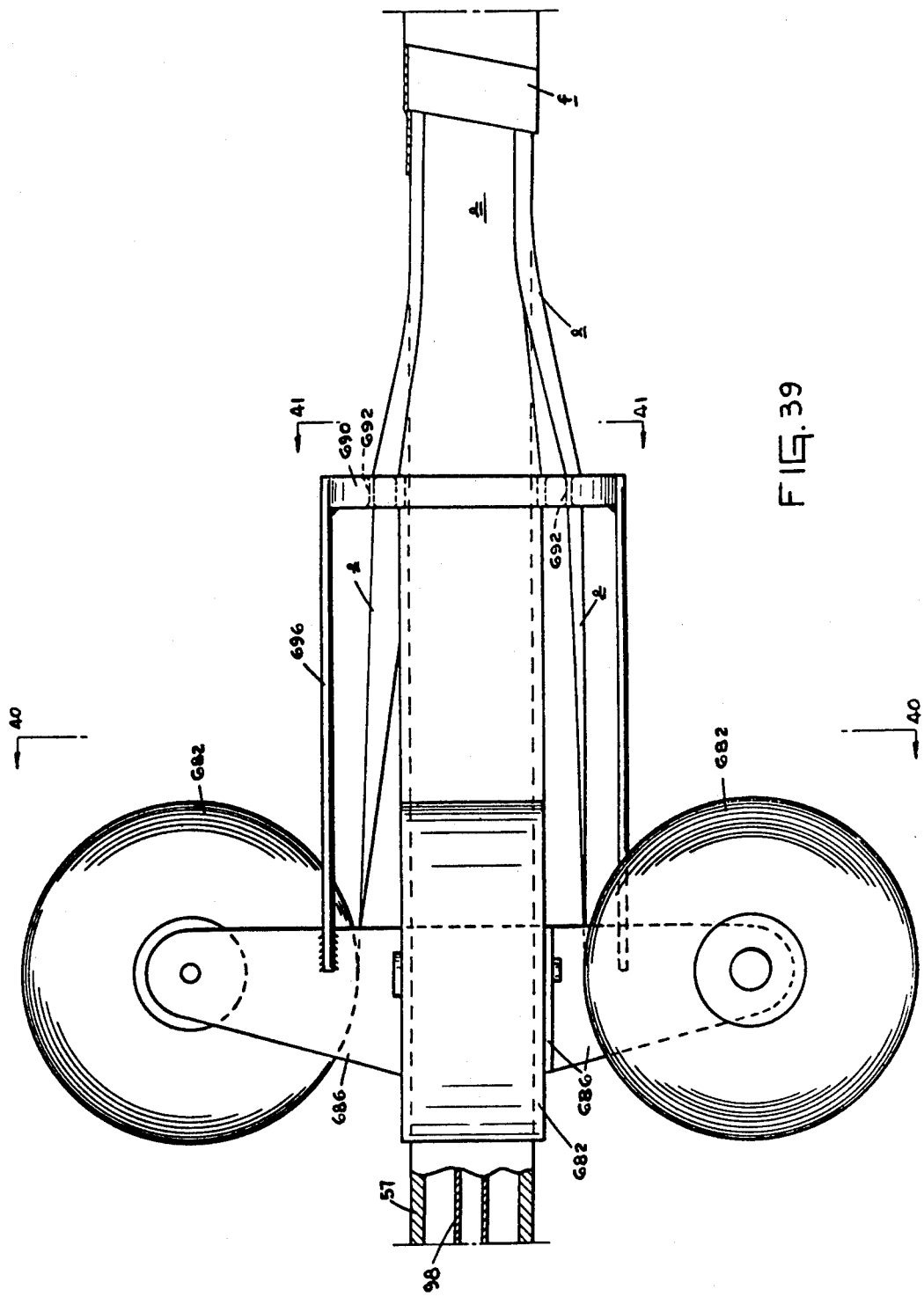
Figure 42:
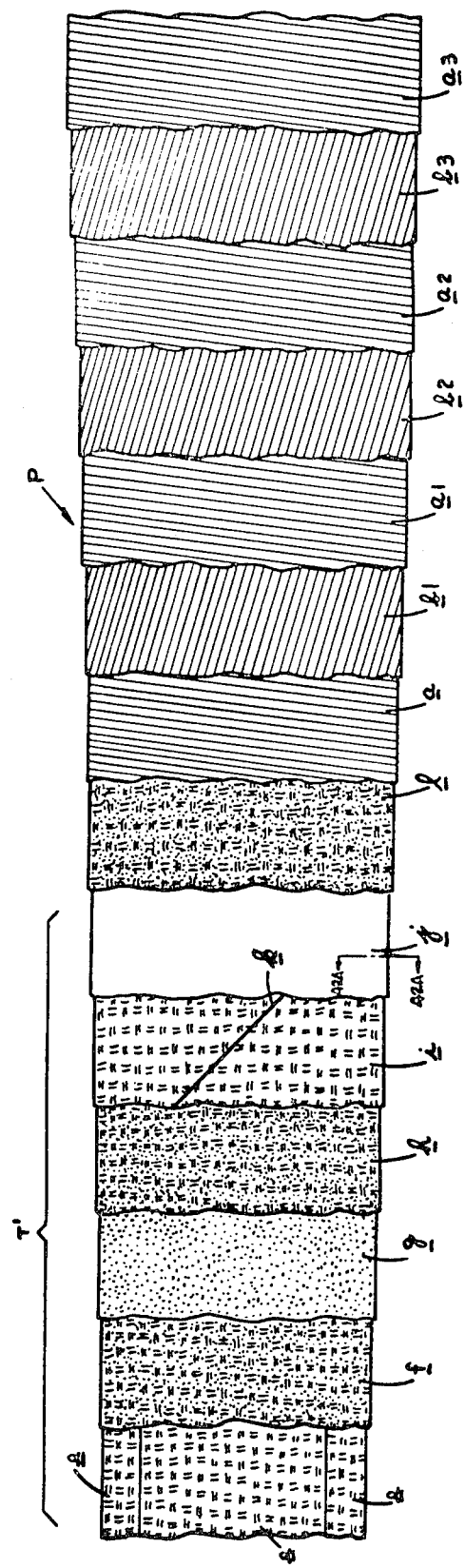
FIG. 42 is a breakaway showing of a pipe assembly made in accordance with the embodiment of the invention schematically illustrated by FIGS. 36, 1A and 1B taken together, and structurally shown in FIGS. 37, 38, 2A–2E and 3A–3E taken together.
Figure 42A:
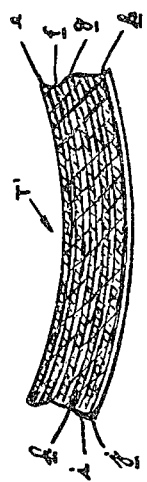
FIG. 42A is a vertical section taken in the plane of line 42A—42A of FIG. 42.

The portion of the continuous system for making pipe with a removable conveyor tube is schematically shown in FIG. 36 and the structured portion in FIGS. 37 and 39. When such portion of the apparatus at the beginning of the system is placed in line with the remainder of the system as schematically shown in FIGS. 1A and 1B and structurally shown in FIGS. 2A–3D, a continuous system is provided for the automatic and continuous manufacture of a pipe assembly having a removable conveyor tube T′.

Essentially, the conveyor tube T′ is fabricated to furnish the desired air impervious quality and the desired measure of rigidity to withstand the forces of applying windings thereon under tension. Also, as will be described, the conveyor tube includes as a part thereof means in the form of a stripping wire which enables the ready removal of the conveyor tube which, in this embodiment of the invention, is included in the pipe assembly for processing purposes only.

Figure 38:
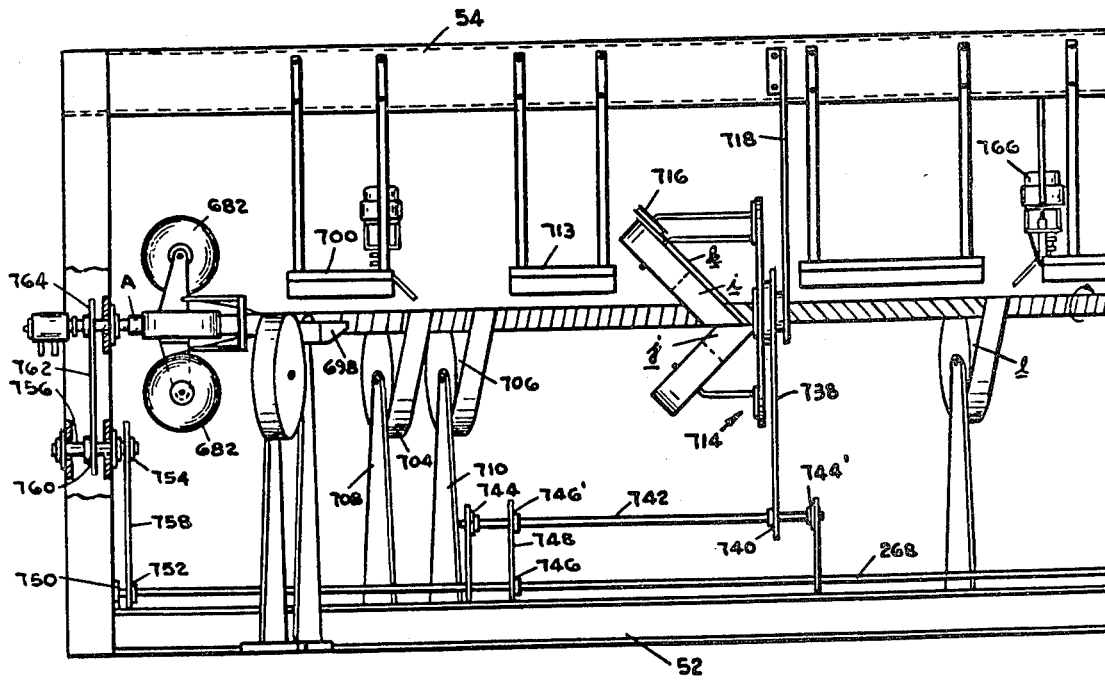
FIG. 38 is a side elevational view of the apparatus shown in FIG. 37.

Referring to FIGS. 36, 37 and 38, the conveyor tube T′ is formed on the rotatable mandrel A which, as hereinbefore described, serves to convey air under pressure therethrough to impose an axial thrust for the longitudinal movement of the pipe assembly through the system, also to support an auxiliary air line to the inflatable, temporary plug E. A tube of paper is first formed on the mandrel by applying a plurality of strips $e$ to cover the mandrel. The strips, four in number in the illustrated form of the invention, are longitudinally applied to the mandrel from four rolls 682 which are supported upon a sleeve holder 684 fixed as by welding to the mandrel or the tube portion 57 thereof as best shown in FIG. 40. The holder is provided with equidistantly spaced brackets 686 to which the spindles 686 for the rolls of paper strip are connected. The advancing pipe assembly of which the conveyor tube T′ is a part serves to draw the paper strips off the rolls so that the longitudinal edges of the strips are in slightly overlapping relationship. The longitudinally applied strips are guided to assume such relationship by a guide member 690 provided with slots 692 extended therethrough as shown in FIG. 41. The guide member, which is provided with a central aperture 694 to allow the tube portion 57 of the mandrel to extend therethrough, is suspended from longitudinally extending rods 696 having their rearward ends fastened or welded to a pair of the roll holder brackets 686 (FIG. 39).

After the plurality of longitudinally extending paper strips $e$ has been laid onto the mandrel with their edges overlapped, the strips are adhered to one another by an adhesive coating carried by a strip $f$ which is helically wound about them. The strip $f$ prior to being wound around the strips $e$ passes over a coating roll 697 positioned in an adhesive bath 698 and is coated on one side. A heater 700 is disposed over the portion of the conveyor tube generated to dry or harden the adhesive. As shown in FIGS. 37 and 38, the heater is suspended from longitudinally spaced sprays 702 secured to the upper central frame member 54.

As also shown in FIGS. 37 and 38, a pair of strips $g$ and $h$ are helically wound in the same direction about the material previously applied to the mandrel, these latter two strips being drawn off of rolls 704 and 706 mounted on stationary stands 708 and 710 adjacent the line. The strip $g$ is of an air impervious material such as cellophane or vinyl resin film, and has an adhesive coating of a thermosetting resin, each as an epoxy resin composition, applied thereto by an applicator 712. The strip h as preferably of a porous or absorbent material such as tissue paper. When both strips are wound into the assembly and heat is applied as by a second heater 713, the resin migrates through the strip h, the layers are bonded to one another and the tube is air impervious.

The portion of the conveyor tube T' thus far generated is then helically overwound with two strips i and j, rolls of which are mounted on a rotating head generally designated 714. The strip i is of paper and the strip j is of a parting or mold release material such as a smooth tape of polypropylene, Teflon or the like. The paper strip i is bonded to the generating conveyor tube through the medium of the resin adhesive which has passed to the outer side of the porous strip h. The rotating head 714 also has mounted thereon a reel 716 from which a strong filament or wire k is drawn off and wrapped around the generated tube to lie adjacent the layer provided by the wound tape i. Incorporated in the conveyor tube, the stripping element or wire k lies at an angle of approximately 45° with respect to the longitudinal axis of the tube. When the pipe assembly of which the removable conveyor tube T' is a part has been completed, pulling or applying tension to the stripping wire k causes the destruction of the removable conveyor tube for its easy removal from within the pipe assembly. The mold release layer provided by the tape j prevents adhesion of the conveyor tube to the resin inner liner of the pipe if a resin lined pipe is made, or to the resin impregnant on the first layer a of continuous fiber elements wound into the pipe assembly at the station J forward in the line. Due to the staggered relationship of the strips i and j as they are being wound together, with the latter strip immediately overlapped upon the former, the mold release layer is firmly held on the outer side of the removable conveyor tube. The stripping wire k is beneath the layer formed by the mold release strip j. When, after the pipe assembly is completed and a pull is exerted upon the stripping wire, the conveyor tube beneath the mold release layer is cut or destroyed and the mold release layer because of the character of the material readily comes away from the overlying pipe structure.

As shown in FIGS. 38 and 39A, the rotating head 714 is suspended from a bracket 718 secured at its upper end to the frame member 54. The rotating head comprises a circular plate 719 having a central opening to allow the generated conveyor tube to advance therethrough. The rotating head plate has a pair of diametrically opposed rearwardly extending rods 720, 720', each of which is inwardly bent near their rear ends to furnish spindles for the rolls of tape or strips i and j. A third rod 722 is welded to the plate 719 and extends rearwardly and is formed to provide a spindle for the wire wheel 716.

In the illustrated embodiment of the invention, as represented by FIGS. 37, 38 and FIGS. 2A-3E, also as schematically shown in FIGS. 36, 1A and 1B taken together, the mandrel is positively driven or rotated, whereas in the embodiment of the invention illustrated in FIGS. 2-3E and schematically in FIGS. 1, 1A and 1B, the mandrel though mounted for rotaiton is not powered or positively rotated. It is preferred to positively rotate the mandrel in synchronism with the rotation imparted to the pipe assembly in each of the illustrated embodiments of the invention. Where the pipe is processed upon a conveyor tube of the removable type, it is particularly desirable to positively rotate the mandrel by bringing the drive from the motor 258 rearwardly to the beginning of the line where, in addition to the drive mechanism coupled to the mandrel, a positive drive may be provided for the rotating head 714.

As shown in FIGS. 38 and 39A, the plate 719 of the rotating head is mounted for rotation upon a stepped hub 724. The hub has the portion thereof of larger diameter abutted against the bracket 718 with its portion of smaller diameter extended through the central opening of the plate 719. A plurality of circumferentially arranged screws 726 are extended through the bracket and screwed into the hub to affix the hub to the bracket. On the opposite side of the plate 719, a retaining plate 728 is secured into the stepped portion of the hub by screws 730. A pulley 732 having a hub 734 is sandwiched between the plate 719 and the larger diameter portion of the hub 724. The pulley is fixed for rotation with the plate 719 by screws 736 extended through the plate and into the pulley hub 734.

The winding head 714 is rotated by a belt 738 around the pulley 732 and around a second pulley 740 fixed to a countershaft 742 journaled in pillow blocks 744, 744' supported by the bottom frame 52, as shown in FIG. 38. The countershaft is rotated by the driven shaft 268 previously referred to in connection with the first described embodiment of the invention, and which, as previously described, is driven by the motor 258. The shaft 268 and the countershaft 742 are provided with pulleys 746, 746' and a cooperating belt 748. The shaft 268 extends further rearwardly in the line with the end of the shaft journaled in a pillow block 750. The shaft 268 supplies power to rotate the mandrel A through a series of pulleys and belts. A pulley 752 is fixed to the shaft 268 for cooperation with a pulley 754 fixed to a stub shaft 756. A belt 758 is cooperable with the pulleys 752 and 754. The stub shaft which is suitably mounted for rotation in pillow blocks is provided with a pulley 760 cooperable by means of a belt 762 with a pulley 764 fixed to the mandrel or its tube portion 57.

The described drive mechanism, all off the same motor 258, imparts rotation to the winding head 714 so that the rotation of the mandrel is synchronized with the rotation of the rotating head 714 applying the tapes i and j to the generating, removable conveyor tube T'. It is preferred that the drive means for the winding head 714 be arranged so that the winding head shall rotate at a faster rate than the rate of rotation of the mandrel to provide a wrap angle of less than approximately 45°. As shown in FIGS. 37 and 38, the completed removable conveyor tube T' may be overwound by a helically applied strip l impregnated or coated on both sides with a thermosetting resin composition applied by resin applicator 766 to furnish a resin liner for the completed pipe (after the tube T' is removed). If desired, the resin liner layer provided by the impregnated strip l may be omitted, whereby the finished pipe comprises the plurality of layers of resin impregnated continuous fiber elements applied by the devices J, J1, J2, J3, I1, I2 and I3 forward of the portion of the line where the conveyor tube is formed on the mandrel.

Another embodiment of the invention where the conveyor tube is removable is illustrated in FIG. 43, the conveyor tube being designated 782. A tube winder 784 is rotatably mounted about the mandrel 57 on the support 786 and is driven by a chain and sprocket drive 790. The tube winder 784 comprises mounts 792 for holding rolls of tape 794, 796 and includes guides 798, 800. When the tube winder 784 is rotated about the mandrel 57, tapes 794, 796 are helically wound on the mandrel to provide a helically wound conveyor tube 782 on the mandrel. If desired, a single tape may be wound on the mandrel with the edge slightly overlapping to provide the conveyor tube.

The strip material that is employed to furnish the removable conveyor tube is nonadhesive on its inner surface to the mandrel 57 and is, or can be, readily made adhesive on its outer surface. The interior is nonadhesive so that the conveyor tube will be free to advance over the mandrel as the conveyor tube is advanced. The opposite or outer surface of the tube is coated with a separable adhesive, that is, an adhesive effective to adhere the tube to the resin composition of the pipe and which will allow separation of the tube from the resin composition in its polymerized or partially polymerized state upon treatment with a separating agent. The separating agent is of a character or composition which does not affect the polymerized or partially polymerized resin composition.

In greater detail, rolls of gummed kraft paper tape 794, 796 are loaded onto the tube winder 784. The tapes are then helically wound on the mandrel 57 with the adhesive side out and the uncoated side toward the mandrel. To eliminate as much of the friction as possible between the conveyor tube 782 and the mandrel 57, the mandrel 57 may be coated with Teflon. Since the adhesive surface is not adhesive in the dry state, the outer surface of the tube 782 is sprayed with a fine mist of water from a shower head 802. The water, in addition to moistening the adhesive on the tape, somewhat dampens the paper and makes it more plastic so that it will conform more smoothly to the contour of the mandrel 57. After the conveyor tube 782 is moistened, it is dried by advancing it through an oven 804. A resin liner 806 is applied to the conveyor tube from the nozzle 808. The resin liner 806 readily adheres to the dried adhesive surface of the conveyor tube 782. The conveyor tube coated with the resin liner 806 is then advanced into a second infra-red oven 810 in which the resin liner is at least partially cured, and is thereby made air impervious. The remainder of the glass and resin build-up is then applied to the coated conveyor tube. After the pipe assembly is completed, the conveyor tube 782 is removed from the finished pipe by simply soaking the pipe in warm water or by the use of steam under pressure, which softens and dissolves the gummed adhesive and enables the paper tapes to be easily removed. If desired, the conveyor tube may be left in the finished pipe to protect the inner resin liner until the pipe is ready for installation, whereupon the conveyor tube is removed in the field as above described just prior to installation of the pipe.

It will be apparent that the above technique is not limited to the use of the preferred water-soluble adhesive coated kraft paper and that other materials having the above-noted properties may be used in lieu thereof. The carrier strip may be a solvent-permeable film, and the separable adhesive may be a solvent activatable composition, whereupon the conveyor tube is removed by soaking the tube lined finished pipe in a solvent bath in which the separable adhesive is soluble, but in which does not affect the finished pipe assembly. Paper tape coated with a water-soluble adhesive is preferred because of economy and ease of removal with water or steam.

The apparatus shown in FIG. 43 may also be employed to manufacture pipe in which the conveyor tube becomes an integral part of the finished pipe. In this embodiment of the invention, tapes are initially prepared by resin impregnating a suitable base material such as fiberglass tape. The resin impregnated material is then preferably cured to a B-stage. The inner surface of the resin impregnated tape will not adhere to the Teflon coated mandrel 57 when wound on the mandrel. However, in order to insure nonadhesion to the mandrel 57, a mold release agent such as graphite can be applied to the inner surface of the tape or sprinkled on the mandrel 57 as the tapes are wound onto the mandrel 57. The outer surface of the tape can be made adhesive by several different techniques. The outer surface of the resin-impregnated tape can be coated with a suitable semicured thermosetting adhesive resin. In addition, with certain resins, a fine mist of selected solvents can be applied to the conveyor tube from the shower head 802, which makes the outer surface adhesive in a manner similar to that noted above for gummed kraft paper tube. Resinous materials may also be employed which when initially heated in the oven 804 will become somewhat softer and adhere to the surface of adjacent tapes before the resin advances in cure from the B-stage to the C-stage. An additional method of forming the integral air impervious conveyor tube is to coat the helically wound resin impregnated tape with a coating of resin 806 from the nozzle 808, and at least partially cure the resin coating so as to completely seal the outer wall of the conveyor tube. Once the conveyor tube is formed as noted above, it is then further built up as indicated above to provide the finished pipe.

Figure 46:
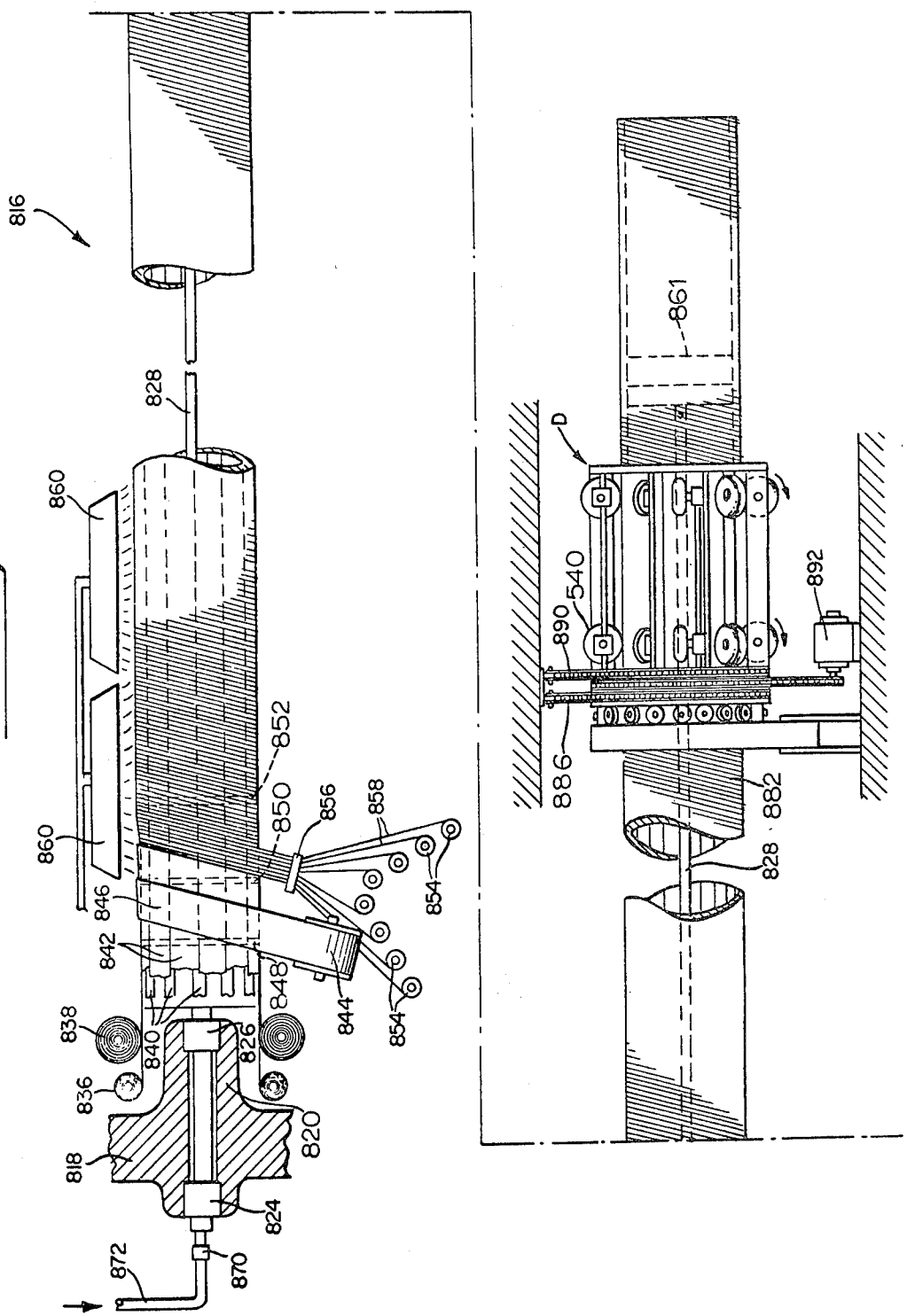
FIG. 46 is a cross-sectional illustration with parts broken away schematically illustrating another embodiment of the invention for forming continuous glass-reinforced plastic pipe.

An additional embodiment of the present invention is illustrated in FIGS. 46 and 47. Referring to FIGS. 46 and 47, the number 816 generally designates an apparatus for forming continuous glass-reinforced plastic pipe in accordance with the present invention. The apparatus 816 comprises a vertical stationary rigid supporting member 818, which may comprise a portion of a suitable supporting frame, not shown, said supporting member 818 being formed with a horizontal projection 820 containing a horizontal bore 822. Journaled axially in the bore 822, as by means of suitable ball bearing assemblies 824 and 826, is a rigid tubular shaft 828 on which is coaxially mounted the pipe forming mandrel 830. As shown in FIG. 47, the mandrel 830 is located adjacent the end of the projection 820 and is formed with longitudinally extending supporting flanges 832 extending from the end of the mandrel 830 parallel to and over the projection 820. The longitudinally extending supporting flanges 832 are angularly spaced uniformly around the axis of the mandrel 830, and each longitudinally supporting flange 832 is formed with a radially extending supporting flange 834.

Journaled on the end of each outwardly projecting radially extending flange 834 adjacent to the supporting member 818 is a feed roll 836 of adhesive cellophane tape such as Scotch tape, and journaled on the radially extending flange 834 forwardly adjacent the feed roll 836 is a feed roll 838 of cellophane strip material. The respective feed rolls 836 and 838 are so arranged relative to each other, and the strip material carried thereon is of sufficient width, so that the cellophane strips from the roll 838 can extend longitudinally onto the mandrel 830 with their side edges substantially in engagement with each other and with their side margins overlapping and adhesively secured on the strips of adhesive cellophane tape from the roll 836, which are likewise laid longitudinally on the mandrel 830. Thus, the strips of adhesive cellophane tape are designated in FIG. 46 at 840 and the side-by-side strips of cellophane from the rolls 838 are designated 842.

Suitably journaled adjacent to the mandrel 830 on an axis which is inclined at an acute angle to the axis of the mandrel is a supply roll 844 of glass tape 846 impregnated with a thermosetting resin. As shown in FIG. 46, the roll 844 is positioned so that the glass tape 846 can be helically wound over the air tight envelope formed by the cellophane strips 842 and the adhesive cellophane tape strips 840 connecting their margins, the glass tape 846 having its major strength in a substantially transverse direction so that the finished pipe is provided with the required strength in its axial direction.

The mandrel 830 is provided with a series of longitudinally spaced annular peripheral air pressure equalizing grooves 848, 850 and 852, for a purpose presently to be explained, the groove 848 being located nearest the left end of the mandrel 830, as viewed in FIG. 47. The glass tape 846 is applied to the mandrel at a location substantially between the groove 848 and the adjacent groove 850.

Vertically journaled adjacent the supply roll 844 and spaced forwardly therefrom in the manner indicated in FIG. 46 are a plurality of glass-roving supply packages 854, the glass roving supply packages 854 being spaced so that the glass strands therefrom can be converged through a stationary guide ring 856 mounted adjacent the forward end of the mandrel 830 and so that the strands, shown at 858, can be applied therefrom, in a desired configuration, for example, in parallel relationship in accordance with the horizontally elongated shape of the guide ring 856, onto the previously wound layer of glass tape 846. The parallel strands 858 emerging from the guide ring 856 are preferably applied in the same direction as the glass tape 846, and are thereby helically wound onto the subjacent helically wound layer of glass tape 846 in the manner illustrated in FIG. 46 responsive to the rotation of the formed pipe, in a manner presently to be described.

Mounted forwardly adjacent the guide ring 856 and in any desired location around the axis of the formed pipe are a plurality of longitudinally arranged heaters 860 which may extend theough any desired length so as to apply heat to the pipe being fabricated over a corresponding length of the pipe, which may, in some instances, consist of one hundred feet or more of pipe length. The initial heat supplied from the heating units 860 softens the thermosetting resin of the glass tape 846 and allows the strands 858 to become embedded in the glass tape 846 to form a composite laminar structure. The thermosetting resin is thereafter cured as the pipe continues to advance past the heaters 860.

Glass tape 846 from supply rolls 844 and glass strands 858 from roving packages 854 may be applied as many times as is necessary to build up the finished pipe to the required wall thickness. The heat which is applied to the superimposed material by the heaters 860 polymerizes the thermosetting resin. Depending on the rate of production, the heat may be applied over any desired length of the pipe being fabricated, for example, over a length of a hundred feet or more.

Secured to the forward end of the tubular shaft 828 is a piston assembly 861 comprising a main cylindrical disc member 862 which is secured to the tubular shaft 828 by an axially extending fastening bolt 864 as shown in FIG. 47, and clamps a resilient deformable sealing cup 866 against an inner rigid washer 868. The sealing cup 866 is preferably made of polytetrafluoroethylene (Teflon), and provides a seal in combination with the inside surface of the formed pipe.

Connected to the forward end of the shaft 828, as by a rotary sealing coupling 860, is a compressed air supply conduit 872 which furnishes air under pressure through the sealed rotating connection 870 to the tubular shaft 828. The tubular shaft 828 is formed adjacent the piston washer 868 with a discharge aperture 874 through which compressed air is discharged into the space 880 between the piston assembly 861 and the mandrel 830 and substantially fills said space 880 also penetrating into the circumferential space around the mandrel 830 to provide an air cushion between the mandrel 830 and the inside surface of the pipe formed thereon. The air pressure is equalized circumferentially around the mandrel 830 by the provision of the equalizing grooves 848, 850, 852 so that channelling of the compressed air along the peripheral surface of the mandrel is prevented, maintaining substantially uniform air pressure around the periphery of the mandrel and maintaining a substantially uniform air cushion between the peripheral surface of the mandrel and the inside surface of the formed pipe. The equalizing groove 848 communicates by means of radial passages 876 with an annular end cavity 878 provided in the mandrel 830, said cavity 878 being exposed to atmosphere, whereby the air is allowed to bleed through the passages 876 and escape freely so that air is not forced to flow out between the unsupported cellophane and the forming mandrel 830. The air pressure is such as to expand the pipe only to the amount required to support the pipe properly while it is cured and to provide the air cushion between the inside surface of the formed pipe and the periphery of the forming mandrel 830, so as to allow the pulling means D described above to move the pipe axially in a smooth and efficient manner. Thus, as the pressure builds up in the space 880, air leaks out between the forming mandrel 830 and the inside surface of the formed pipe, allowing the air pressure to automatically adjust to the desired value. Thus, the pipe floats freely on the forming mandrel 830 because of the presence of the aforementioned air cushion, sufficient air being fed into the pipe to cause it to then expand circumferentially to a sufficient degree to sustain the winding load imposed thereon from the glass roving strands 854 and the glass tapes 846.

The pulling frame designated by the letter D in FIG. 46 is identical in structure to the apparatus described above and shown in FIG. 22. The pulling frame D is arranged coaxially with the mandrel 830 and is spaced a substantial distance forwardly of the heaters 860 and a short distance rearwardly of the piston assembly 861, as shown in FIG. 46. The tires 540 attached to the pulling frame D extend inwardly and frictionally engage the periphery of a cured pipe 882 extending from the mandrel 830. The rotation of the pulling frame D, as described above, causes the tires 540 to engage the cured pipe 882 and to pull the pipe 882 forwardly, while the pipe 882 is simultaneously rotated by the pulling frame D.

In operation, the cellophane strips 842 are fed over the adhesive cellophane tape strips 840 so that their side edges are closely adjacent to each other to form a substantially air-tight casing on the mandrel 830. The glass tape 846, impregnated with a thermosetting resin, as above described, is fed from the roll 844 at an angle such as that illustrated in FIG. 46, being wound over the cellophane strips 842 in a helical fashion between the annular grooves 848 and 850 of the mandrel 830, as shown in FIG. 46. The supply roll 844 is positioned so as to provide the desired pitch angle for the wound glass tape 846. Similarly, the glass fiber roving strands 858 are furnished from the roving packages 854 and fed through the guide ring 856, in the manner above described, at a location forwardly spaced from the glass tape 846, as shown in FIG. 46, being helically wound on the wound tape 846 and being applied at a location spaced rearwardly from the groove 850 of the mandrel and being located adjacent to or overlying the groove 852. Both the glass tape 846 and the glass fiber roving strands 858 are fed under adequate tension so as to provide a close wrap. As above mentioned, the glass tape 846 and the roving strands 858 may be applied as many times as is necessary to build up the finished pipe to the the required wall thickness. It will be understood that the winding of the tape 846 and the glass fiber roving strands 858 takes place because the cured pipe 882 is being rotated and simultaneously pulled forwardly by the action of the pulling frame D above described.

Heat is applied to the material by the heaters 860 to polymerize the thermosetting resin, and the heat is applied over a length of pipe forwardly of the mandrel 830, depending upon the rate of production. As above mentioned, the heat may have to be applied, in some cases, to over a hundred feet or more of pipe length.

The portion of the pipe between the mandrel 830 and the pulling frame D is held in proper shape by the air pressure supplied to the space 880 in the manner above described, the compressed air being fed through the tubular shaft 828 and discharging in the space 880 through the aperture 874. The pressure is sufficiently high to cause the pipe to expand circumferentially to sustain the winding load imposed on the pipe by the roving strands 858 and the glass tape 846, as above described, the expansion allowing the pipe to float free of the forming mandrel 830, enabling the puller D to move the pipe axially over the forming mandrel 830 and the piston assembly 861 at the forward end of the shaft 828. As the pipe is expanded, the air leaks out between the forming mandrel 830 and the cellophane inner casing of the pipe, the air pressure being thus automatically adjusted so that the pipe is expanded only to the degree required to adequately reduce the friction between the inner casing of the pipe and the forming mandrel, and so that the puller D can easily move the pipe axially.

The pipe and puller assembly D are supported by sprocket chains 886 and 890, whereas the driving power is furnished by the electric motor 892.

The tubular shaft 828 is preferably slidably adjustable relative to the mandrel 830 to permit starting-up operation of the machine.

It will be noted that the apparatus illustrated in FIGS. 46 and 47 includes several important features from the standpoint of design and operation. First, all glass and resin delivery systems are fixed. This is a very important requirement for continuous production machines, particularly for large diameter pipe. The only revolving materials are the cellophane and adhesive cellophane tape rolls. Secondly, air pressure is used to balance the winding tensions and to support the pipe over long lengths so that the pipe may be passed unsupported through a long curing oven. This will allow the pipe to be produced at a very high production rate. The air pressure also reduces the friction between the cellophane release layer and the forming mandrel 830. By using air pressure there is no limit to the wall thickness to which the pipe can be fabricated, since the more material that is applied, the more air pressure can be furnished to balance same. Thirdly, the puller assembly D operates on a fully cured section of the pipe which is internally supported by air pressure. Thus, the puller is enabled to simultaneously rotate the pipe and move it axially over the forming mandrel 830 and through the curing oven.

Fourthly, a reinforced plastic pipe or tube may be fabricated with a thick resin inner liner that would be in compression during operating conditions. A resin coat would be applied to the cellophane casing and cured by suitable heaters before the overwind of glass tape and roving is applied. The mandrel at this point would be reduced in diameter so that the overwind of glass tape and roving would put the thick resin liner in compression. A plastic pipe with a resin liner in compression can operate at much higher stress levels and for longer periods of time than present reinforced pipe.

It will be apparent that in devising the automatic, continuous systems for the manufacture of fiber reinforced plastic pipe illustrated in FIGS. 1–47 above, a number of devices have been included which possess utility for other purposes than as hereinbefore specifically described in connection with the manufacture of fiber reinforced plastic pipe. The device G has general utility for coating strip or sheet material. The belt system F may be used for forming a resin tube apart from having the tube formed on such system overwound with additional material or materials. The winding head I and the manner of coating the continuous fiber elements drawn off the head may be used for the application of bands or layers of fiber elements to any hollow article of substantial length, for example, the manufacture of a structural body which may have a configuration other than cylindrical. Also, the control device D may be used in processing any cylindrical member or pipe such as metal pipe. The plug seal means C, while particularly adapted for use in conjunction with a pipe assembly generated as specifically described, is also useful where it may be desired to process metal pipe by coating the same or otherwise treating the continuously advanced pipe or tubing. The air piston E may be used in conjunction with a rigid metal pipe or tube rather than in a system which fabricates the pipe as described.

It is believed that the advantages and improved results afforded by the invention will be apparent from the foregoing specifically described preferred embodiments of the invention. It will be apparent that various modifications and changes may be made without departing from the spirit and scope of the invention as sought to be defined in the claims which follow.

I claim:

1. A device for temporarily providing an air seal within an advancing pipe comprising a first air conveying tube adapted to extend through the pipe, a rigid perforated sleeve connected to a second air conveying tube in communication with the interior of said sleeve, the second tube being in communication with and connected to the first tube to allow longitudinal movement of the second tube and the sleeve relative to the first tube, an inflatable container secured to surround the sleeve, said container when inflated gripping the inner surface of the pipe and movable therewith, and extensible means for returning said second tube, sleeve and associated inflatable container upon deflation of the container.

2. A device according to claim 1, wherein the first tube has the forward end thereof flared and positioned in the rear end of the second tube, a hub slidable on the first tube and secured to the rear end of the second tube, said hub providing means limiting the relative longitudinal movement between the tubes; and wherein the extensible means comprises a helically coiled spring having one end secured to the first tube and its opposite end secured to the hub.

* * * * *

UNITED STATES PATENT OFFICE
CERTIFICATE OF CORRECTION

PATENT NO. : 3,898,918
DATED : August 12, 1975
INVENTOR(S) : J. Warne Carter

It is certified that error appears in the above—identified patent and that said Letters Patent are hereby corrected as shown below:

Title Page: Assignee is omitted, should be to

-- CIBA-GEIGY CORPORATION --.

Column 28, line 36 - "686" second occurrence should read -- 688--

Column 34, line 15 - "860" should read -- 870 --.

Signed and Sealed this fourth Day of November 1975

[SEAL]

Attest:

RUTH C. MASON
Attesting Officer

C. MARSHALL DANN
Commissioner of Patents and Trademarks